(12) United States Patent
Moriyama

(10) Patent No.: US 11,982,769 B2
(45) Date of Patent: May 14, 2024

(54) DISTANCE SENSOR AND DISTANCE MEASUREMENT DEVICE

(71) Applicant: Sony Semiconductor Solutions Corporation, Kanagawa (JP)

(72) Inventor: Yusuke Moriyama, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 916 days.

(21) Appl. No.: 16/980,371

(22) PCT Filed: Feb. 26, 2019

(86) PCT No.: PCT/JP2019/007282
§ 371 (c)(1),
(2) Date: Sep. 11, 2020

(87) PCT Pub. No.: WO2019/181384
PCT Pub. Date: Sep. 26, 2019

(65) Prior Publication Data
US 2021/0048513 A1 Feb. 18, 2021

(30) Foreign Application Priority Data
Mar. 20, 2018 (JP) .................. 2018-052257

(51) Int. Cl.
*G01S 7/48* (2006.01)
*G01S 7/4863* (2020.01)
(Continued)

(52) U.S. Cl.
CPC .......... *G01S 7/4863* (2013.01); *G01S 7/4865* (2013.01); *G01S 17/10* (2013.01); *G01S 17/89* (2013.01)

(58) Field of Classification Search
USPC ....................................... 356/5.01
See application file for complete search history.

(56) References Cited

U.S. PATENT DOCUMENTS 8,508,720 B2 * 8/2013 Kamiyama ............. G01S 17/10
356/5.03
9,442,196 B2 * 9/2016 Buettgen ............... G01S 7/4918
(Continued)

FOREIGN PATENT DOCUMENTS

CN 104079841 A 10/2014
CN 106210570 A 12/2016
(Continued)

OTHER PUBLICATIONS

International Search Report and Written Opinion dated May 9, 2019 in connection with International Application No. PCT/JP2019/007282.
(Continued)

*Primary Examiner* — James R Hulka
(74) *Attorney, Agent, or Firm* — Wolf, Greenfield & Sacks, P.C.

(57) ABSTRACT

There is provided a time of flight sensor. The time of flight sensor includes a light receiving element PD, a first signal line TRG0 and a second signal line TRG180, a first transistor TGA in electrical communication with the light receiving element, the first transistor comprising a first gate in electrical communication with the first signal line TRG0, a second transistor TGB in electrical communication with the light receiving element, the second transistor comprising a second gate in electrical communication with the second signal line TRG180, and a control circuit P200 comprising at least one comparator 102A, 102B, wherein the control circuit is in electrical communication with the first and second signal lines TRG0, TRG180. The transistors TGA and TGB of the pixel circuit P100 are turned on and off so that any one of the transistors TGA and TGB is turned on, and the electric charges generated by the photodiode PD are selectively accumulated at the floating diffusion FDA and
(Continued)

the floating diffusion FDB. First and second voltages VSLA, VSLB depending on voltages at first and second floating diffusions FDA, FDB, respectively, are compared to a reference voltage VREF. The first signal TRGO is a logical product of a clock signal SCK and the comparator output QO, and the second signal TRG180 is the logical product of the inverted clock signal SCK and the comparator output QO. A distance measurement device has an imaging unit including a pixel array of a plurality of imaging pixels P arranged in a matrix. One control circuit P200 is provided for one pixel circuit P100. The control circuit P200 controls the exposure time in the pixel circuit P100. The pixel circuit P100 supplies the voltages VSLA and VSLB to the control circuit P200, and the control circuit P200 generates the signals TRGO and TRG180 on the basis of the voltages VSLA and VSLB, and supplies these signals TRGO and TRG180 to the pixel circuit P100. Thus, since the exposure time can be individually set in each of the plurality of imaging pixels, the measurement accuracy in distance measurement can be enhanced.

22 Claims, 33 Drawing Sheets

(51) Int. Cl.
  *G01S 7/4865*  (2020.01)
  *G01S 17/10*  (2020.01)
  *G01S 17/89*  (2020.01)

(56) References Cited

U.S. PATENT DOCUMENTS

| 10,422,879 | B2* | 9/2019 | Nagai | G01S 17/08 |
| 11,585,898 | B2* | 2/2023 | Saito | G01S 7/4808 |
| 2011/0164132 | A1 | 7/2011 | Buettgen et al. | |
| 2011/0194099 | A1 | 8/2011 | Kamiyama | |
| 2017/0315238 | A1 | 11/2017 | Nagai | |

FOREIGN PATENT DOCUMENTS

| CN | 106878633 A | 6/2017 |
| CN | 108 282 626 A | 7/2018 |
| JP | 2011217206 A | 10/2011 |

OTHER PUBLICATIONS

International Preliminary Report on Patentability dated Oct. 1, 2020 in connection with International Application No. PCT/JP2019/007282.

* cited by examiner

[Fig. 1]
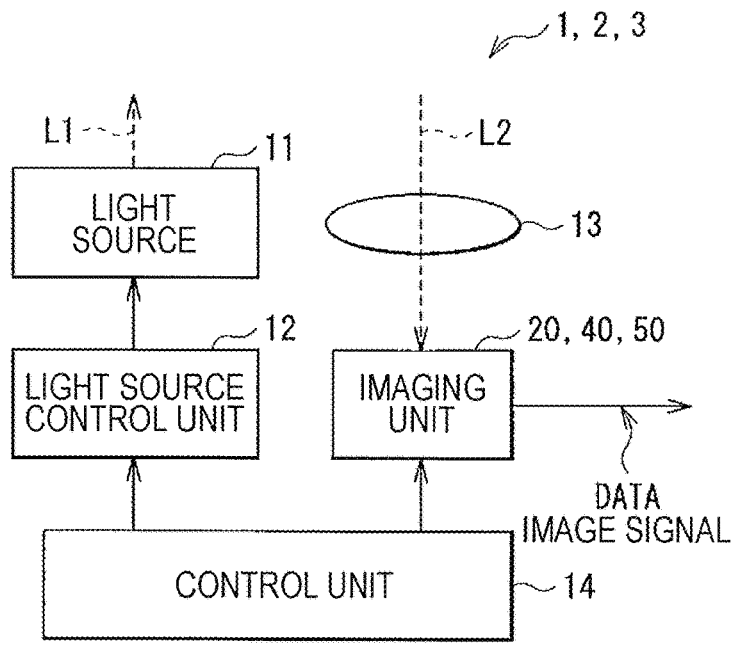
[Fig. 2]
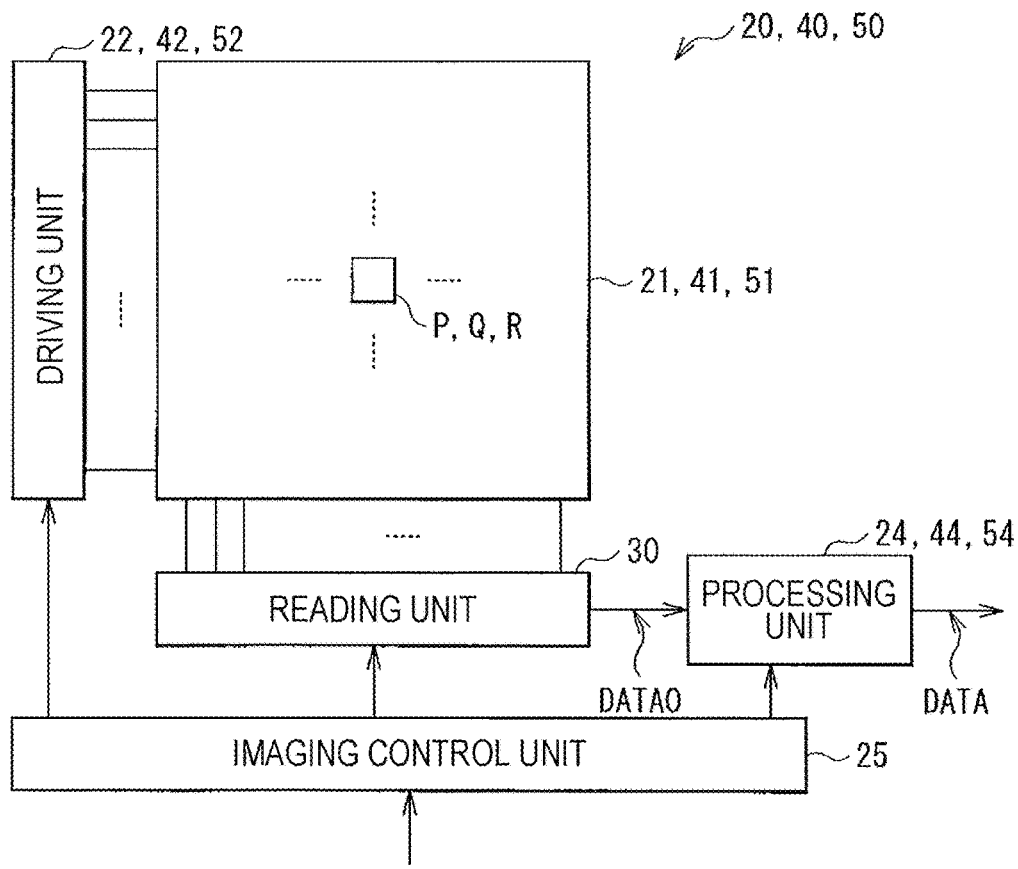

[Fig. 3]
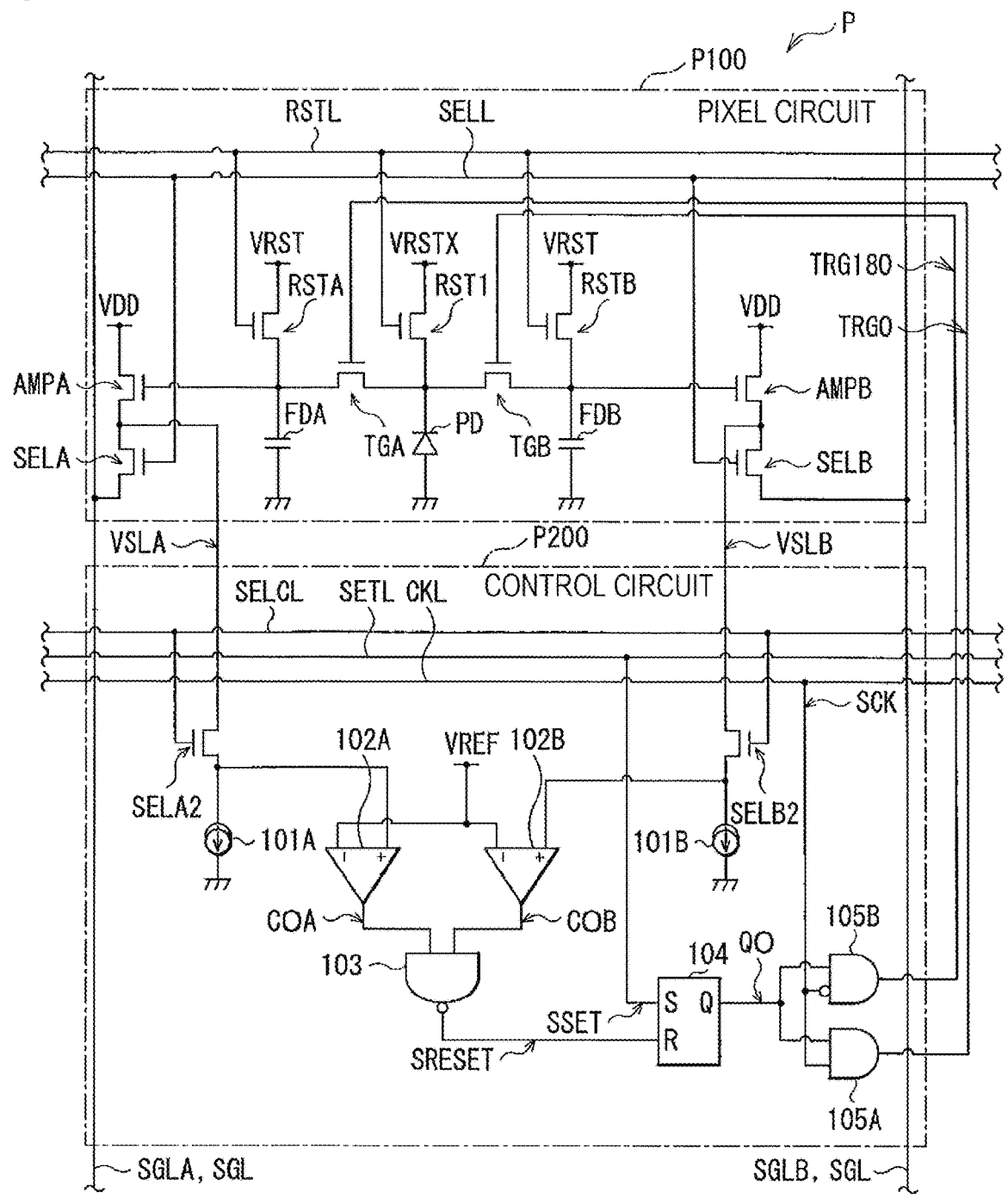

[Fig. 4]
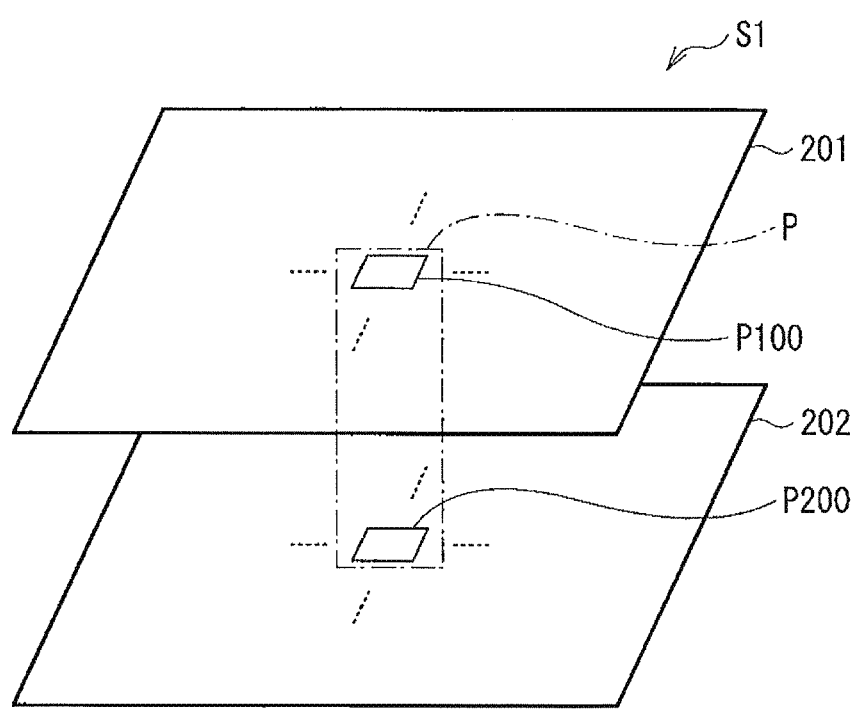

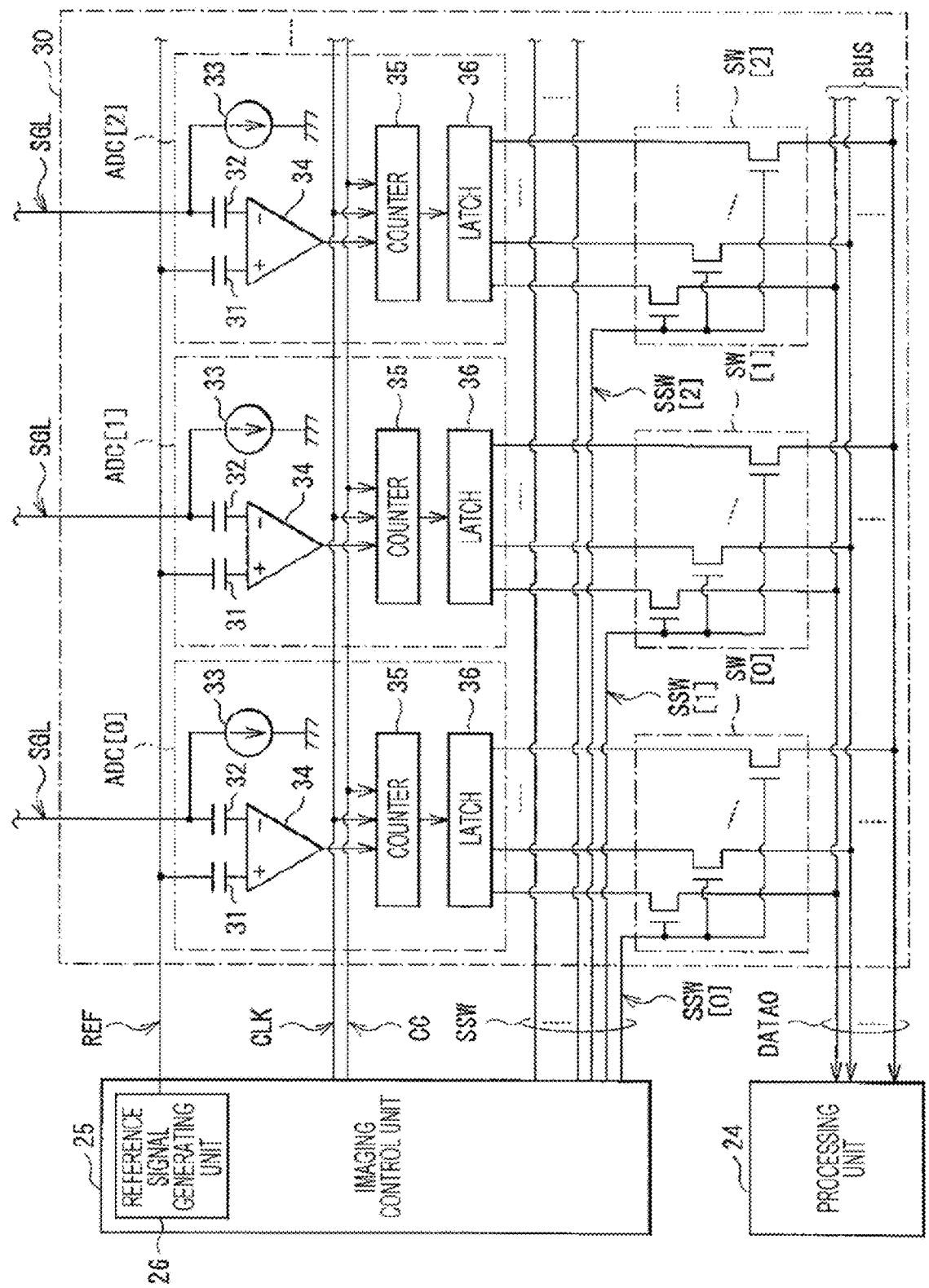
[Fig. 5]

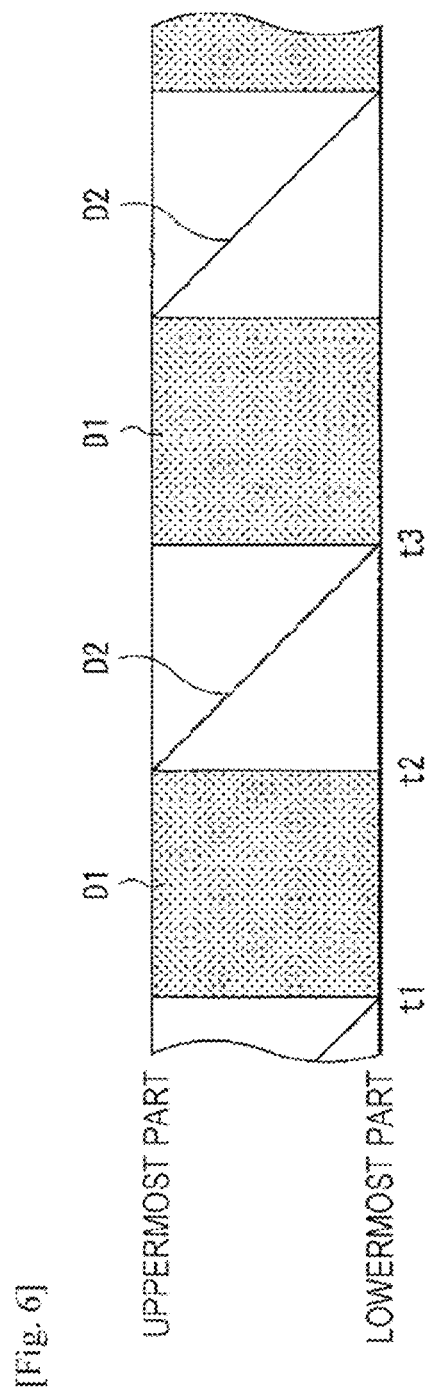

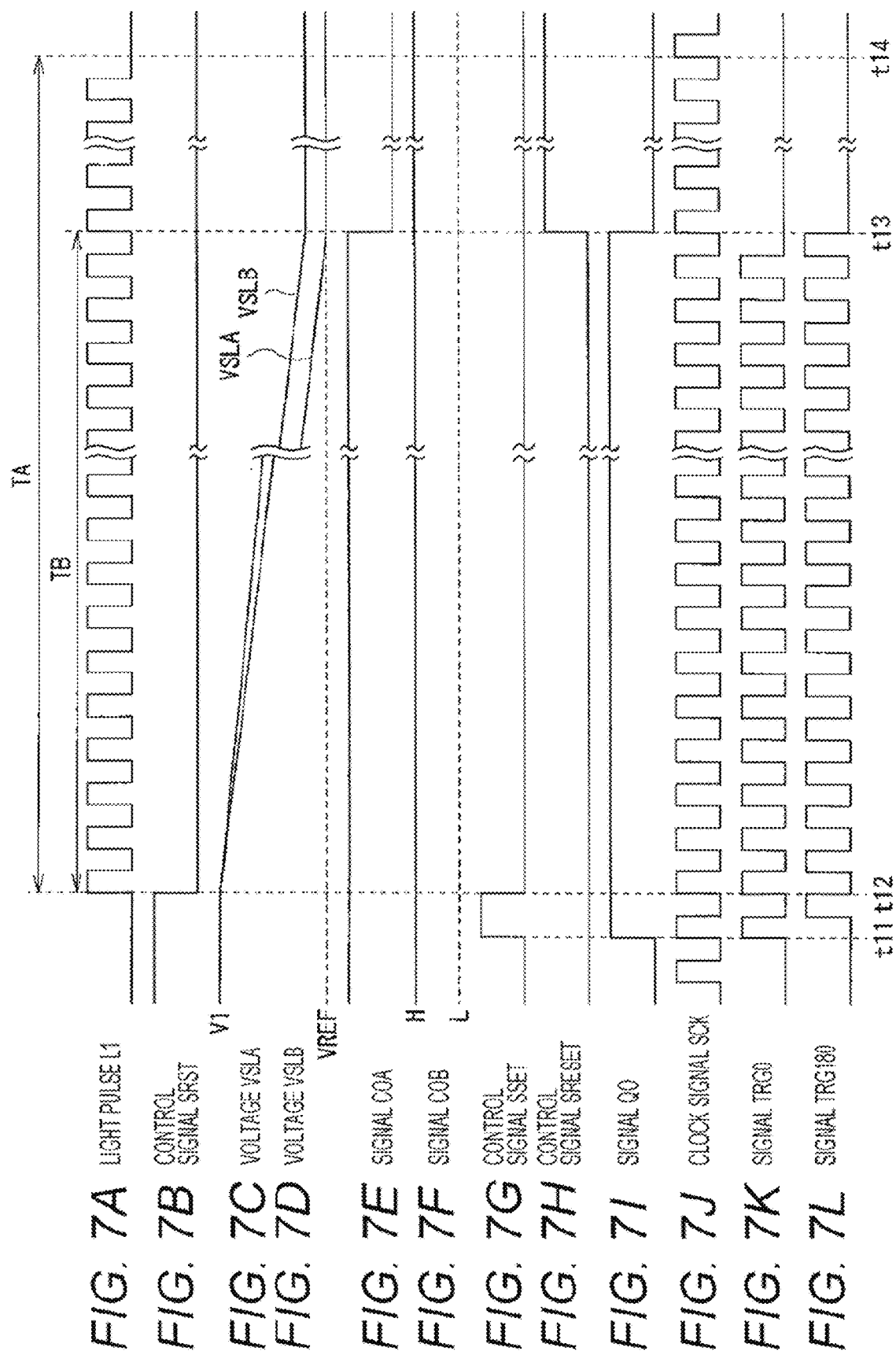

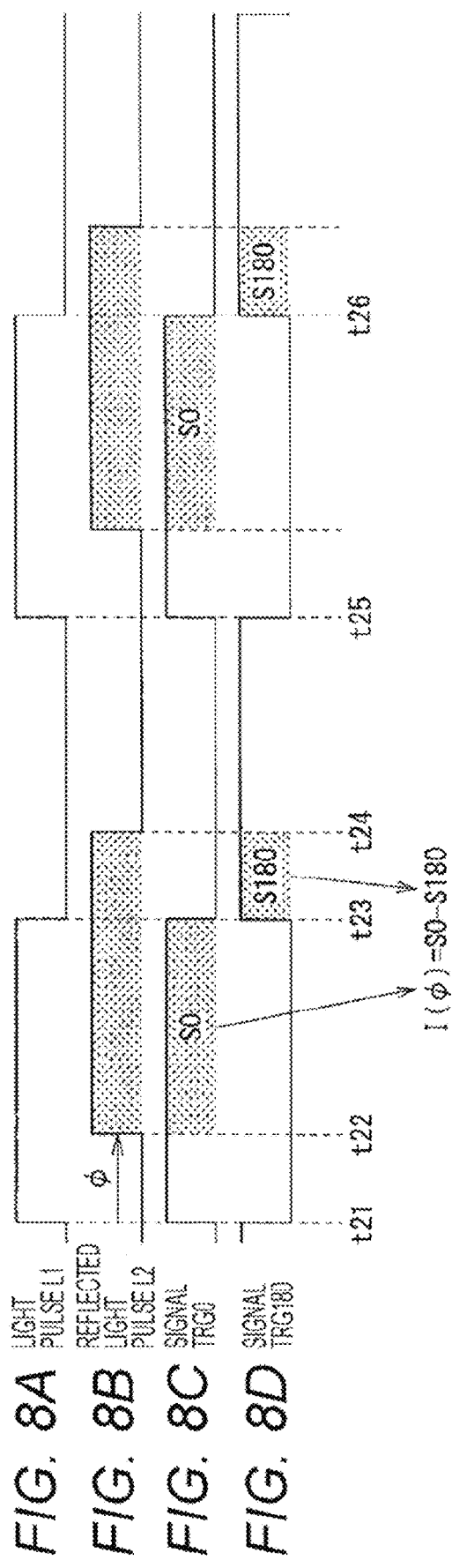

[Fig. 9]
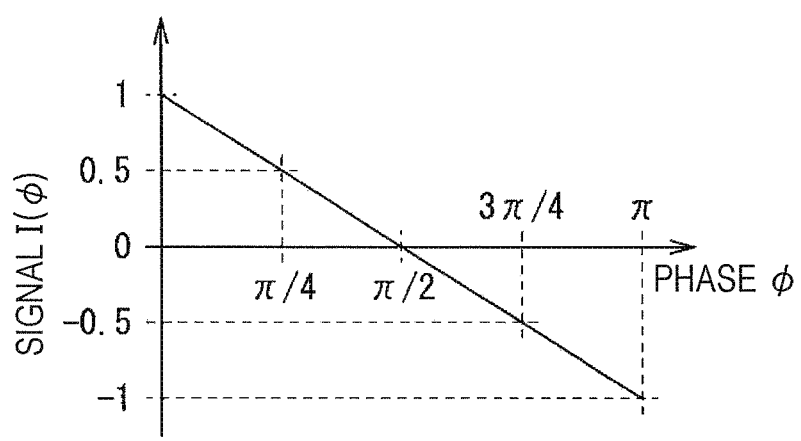

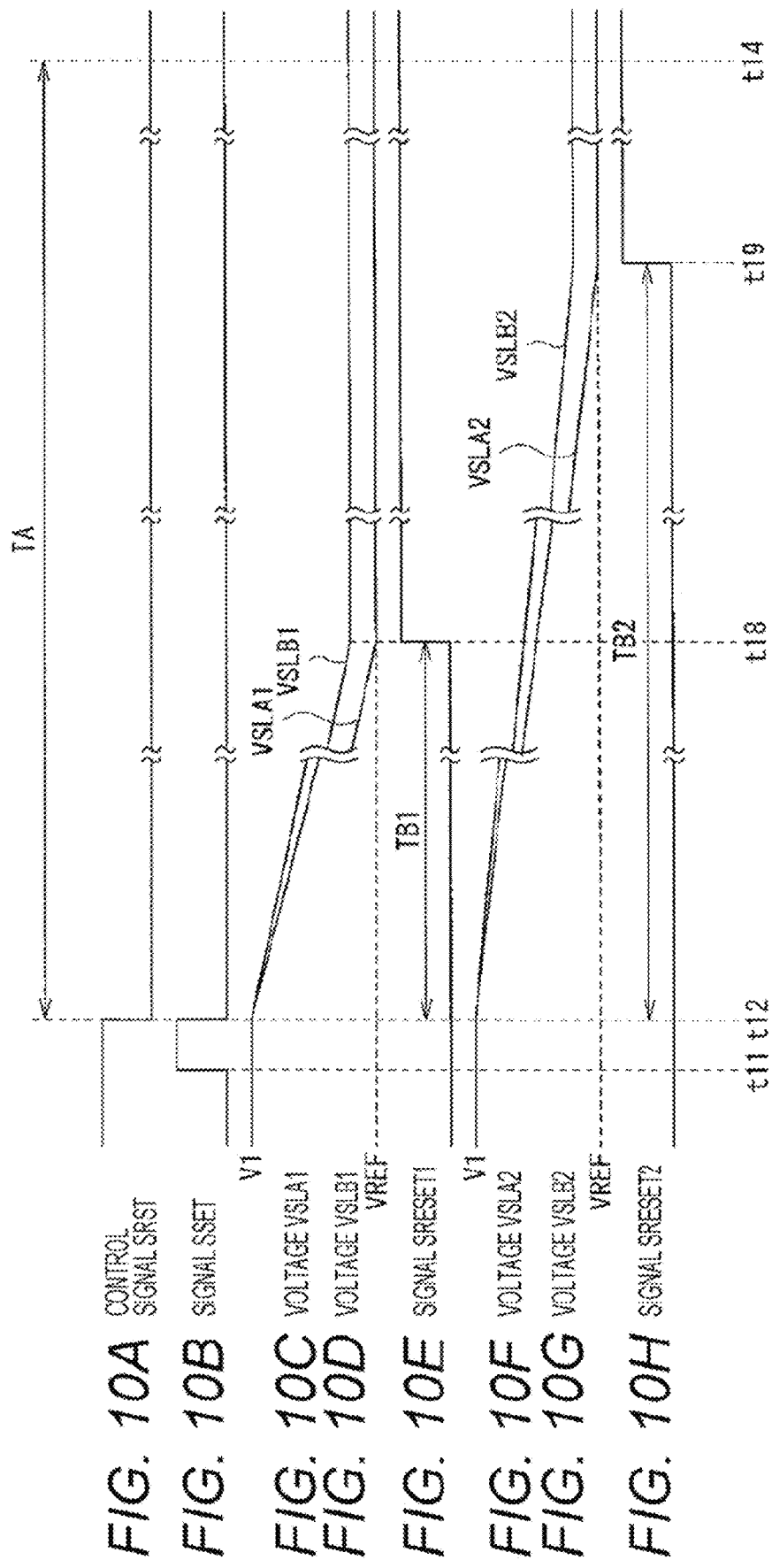

[Fig. 11]
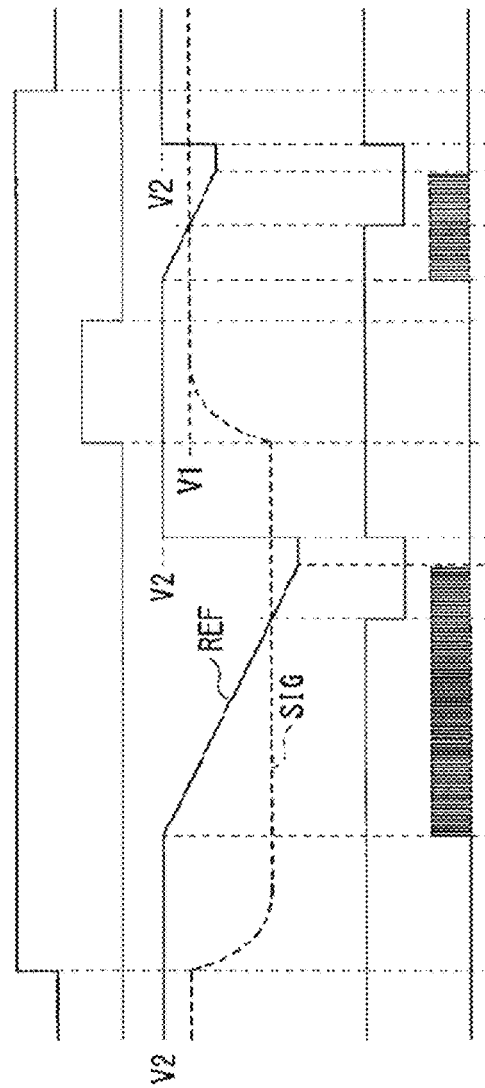
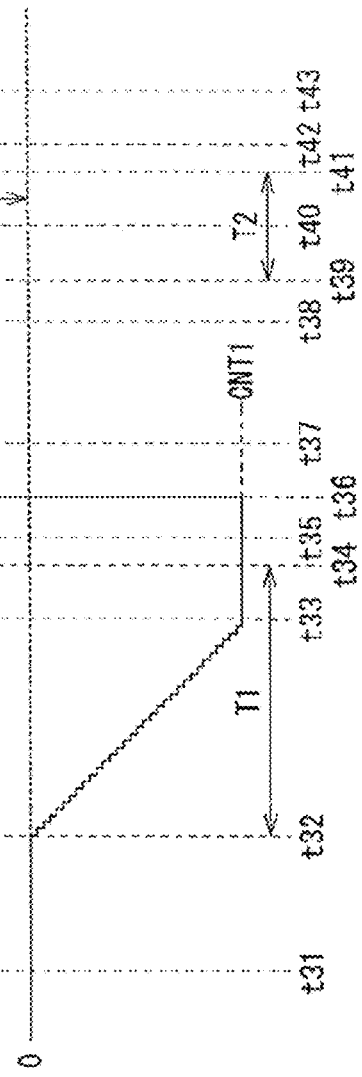
FIG. 11A CONTROL SIGNAL SSEL
FIG. 11B CONTROL SIGNAL SRST
FIG. 11C REFERENCE SIGNAL REF
FIG. 11D PIXEL SIGNAL SIG
FIG. 11E SIGNAL CMP
FIG. 11F CLOCK SIGNAL CLK
FIG. 11G COUNT VALUE CNT

[Fig. 12]
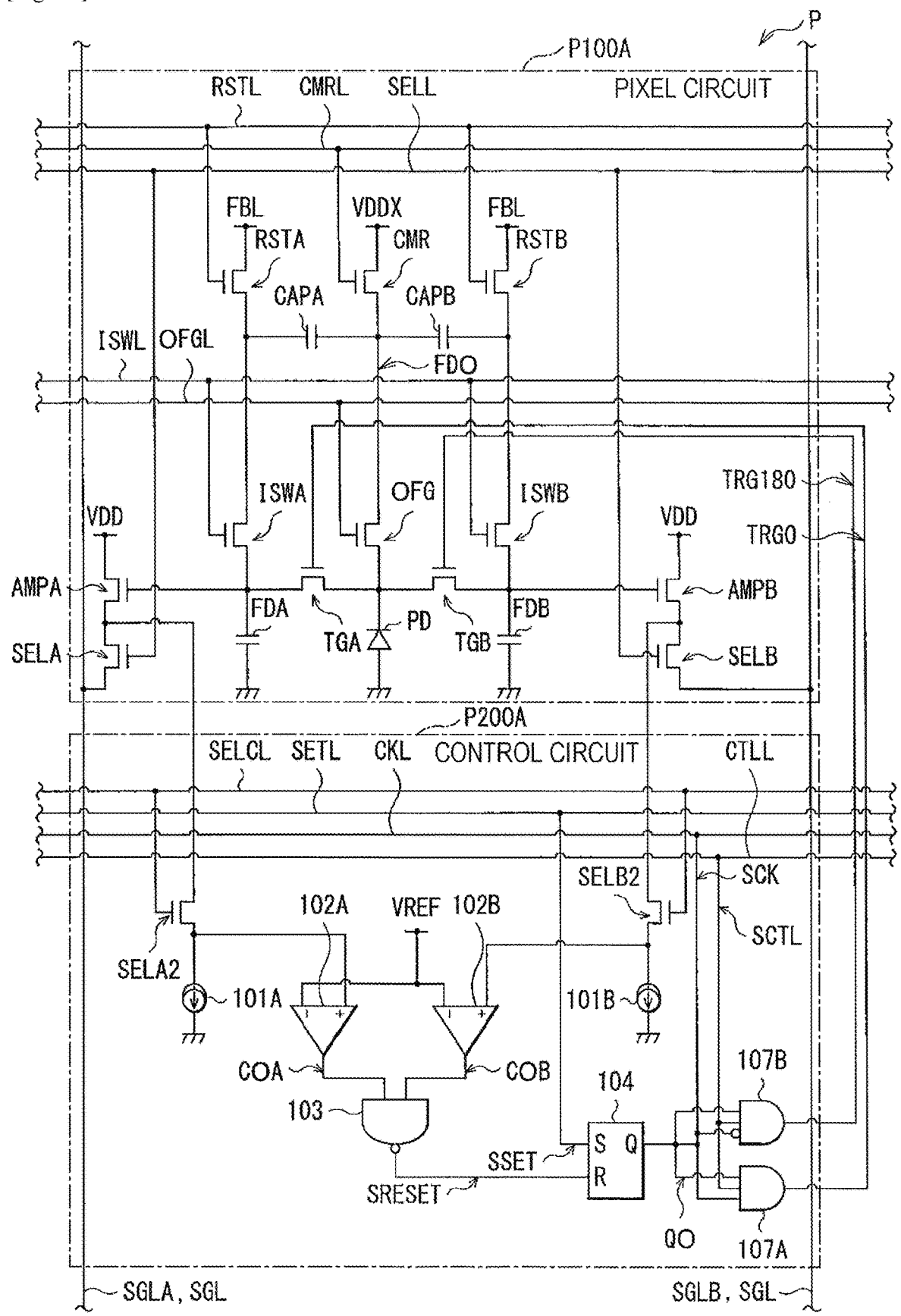

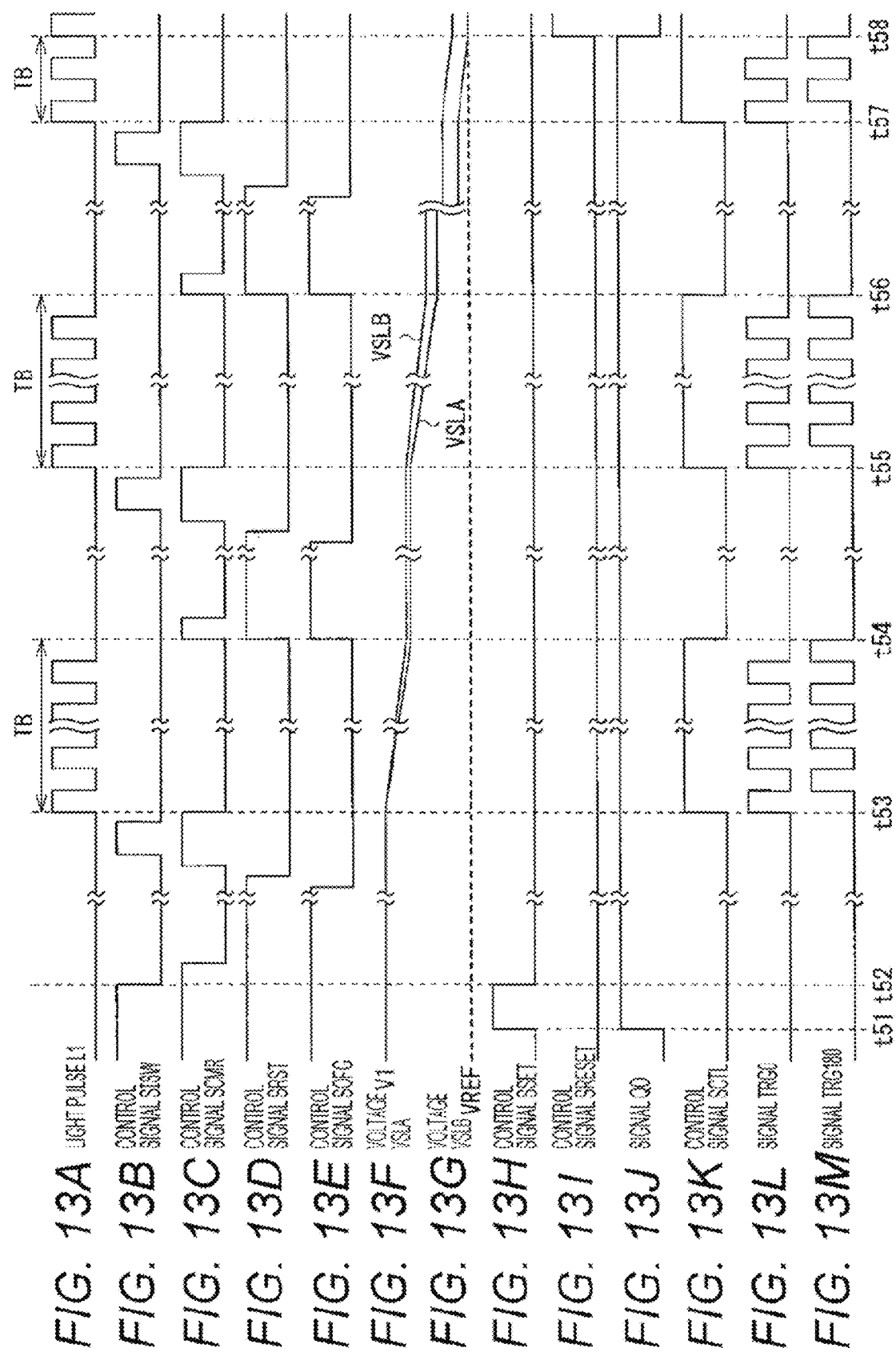

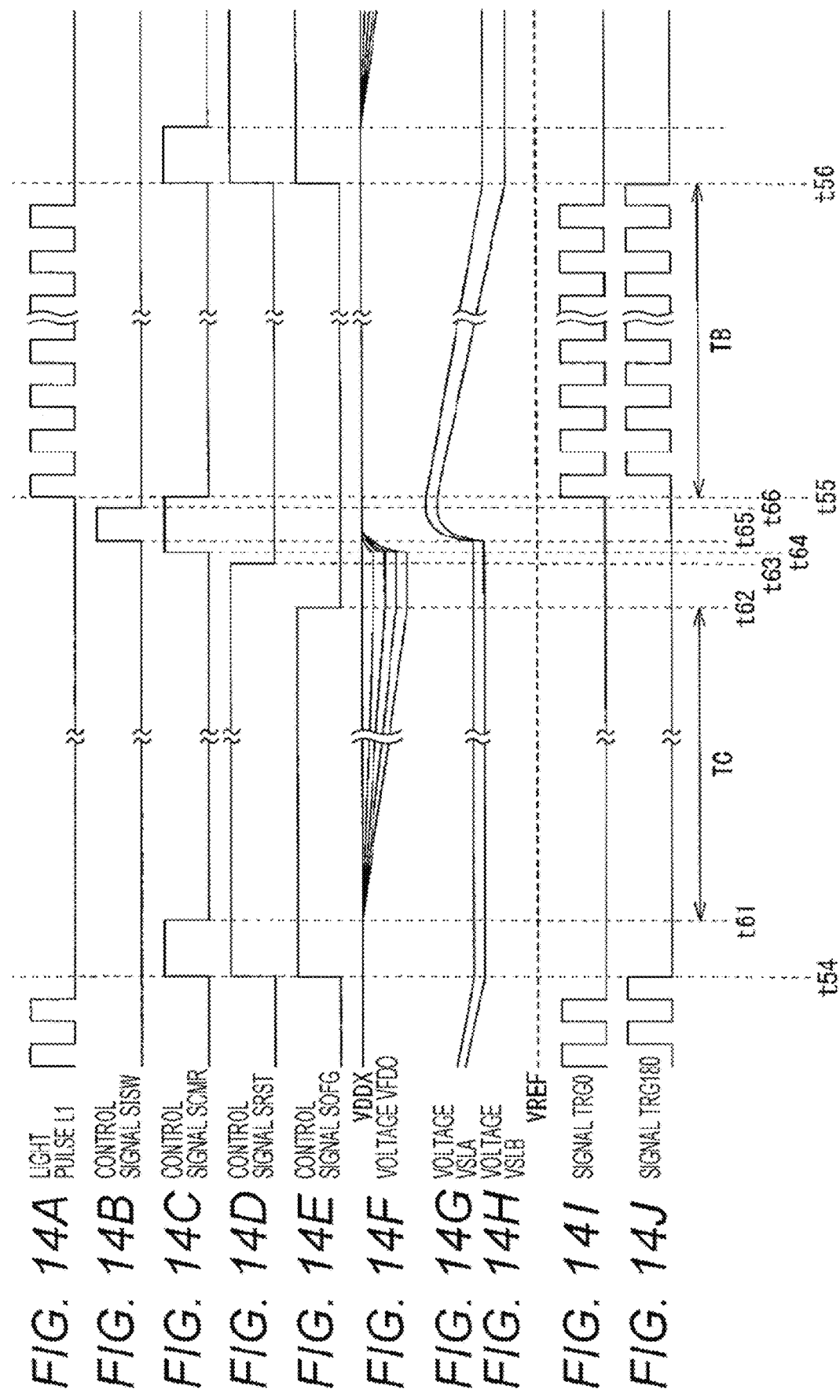

[Fig. 15]
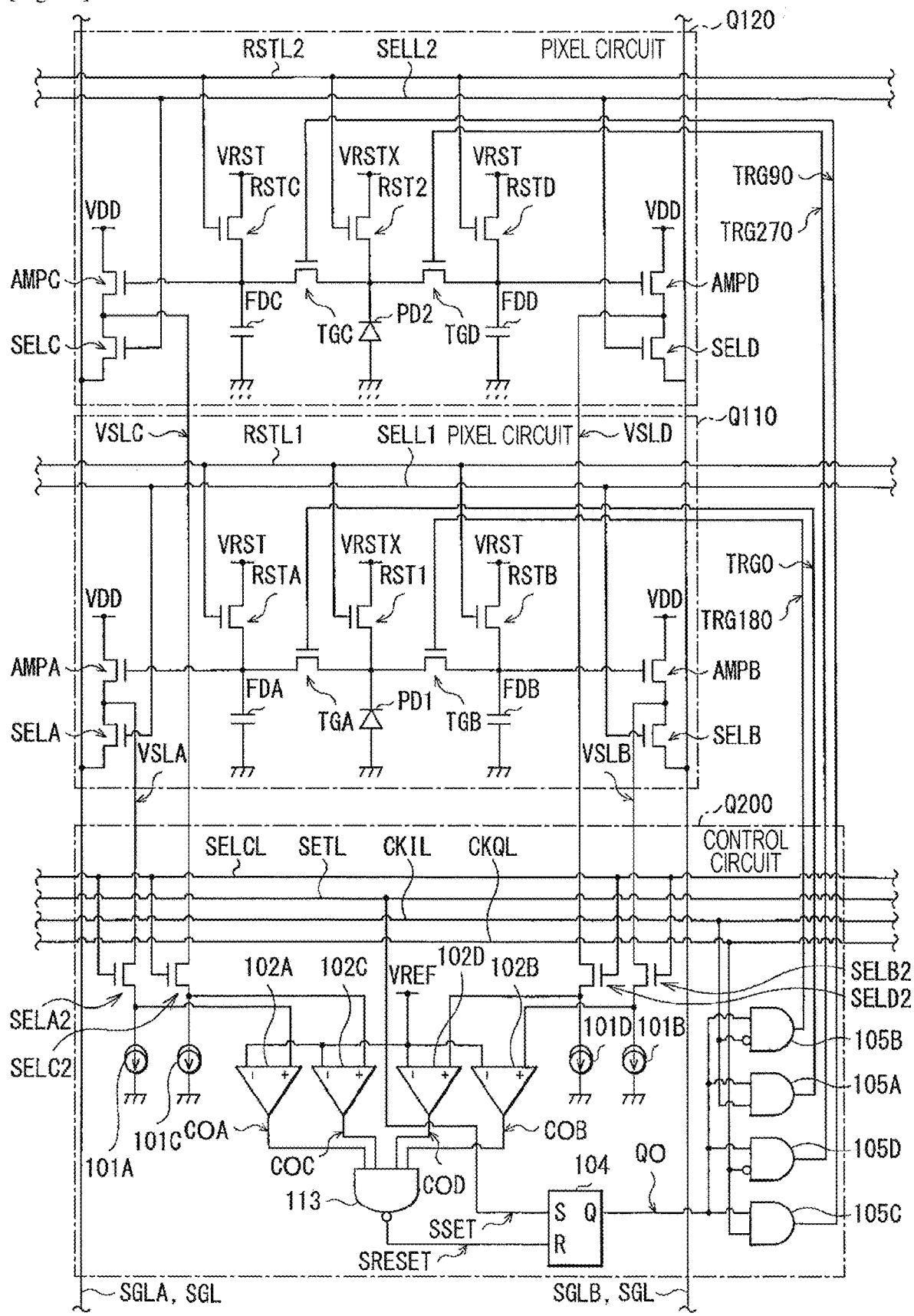

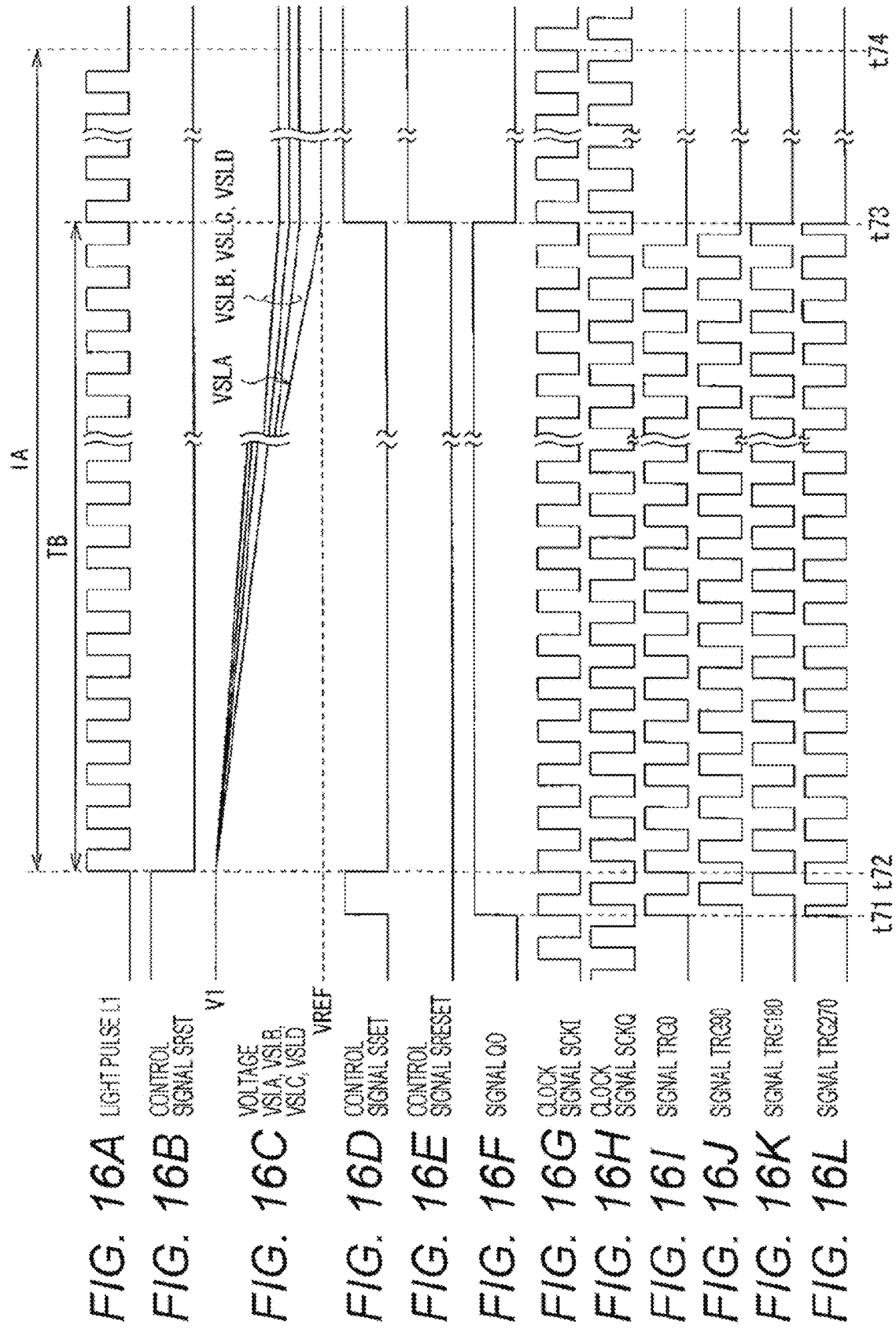

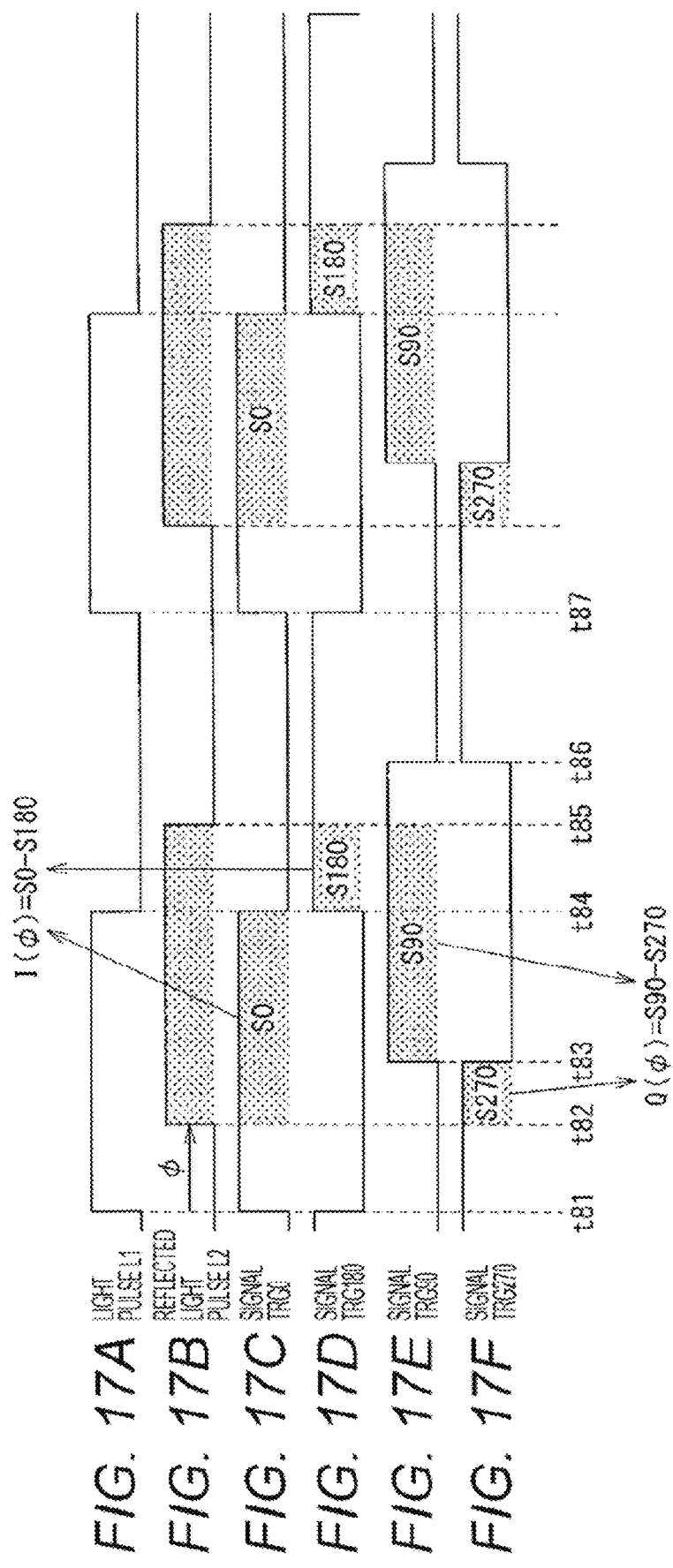

[Fig. 18]
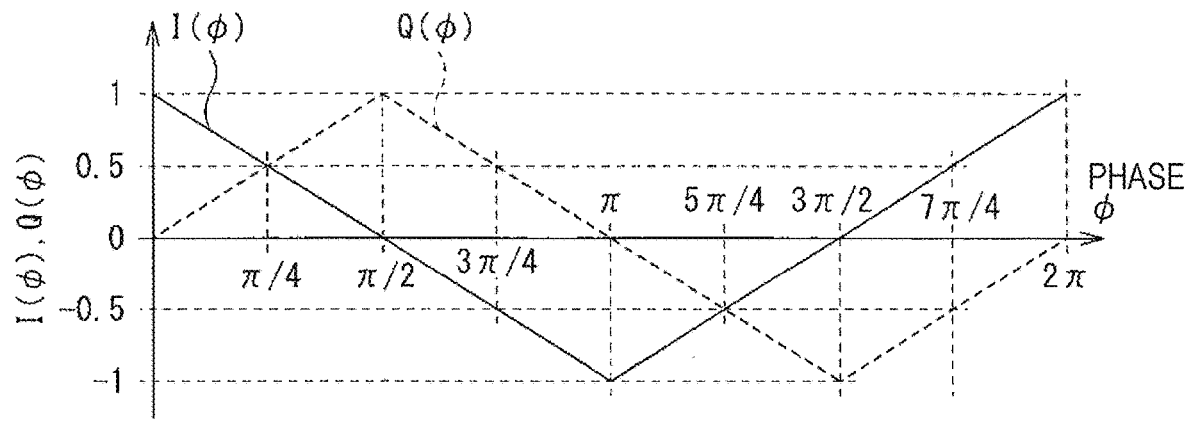
[Fig. 19]
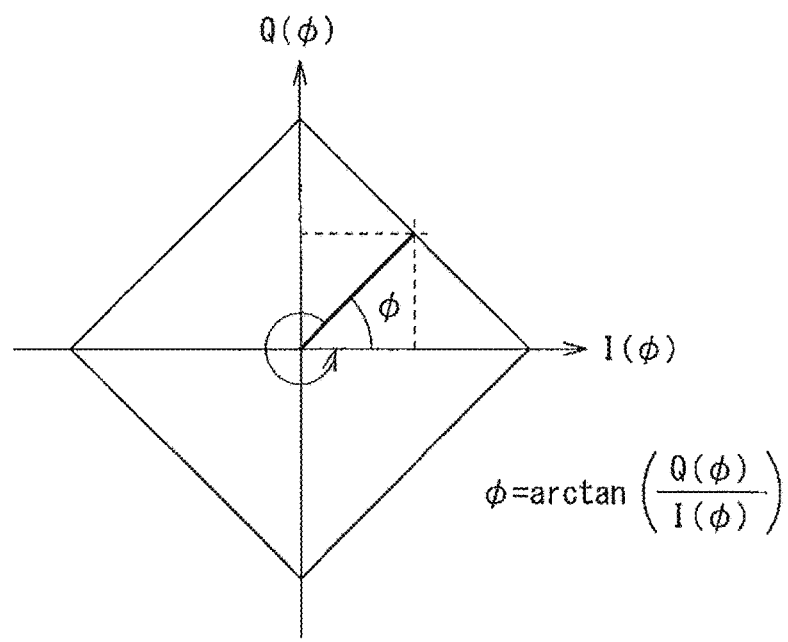

[Fig. 20]
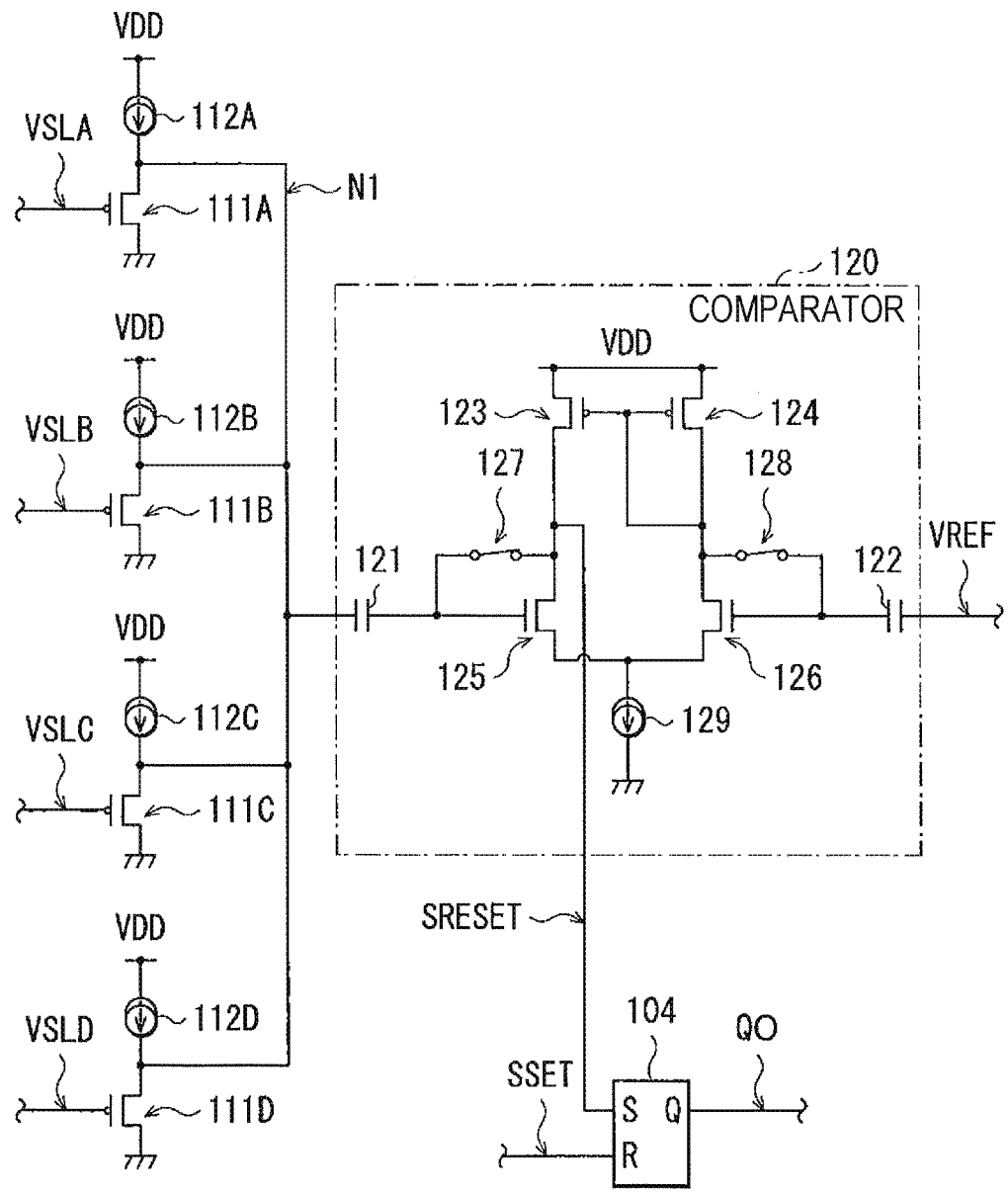

[Fig. 21]
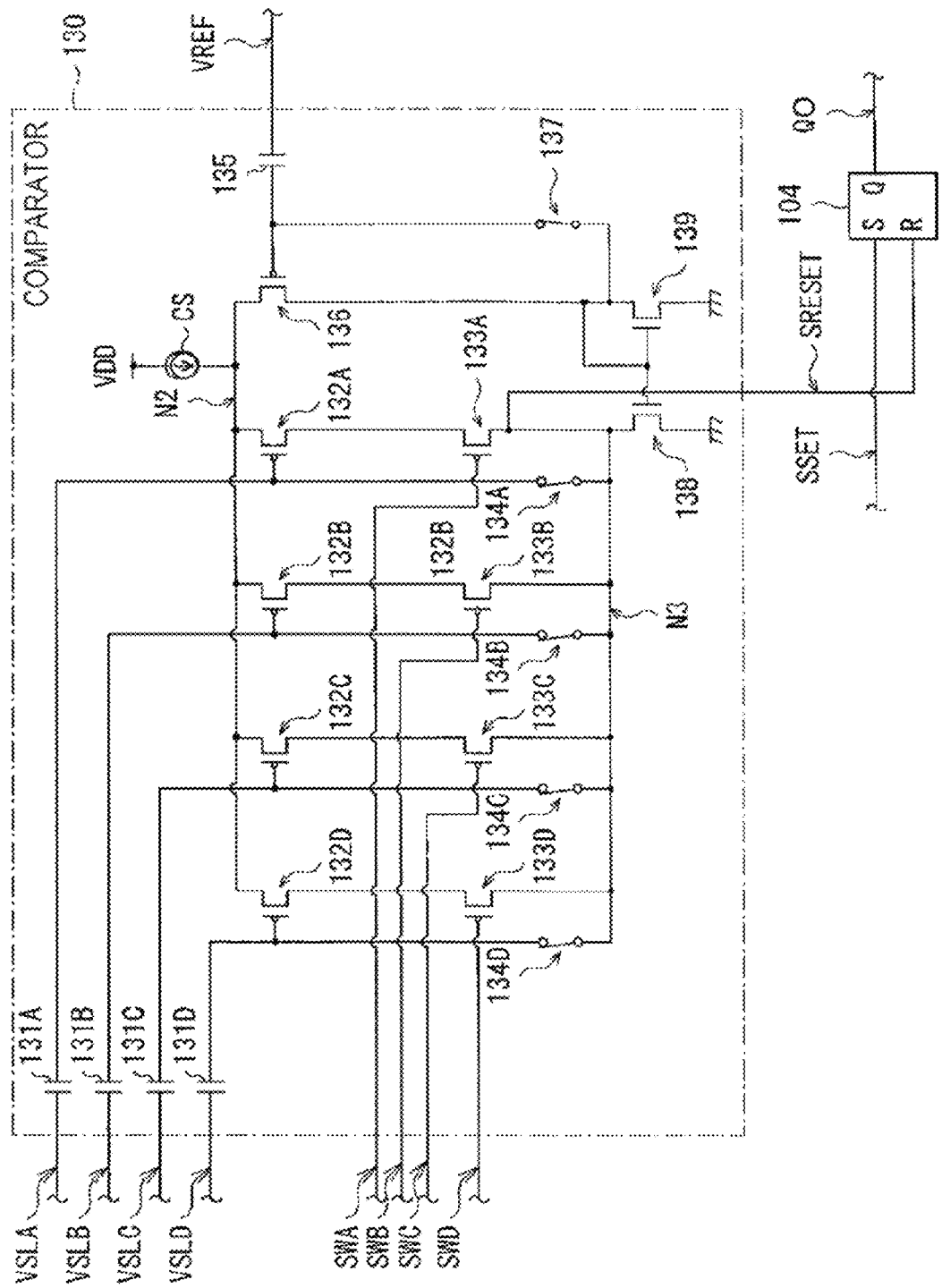

[Fig. 22]
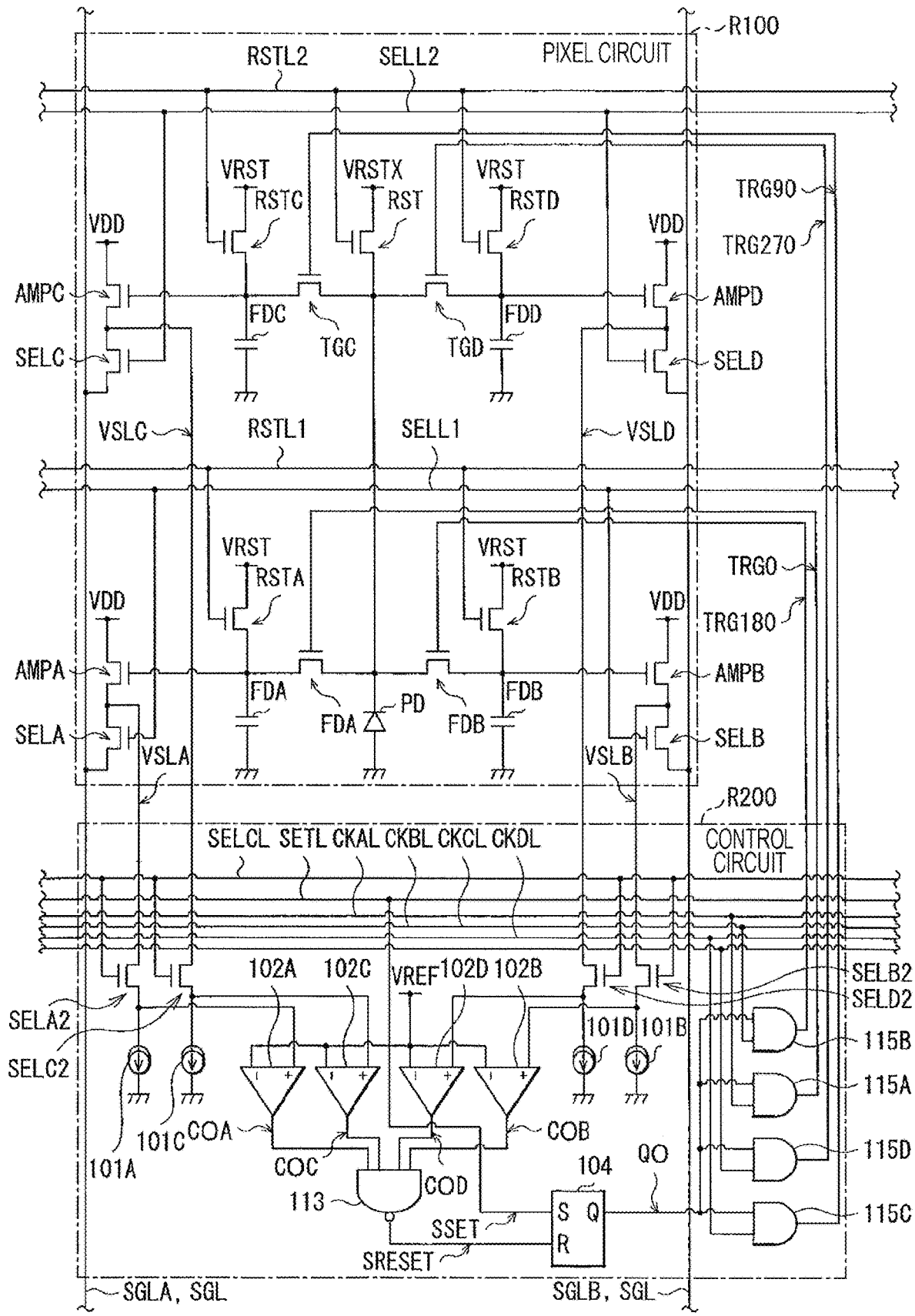

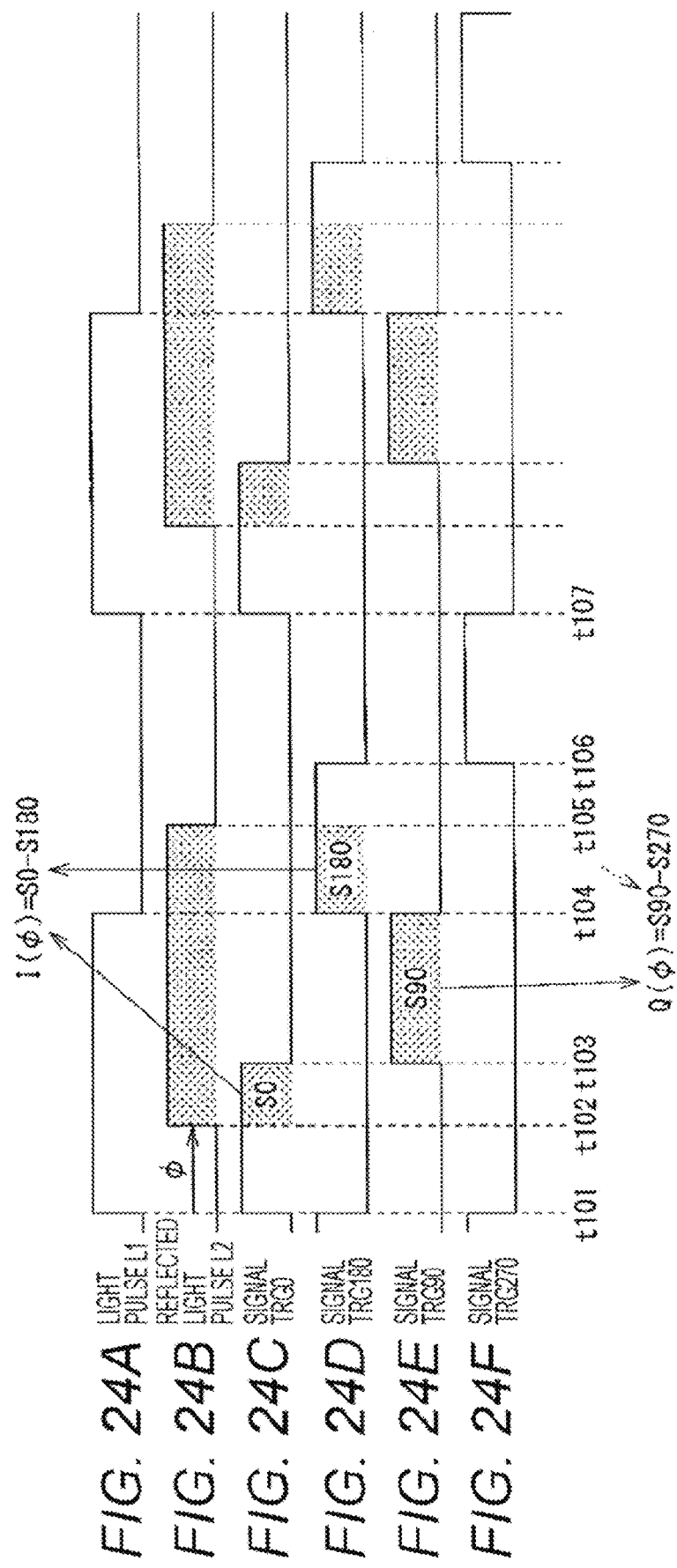

FIG. 25A ELECTRIC CHARGE S0
FIG. 25B ELECTRIC CHARGE S180
FIG. 25C ELECTRIC CHARGE S90
FIG. 25D ELECTRIC CHARGE S270
FIG. 25E SIGNALS $I(\phi), Q(\phi)$
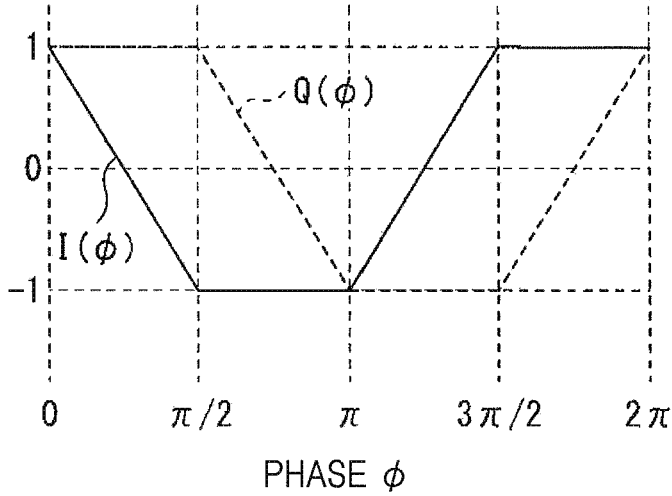

[Fig. 26]
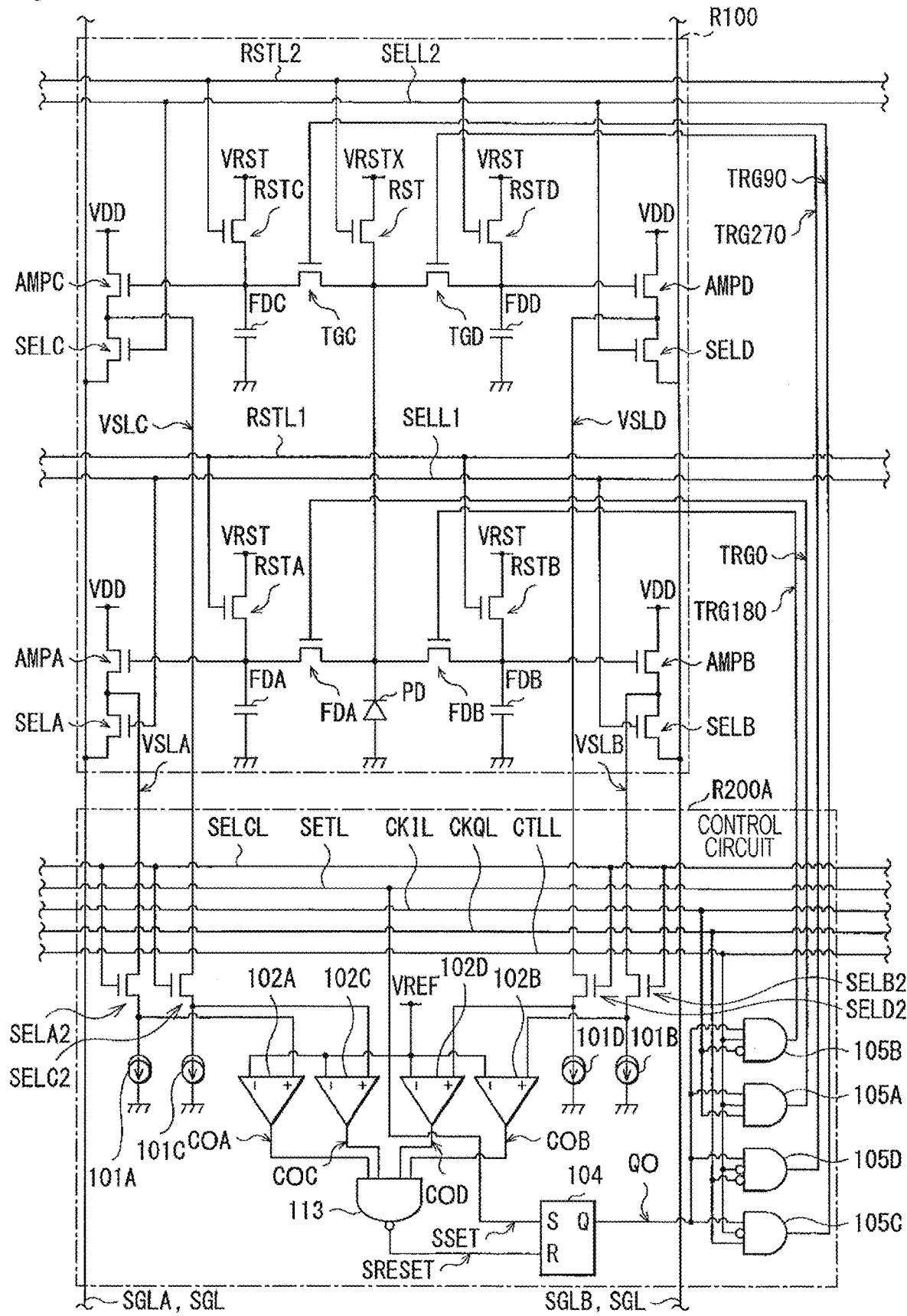

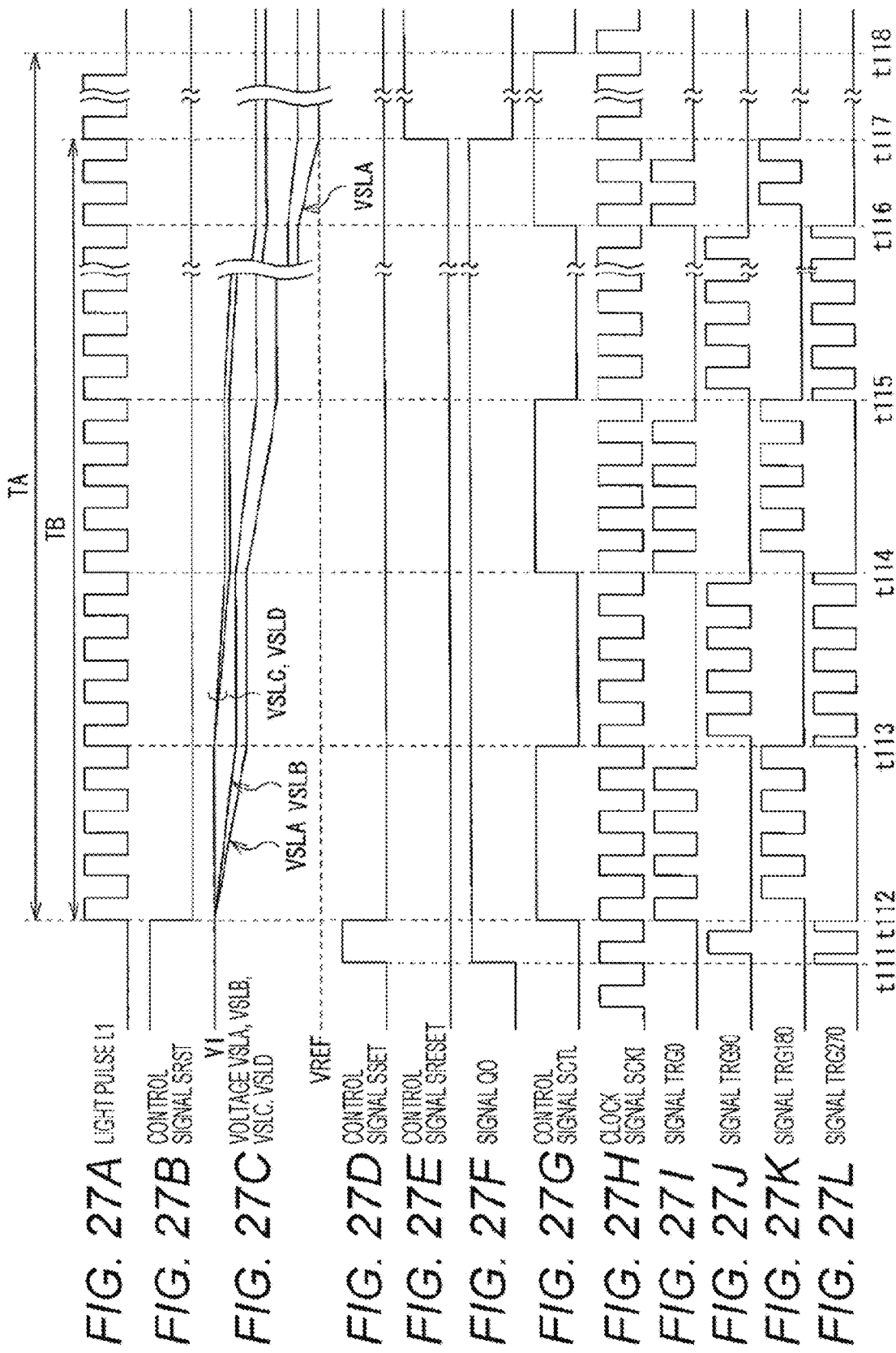

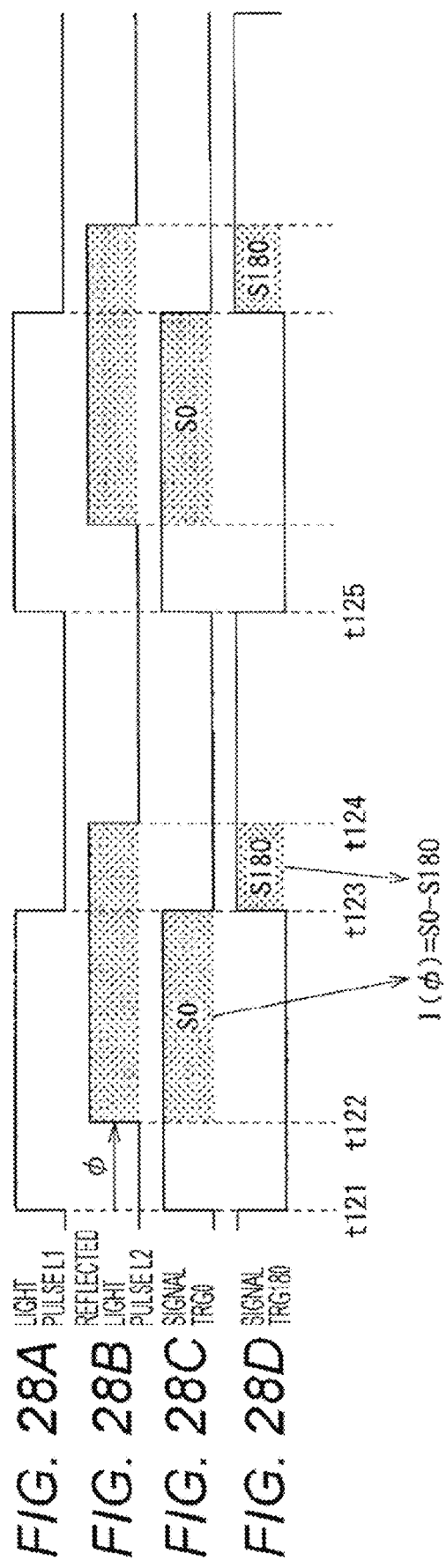

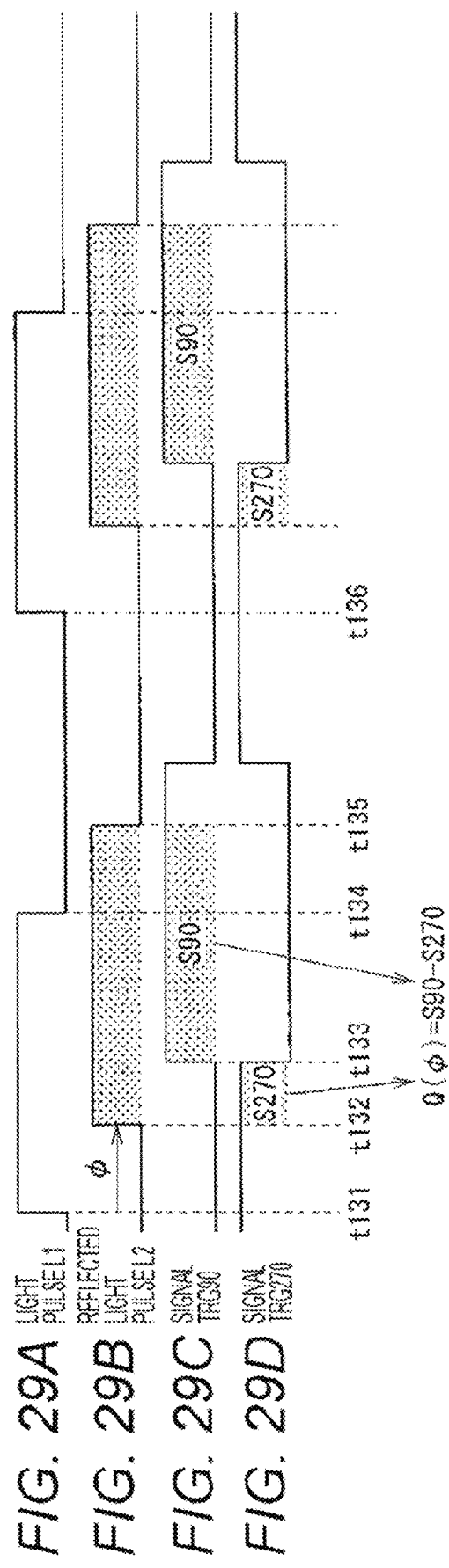

[Fig. 30]
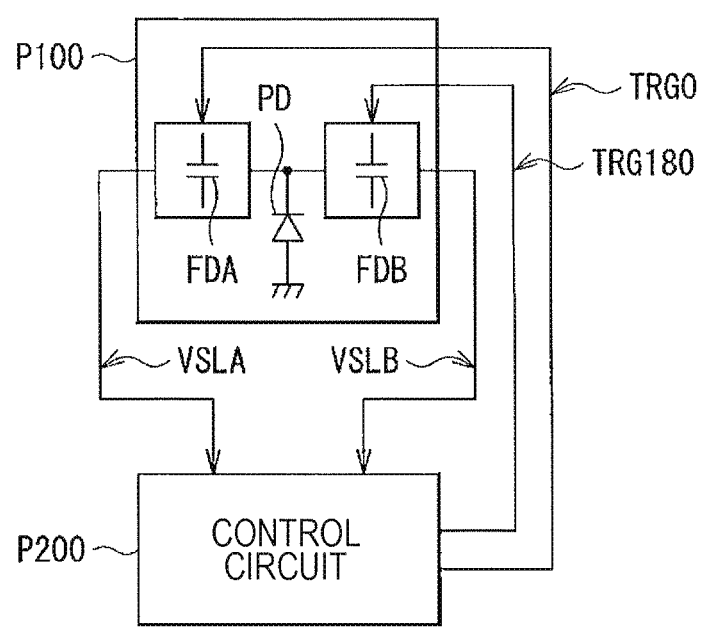

[Fig. 31]
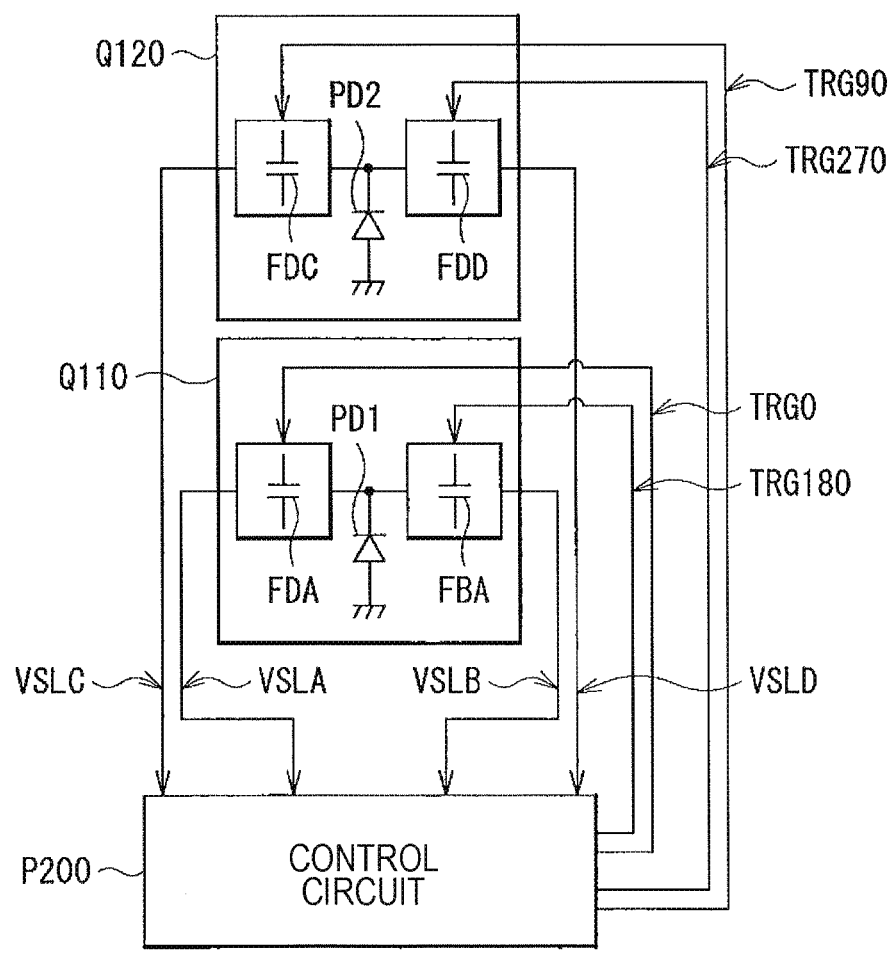

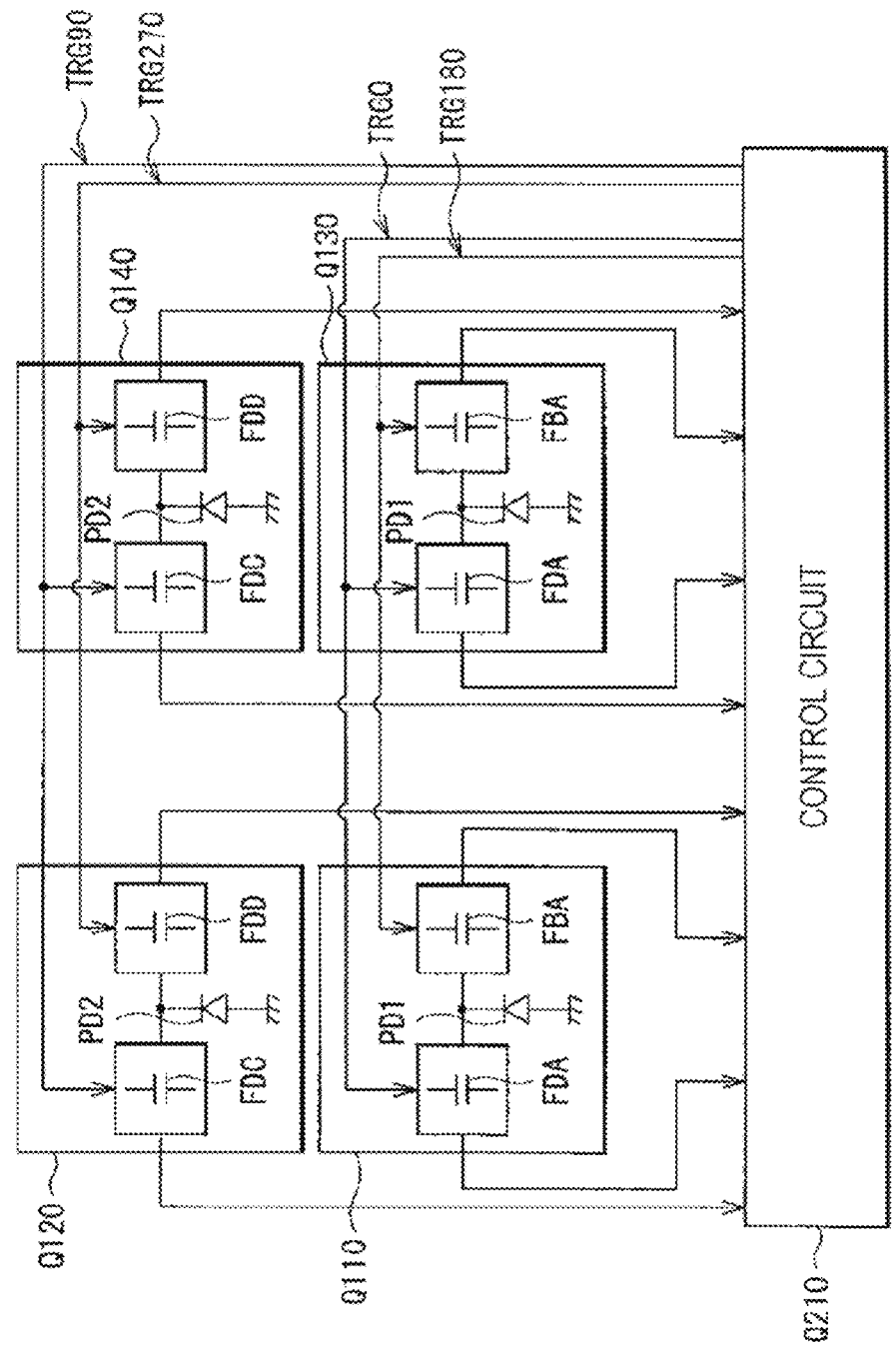
[Fig. 32]

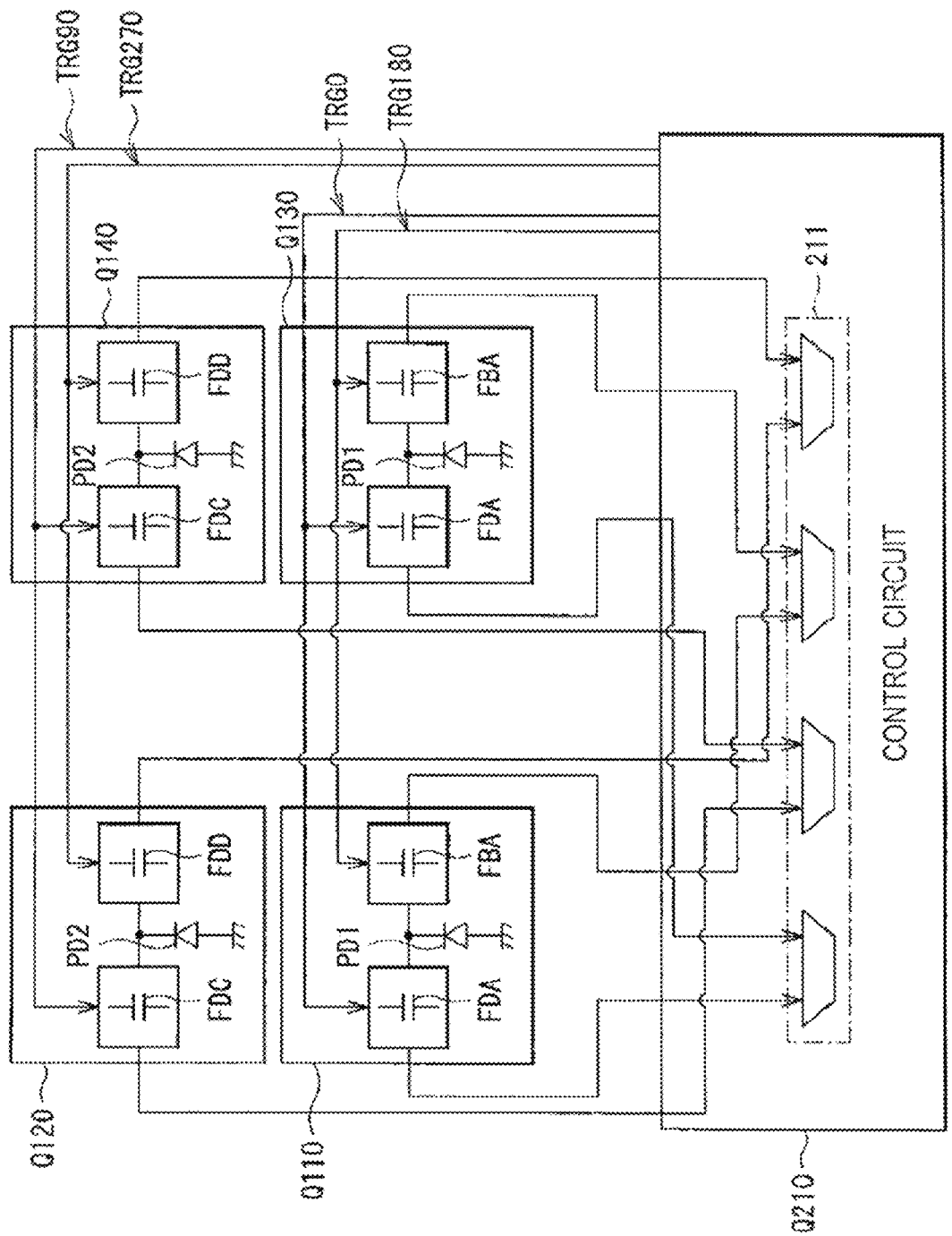
[Fig. 33]

[Fig. 34]
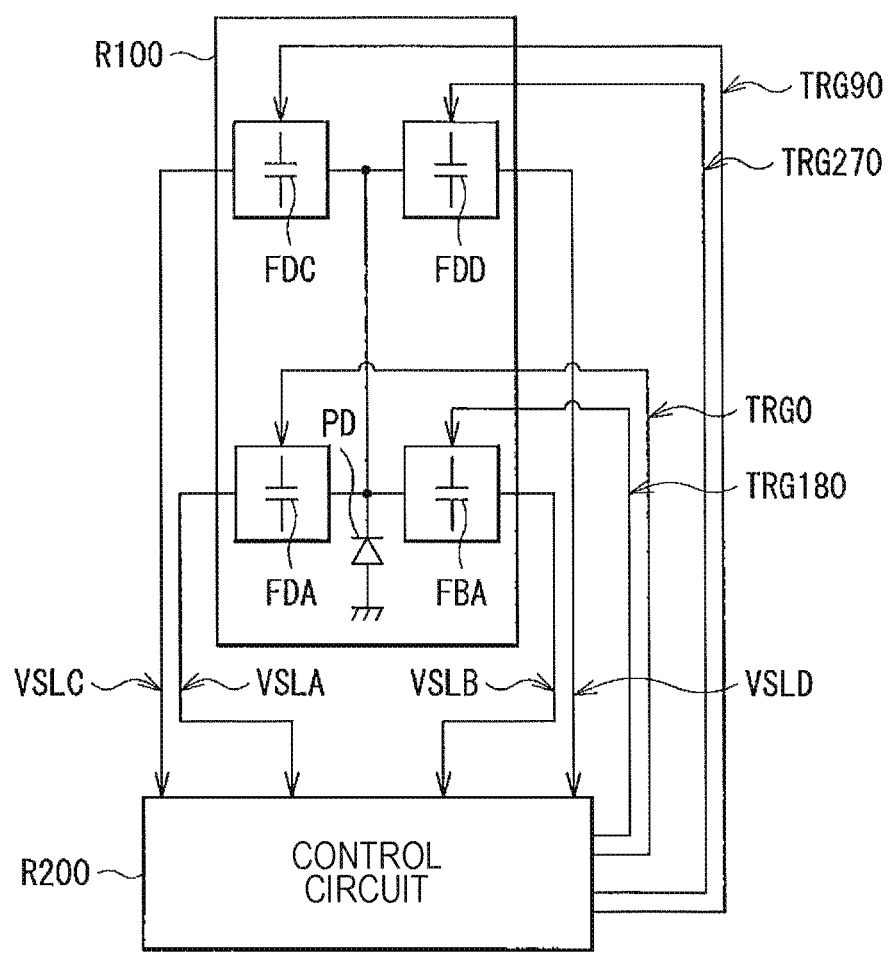

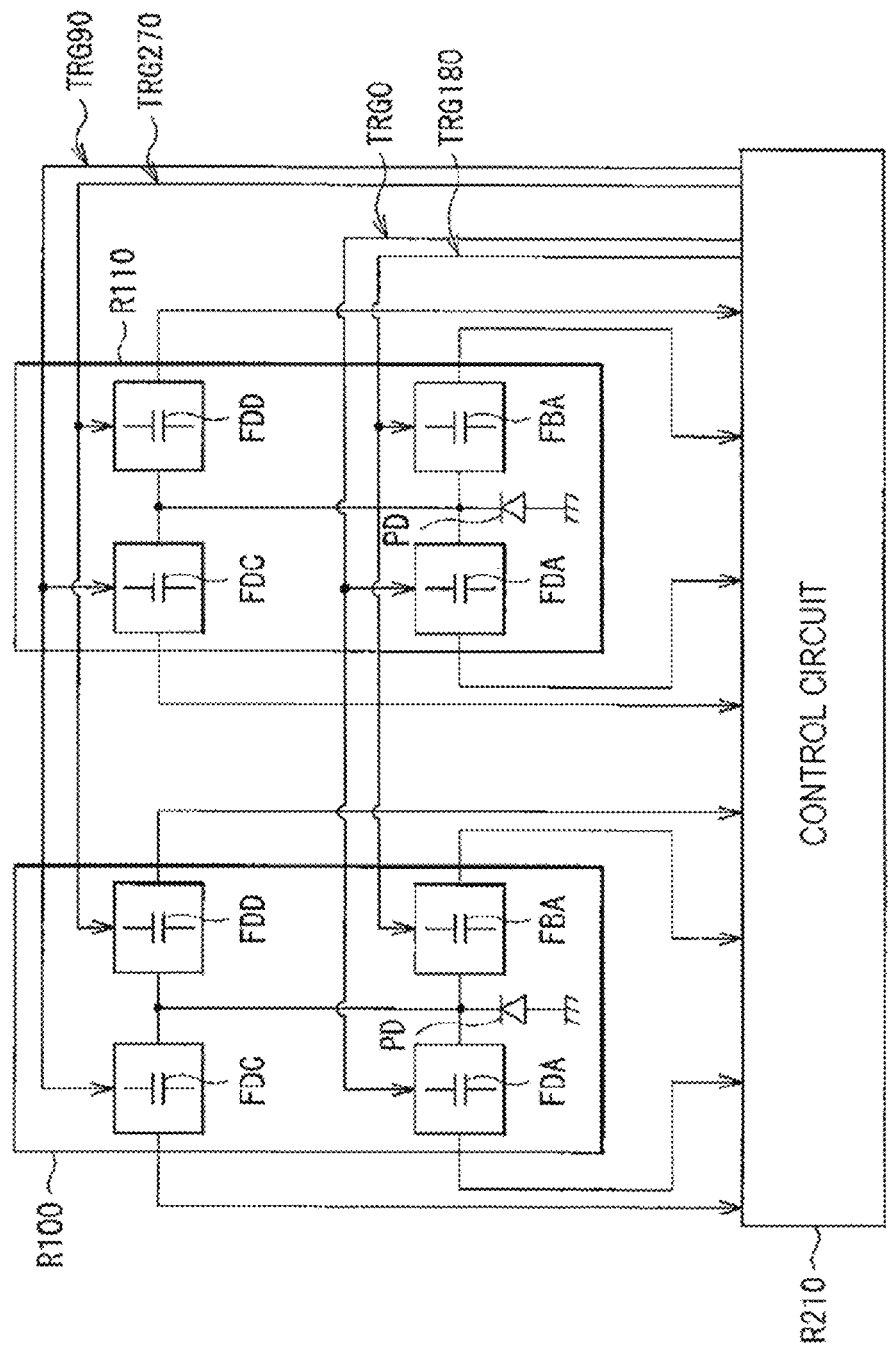
[Fig. 35]

DISTANCE SENSOR AND DISTANCE MEASUREMENT DEVICE

CROSS-REFERENCE TO RELATED APPLICATIONS

This application claims the benefit under 35 U.S.C. § 371 as a U.S. National Stage Entry of International Application No. PCT/JP2019/007282, filed in the Japanese Patent Office as a Receiving Office on Feb. 26, 2019, which claims priority to Japanese Priority Patent Application Number JP 2018-052257, filed in the Japanese Patent Office on Mar. 20, 2018, each of which is hereby incorporated by reference in its entirety.

TECHNICAL FIELD

The present disclosure relates to a distance sensor that detects a distance, and a distance measurement device that uses such a distance sensor.

BACKGROUND ART

For measuring the distance to an object to be measured, the time of flight (TOF) method is often used. The distance measurement device that uses the TOF method emits light, and detects the reflected light reflected by an object to be measured. Then, the distance measurement device detects the time difference between the emission timing of emitting light and the detection timing at of detecting the reflected light, thereby measuring the distance to the object to be measured (for example, Patent Literature 1).

CITATION LIST

Patent Literature

PTL 1: International Publication No. 2014-207983

SUMMARY

Technical Problem

Now, the distance measurement device is desired to be high in measurement accuracy, and expected to be further improved in measurement accuracy.

It is desirable to provide a distance sensor and a distance measurement device capable of enhancing measurement accuracy.

Solution to Problem

According to the present disclosure, there is provided a time of flight sensor. The time of flight sensor comprises a light receiving element, a first signal line and a second signal line, a first transistor in electrical communication with the light receiving element, the first transistor comprising a first gate in electrical communication with the first signal line, a second transistor in electrical communication with the light receiving element, the second transistor comprising a second gate in electrical communication with the second signal line, and a control circuit comprising at least one comparator, wherein the control circuit is in electrical communication with the first and second signal line.

According to the present disclosure, there is provided a distance measurement device. The distance measurement device comprises a light source and a light source control unit in communication with the light source. The distance measurement device comprises an imaging unit comprising a light receiving element, a first signal line and a second signal line, a first transistor in electrical communication with the light receiving element, the first transistor comprising a first gate in electrical communication with the first signal line, a second transistor in electrical communication with the light receiving element, the second transistor comprising a second gate in electrical communication with the second signal line, and a control circuit comprising at least one comparator, wherein the control circuit is in electrical communication with the first and second signal line. The distance measurement device comprises a control unit in communication with the light source control unit and the imaging unit.

Advantageous Effects of Invention

The distance sensor and distance measurement device according to one embodiment of the present disclosure is adapted to control the on/off operations of the plurality of first transistors, on the basis of the plurality of first detection voltages depending on voltages in the plurality of first accumulation units, thus making it possible to enhance the measurement accuracy. Note that the advantageous effect described herein is not to be considered necessarily limited, and any of the advantageous effects described in the present disclosure may be achieved.

BRIEF DESCRIPTION OF DRAWINGS

FIG. 1 is a block diagram illustrating a configuration example of a distance measurement device according to an embodiment of the present disclosure.

FIG. 2 is a block diagram illustrating a configuration example of an imaging unit illustrated in FIG. 1.

FIG. 3 is a circuit diagram illustrating a configuration example of a pixel array shown in FIG. 2.

FIG. 4 is an explanatory diagram illustrating a configuration example of the distance measurement device shown in FIG. 1.

FIG. 5 is a circuit diagram illustrating a configuration example of a reading unit shown in FIG. 2.

FIG. 6 is a timing chart showing an operation example of the distance measurement device shown in FIG. 1.

FIGS. 7A to 7L are a timing waveform diagram showing an example of an exposure operation according to the first embodiment.

FIGS. 8A to 8D are another timing waveform diagram showing an example of the exposure operation according to the first embodiment.

FIG. 9 is an explanatory diagram showing an example of the exposure operation according to the first embodiment.

FIGS. 10A to 10H are another timing waveform diagram showing an example of the exposure operation according to the first embodiment.

FIGS. 11A to 11G are another timing waveform diagram showing an example of a reading operation according to one embodiment.

FIG. 12 is a circuit diagram illustrating a configuration example of a pixel array according to a modification example of the first embodiment.

FIGS. 13A to 13M are a timing waveform diagram showing an example of an exposure operation according to the modification example of the first embodiment.

FIGS. 14A to 14J are another timing waveform diagram showing an example of the exposure operation according to the modification example of the first embodiment.

FIG. 15 is a circuit diagram illustrating a configuration example of a pixel array according to a second embodiment.

FIGS. 16A to 16L are a timing waveform diagram showing an example of an exposure operation according to the second embodiment.

FIGS. 17A to 17F are another timing waveform diagram showing an example of the exposure operation according to the second embodiment.

FIG. 18 is an explanatory diagram showing an example of the exposure operation according to the second embodiment.

FIG. 19 is another explanatory diagram showing an example of the exposure operation according to the second embodiment.

FIG. 20 is a circuit diagram illustrating a configuration example of a control circuit according to a modification example of the second embodiment.

FIG. 21 is a circuit diagram illustrating a configuration example of a control circuit according to another modification example of the second embodiment.

FIG. 22 is a circuit diagram illustrating a configuration example of a pixel array according to a third embodiment.

FIGS. 23A to 23K are a timing waveform diagram showing an example of an exposure operation according to the third embodiment.

FIGS. 24A to 24F are another timing waveform diagram showing an example of the exposure operation according to the third embodiment.

FIGS. 25A to 25E are an explanatory diagram showing an example of the exposure operation according to the third embodiment.

FIG. 26 is a circuit diagram illustrating a configuration example of a pixel array according to a modification example of the third embodiment.

FIGS. 27A to 27L are a timing waveform diagram showing an example of an exposure operation according to the modification example of the third embodiment.

FIGS. 28A to 28D are another timing waveform diagram showing an example of the exposure operation according to the modification example of the third embodiment.

FIGS. 29A to 29D are another timing waveform diagram showing an example of the exposure operation according to the modification example of the third embodiment.

FIG. 30 is a block diagram illustrating a configuration example of a main part of the distance measurement device according to the first embodiment.

FIG. 31 is a block diagram illustrating a configuration example of a main part of the distance measurement device according to the second embodiment.

FIG. 32 is a block diagram illustrating a configuration example of a main part of a distance measurement device according to a modification example.

FIG. 33 is a block diagram illustrating a configuration example of a main part of a distance measurement device according to another modification example.

FIG. 34 is a block diagram illustrating a configuration example of a main part of the distance measurement device according to the third embodiment.

FIG. 35 is a block diagram illustrating a configuration example of a main part of a distance measurement device according to another modification example.

DESCRIPTION OF EMBODIMENTS

Hereinafter, embodiments of the present disclosure will be described in detail with reference to the drawings. Note that the description will be given in the following order.

1. First Embodiment
2. Second Embodiment
3. Third Embodiment

1. First Embodiment

Configuration Example

FIG. 1 shows a configuration example of a distance measurement device (distance measurement device 1) according to an embodiment. The distance measurement device 1 is adapted to measure a distance D to an object to be measured by using a TOF method. The distance measurement device 1 includes a light source 11, a light source control unit 12, an optical system 13, an imaging unit 20, and a control unit 14.

The light source 11 is adapted to emit a light pulse L1 toward the object to be measured, and configured with the use of, for example, a light emitting diode (LED; Light Emitting Diode). The light source control unit 12 is adapted to control the operation of the light source 11, on the basis of an instruction from the control unit 14. The light source 11 is adapted to perform, on the basis of an instruction from the light source control unit 12, a light emitting operation of alternately repeating a light emission and a non-light emission, and thereby emit the light pulse L1.

The optical system 13 includes a lens that forms an image on an imaging surface S1 of the imaging unit 20. A light pulse (reflected light pulse L2) emitted from the light source 11 and reflected by the object to be measured is made incident onto the optical system 13.

The imaging unit 20 is adapted to, on the basis of an instruction from the control unit 14, receive the reflected light pulse L2, and thereby generate a range image PIC. Each of the plurality of pixel values included in the range image PIC is adapted to indicate a value (distance signal value) with respect to the distance D to the object to be measured. Then, the imaging unit 20 is adapted to output the acquired range image PIC as the image signal DATA.

The control unit 14 is adapted to supply control signals to the light source control unit 12 and the imaging unit 20 and controls the operation of these circuits, and thereby control the operation of the distance measurement device 1.

FIG. 2 shows a configuration example of the imaging unit 20. The imaging unit 20 includes a pixel array 21, a driving unit 22, a reading unit 30, a processing unit 24, and an imaging control unit 25.

The pixel array 21 has a plurality of imaging pixels P arranged in a matrix. Each imaging pixel P is adapted to output a pixel signal SIG corresponding to the amount of light received.

FIG. 3 shows a configuration example of the imaging pixel P. The pixel array 21 includes a plurality of control lines RSTL, a plurality of control lines SELL, a plurality of control lines SELCL, a plurality of control lines SETL, a plurality of clock signal lines CKL, a plurality of signal lines SGLA, and a plurality of signal lines SGLB. The control line RSTL is adapted to extend in the horizontal direction (the lateral direction in FIGS. 2 and 3), and to the control line RSTL, a control signal SRST is applied by the driving unit 22. The control line SELL is adapted to extend in the horizontal direction (the lateral direction in FIGS. 2 and 3), and to the control line SELL, a control signal SSEL is applied by the driving unit 22. The control line SELCL is adapted to extend in the horizontal direction (the lateral direction in FIGS. 2 and 3), and to the control line SELCL, a control signal SSELC is applied by the driving unit 22. The control line SETL is adapted to extend in the horizontal direction (the lateral direction in FIGS. 2 and 3), and to the control line SETL, a control signal SSET is applied by the driving unit 22. The clock signal line CKL is adapted to extend in the horizontal direction (lateral direction in FIGS. 2 and 3), and to the clock signal line CKL, a clock signal SCK is applied by the driving unit 22. The signal line SGLA is adapted to extend in the vertical direction (longitudinal direction in FIGS. 2 and 3), and transmit the pixel signal SIG to the reading unit 30. The signal line SGLB is adapted to extend in the vertical direction (longitudinal direction in FIGS. 2 and 3), and transmit the pixel signal SIG to the reading unit 30.

The imaging pixel P includes a pixel circuit P100 and a control circuit P200. The pixel circuit P100 is adapted to accumulate charge depending on the reflected light pulse L2. The control circuit P200 is adapted to control the exposure time in the pixel circuit P100.

The pixel circuit P100 has a photodiode PD, transistors TGA and TGB, floating diffusions FDA and FDB, transistors RST, RSTA and RSTB, transistors AMPA and AMPB, and transistors SELA and SELB. The transistors TGA, TGB, RST, RSTA, RSTB, AMPA, AMPB, SELA and SELB are N-type metal oxide semiconductor (MOS) transistors in this example.

The photodiode PD is a photoelectric conversion element that generates charge depending on the amount of light received. The photodiode PD has an anode grounded, and a cathode connected to sources of the transistors TGA, TGB and RST.

The transistor TGA has a gate supplied with a signal TRG0, a source connected to the cathode of the photodiode PD and the sources of the transistors TGB and RST, and a drain connected to the floating diffusion FDA, the source of the transistor RSTA, and the gate of the transistor AMPA. The floating diffusion FDA is adapted to accumulate the electric charge supplied from the photodiode PD via the transistor TGA and convert the accumulated electric charge into a voltage. The floating diffusion FDA is configured with the use of, for example, a diffusion layer formed on the surface of a semiconductor substrate. In FIG. 3, the floating diffusion FDA is shown with a symbol for a capacitive element. The transistor AMPA has a gate connected to the floating diffusion FDA, the drain of the transistor TGA, and the source of the transistor RSTA, a drain supplied with a power supply voltage VDD, and a source connected to the drain of the transistor SELA and the control circuit P200. The transistor SELA has a gate connected to the control line SELL, a drain connected to the source of the transistor AMPA and the control circuit P200, and a source connected to the signal line SGLA.

In the case of a transistor SELA2 (described later) in the control circuit P200 in an ON state and the transistor SELA in the pixel circuit P100 in an OFF state, the source of the transistor AMPA is connected to a current source 101A (described later) via the transistor SELA2. Thus, the transistor AMPA operates as a so-called source follower, and supplies, to the control circuit P200, a voltage VSLA depending on a voltage at the floating diffusion FDA. Furthermore, in the case of the transistor SELA in an ON state and the transistor SELA2 (described later) in the control circuit P200 in an OFF state, the source of the transistor AMPA is connected to a current source 33 (described later) of the reading unit 30 via the transistor SELA and the signal line SGLA. Thus, the transistor AMPA operates as a so-called source follower, and supplies, to the reading unit 30, the voltage VSLA depending on a voltage at the floating diffusion FDA.

The transistor TGB has a gate supplied with a signal TRG180, a source connected to the cathode of the photodiode PD and the sources of the transistors TGA and RST, and a drain connected to the floating diffusion FDB, the source of the transistor RSTB, and the gate of the transistor AMPB. The floating diffusion FDB is adapted to accumulate the electric charge supplied from the photodiode PD via the transistor TGB and convert the accumulated electric charge into a voltage. The floating diffusion FDB is configured with the use of, for example, a diffusion layer formed on the surface of a semiconductor substrate. In FIG. 3, the floating diffusion FDB is shown with a symbol for a capacitive element. The transistor AMPB has a gate connected to the floating diffusion FDB, the drain of the transistor TGB, and the source of the transistor RSTB, a drain supplied with a power supply voltage VDD, and a source connected to the drain of the transistor SELB and the control circuit P200. The transistor SELB has a gate connected to the control line SELL, a drain connected to the source of the transistor AMPB and the control circuit P200, and a source connected to the signal line SGLB.

In the case of a transistor SELB2 (described later) in the control circuit P200 in an ON state and the transistor SELB in the pixel circuit P100 in an OFF state, the source of the transistor AMPB is connected to a current source 101B (described later) via the transistor SELB2. Thus, the transistor AMPB operates as a so-called source follower, and supplies, to the control circuit P200, a voltage VSLB depending on a voltage at the floating diffusion FDB. Furthermore, in the case of the transistor SELB in an ON state and the transistor SELB2 (described later) in the control circuit P200 in an OFF state, the source of the transistor AMPB is connected to a current source 33 (described later) of the reading unit 30 via the transistor SELB and the signal line SGLB. Thus, the transistor AMPB operates as a so-called source follower, and supplies, to the reading unit 30, the voltage VSLB depending on a voltage at the floating diffusion FDB.

The transistor RST has a gate connected to the control line RSTL, a drain supplied with a voltage VRSTX, and a source connected to the cathode of the photodiode PD and the sources of the transistors TGA and TGB. The transistor RSTA has a gate connected to the control line RSTL, a drain supplied with a voltage VRST, and a source connected to the floating diffusion FDA, the drain of the transistor TGA, and the gate of the transistor AMPA. The transistor RSTB has a gate connected to the control line RSTL, a drain supplied with a voltage VRST, and a source connected to the floating diffusion FDB, the drain of the transistor TGB, and the gate of the transistor AMPB.

The control circuit P200 includes transistors SELA2 and SELB2, current sources 101A and 101B, comparators 102A and 102B, a NAND circuit 103, a latch 104, and AND circuits 105A and 105B. The transistors SELA 2 and SELB 2 are N-type MOS transistors.

The transistor SELA2 has a gate connected to the control line SELCL, a drain connected to the source of the transistor AMPA in the pixel circuit P100 and the drain of the transistor SELA therein, and a source connected to the current source 101A and the comparator 102A. The current source 101A is adapted to apply a current that has a predetermined current value from the source of the transistor SELA2 toward the ground. The comparator 102A including a positive input terminal, a negative input terminal, and an output terminal, is adapted to compare the voltage input to the positive input terminal and the voltage input to the negative input terminal and outputs the comparison result from the output terminal. The positive input terminal of the comparator 102A is connected to the source of the transistor SELA2, a voltage VREF is supplied to the negative input terminal, and the output terminal is connected to the NAND circuit 103. The thus configured comparator 102A is adapted to, in the case of the transistor SELA2 in an ON state, compare the voltage VSLA supplied from the pixel circuit P100 with the voltage VREF and thereby generate a signal COA.

The transistor SELB2 has a gate connected to the control line SELCL, a drain connected to the source of the transistor AMPB in the pixel circuit P100 and the drain of the transistor SELB therein, and a source connected to the current source 101B and the comparator 102B. The current source 101B is adapted to apply a current that has a predetermined current value from the source of the transistor SELB2 toward the ground. The comparator 102B including a positive input terminal, a negative input terminal, and an output terminal, is adapted to compare the voltage input to the positive input terminal and the voltage input to the negative input terminal and outputs the comparison result from the output terminal. The positive input terminal of the comparator 102B is connected to the source of the transistor SELB2, a voltage VREF is supplied to the negative input terminal, and the output terminal is connected to the NAND circuit 103. The thus configured comparator 102A is adapted to, in the case of the transistor SELB2 turned on, compare the voltage VSLB supplied from the pixel circuit P100 with the voltage VREF and thereby generate a signal COB.

The NAND circuit 103 including a first input terminal, a second input terminal, and an output terminal, is adapted to obtain the inverted logical product (NAND) of the logical value input to the first input terminal and the logical value input to the second input terminal, and output the obtained result from an output terminal. The first input terminal of the NAND circuit 103 is connected to the output terminal of the comparator 102A, the second input terminal is connected to the output terminal of the comparator 102B, and the output terminal is connected to the latch 104. The thus configured NAND circuit 103 is adapted to generate a control signal SRESET by obtaining the inverted logical product of the signals COA and COB.

The latch 104 is a so-called SR latch including a set terminal, a reset terminal, and an output terminal, the set terminal is connected to the control line SETL, the reset terminal is connected to the output terminal of the NAND circuit 103, and the output terminal is connected to the AND circuits 105A and 105B. The thus configured latch 104 is adapted to, on the basis of the control signal SSET supplied to the set terminal, set the value of a signal QO to "1" and hold the value, and on the basis of the control signal SRESET supplied to the reset terminal, resets the value of the signal QO to "0" and hold the value.

The AND circuit 105A is adapted to obtain the logical product (AND) of the signal QO and the clock signal SCK, and thereby generate the signal TRG0. The AND circuit 105B is adapted to obtain the logical product (AND) of the signal QO and the inverted signal of the clock signal SCK, and thereby generate the signal TRG180.

In the thus configured imaging pixel P, the control circuit P200 supplies, in an exposure operation D1, the signals TRG 0 and TRG 180 depending on the clock signal SCK respectively to the transistors TGA and TGB. Thus, the transistors TGA and TGB of the pixel circuit P100 are turned on and off so that any one of the transistors TGA and TGB is turned on, and the electric charges generated by the photodiode PD are selectively accumulated at the floating diffusion FDA and the floating diffusion FDB. The pixel circuit P100 supplies the voltage VSLA depending on the voltage at the floating diffusion FDA to the control circuit P200, and supplies the voltage VSLB depending on the voltage at the floating diffusion FDB to the control circuit P200. In a case where at least one of the voltage VSLA or VSLB reaches a predetermined voltage (voltage VREF), the control circuit P200 sets both the signals TRG0 and TRG180 to a lower level. Thus, the transistors TGA and TGB of the pixel circuit P100 are turned off, and subsequently, the photodiode PD and the floating diffusions FDA and FDB are electrically disconnected. In this way, the distance measurement device 1 individually sets the exposure time in each of the plurality of imaging pixels P. Then, thereafter, the pixel circuit P100 supplies the voltage VSLA and the voltage VSLB as pixel signals SIG to the reading unit 30 via the signal lines SGLA and SGLB.

FIG. 4 shows a configuration example of the distance measurement device 1. The distance measurement device 1 is configured with the use of, for example, two semiconductor substrates 201 and 202. The semiconductor substrates 201 and 202 are disposed to overlap with each other. The semiconductor substrate 201 is disposed closer to the imaging surface S1. The pixel circuit P100 of the imaging pixel P is formed on the semiconductor substrate 201, and the control circuit P200 thereof is formed on the semiconductor substrate 202. The pixel circuit P100 and the control circuit P200 are electrically connected to each other with the use of, for example, a Cu—Cu connection.

The driving unit 22 (FIG. 2) is adapted to drive the plurality of imaging pixels P, on the basis of an instruction from the imaging control unit 25. Specifically, the driving unit 22 is adapted to apply the control signal SRST to the plurality of control lines RSTL, apply the control signal SSEL to the plurality of control lines SELL, apply the control signal SSELC to the plurality of control signals SELCL, apply the control signal SSET to the plurality of control lines SETL, and apply the clock signal SCK to the plurality of clock signal lines CKL. Furthermore, the driving unit 22 also has the function of generating the voltages VREF, VRST, and VRSTX.

The reading unit 30 is adapted to perform AD conversion on the basis of the pixel signal SIG supplied from the pixel array 21 via the signal line SGL (signal line SGLA or SGLB) and thereby generate an image signal DATA0.

FIG. 4 shows a configuration example of the reading unit 30. Note that in addition to the reading unit 30, the processing unit 24 and the imaging control unit 25 are also depicted in FIG. 4. The reading unit 30 includes a plurality of Analog to Digital (AD) conversion units ADC (AD conversion units: ADC [0], ADC [1], ADC [2], . . . ), a plurality of switch units SW (switch units: SW [0], SW [1], SW [2], . . . ), and a bus wiring BUS.

The AD conversion unit ADC is adapted to perform AD conversion on the basis of the pixel signal SIG supplied from the pixel array 21, and thereby convert the voltage of the pixel signal SIG into a digital code CODE. The plurality of AD conversion units ADC is provided to correspond to the plurality of signal lines SGL. Specifically, the 0-th AD conversion unit ADC [0] is provided to correspond to the 0-th signal line SGL [0], the first AD conversion unit ADC[1] is provided to correspond to the first signal line SGL [1], and the second AD conversion unit ADC [2] is provided to correspond to the second signal line SGL [2].

The AD conversion unit ADC includes capacitive elements 31 and 32, a current source 33, a comparator 34, a counter 35, and a latch 36. The capacitive element 31 has one end supplied with a reference signal REF, and the other connected to a positive input terminal of the comparator 34. This reference signal REF is generated by a reference signal generating unit 26 (described later) of the imaging control unit 25, and as will be described later, adapted to have a so-called ramp waveform that gradually decreases in voltage level with the passage of time in two periods (conversion periods T1 and T2) for which AD conversion is performed. The capacitive element 32 has on end connected to the signal line SGL, and the other end connected to a negative input terminal of the comparator 34. The current source 33 is adapted to apply a current that has a predetermined current value from the signal line SGL to the ground. The comparator 34 is adapted to compare an input voltage at the positive input terminal with an input voltage at the negative input terminal and output the comparison result as a signal CMP. The reference signal REF is supplied to the positive input terminal of the comparator 34 via the capacitive element 31, and the pixel signal SIG is supplied to the negative input terminal via the capacitive element 32. The comparator 34 also has the function of making a zero adjustment for electrically connecting the positive input terminal and the negative input terminal. The counter 35 is adapted to perform a counting operation on the basis of the signal CMP supplied from the comparator 34, the clock signal CLK supplied from the imaging control unit 25, and a control signal CC. The latch 36 is adapted to hold the count value CNT obtained by the counter 35 as a digital code CODE that has a plurality of bits.

The switch unit SW supplies the digital code CODE output from the AD conversion unit ADC to the bus wiring BUS, on the basis of a control signal SSW supplied from the imaging control unit 25. The plurality of switch units SW is provided to correspond to the plurality of AD conversion units ADC. Specifically, the 0-th switch unit SW [0] is provided to correspond to the 0-th AD conversion unit ADC [0], the first switch unit SW [1] is provided to correspond to the first AD conversion unit ADC [1], and the second switch unit SW [2] is provided to correspond to the second AD conversion unit ADC [2].

The switch unit SW is, in this example, configured with the use of the same number of transistors as the bit length of the digital code CODE. These transistors are on-off controlled, on the basis of each bit (control signals SSW [0], SSW [1], SSW [2], . . . ) of the control signal SSW supplied from the imaging control unit 25. Specifically, for example, the 0-th switch unit SW [0] supplies, to the bus wiring BUS, the digital code CODE output from the 0-th AD conversion unit ADC [0], with each transistor turned on, on the basis of the control signal SSW [0]. Similarly, for example, the first switch unit SW [1] supplies, to the bus wiring BUS, the digital code CODE output from the first AD conversion unit ADC [1], with each transistor turned on, on the basis of the control signal SSW [1]. The same applies to the other switch units SW.

The bus wiring BUS including a plurality of lines, is adapted to transmit the digital code CODE output from the AD conversion unit ADC. The reading unit 30 is adapted to sequentially transfer, with the use of the bus wiring BUS, the plurality of digital codes CODE supplied from the AD conversion units ADC to the processing unit 24 as image signals DATA0 (data transfer operation).

The processing unit 24 is adapted to, on the basis of the image signals DATA0, generate the range image PIC in which each pixel value indicates a value for the distance D, and output the range image PIC as image signals DATA.

The imaging control unit 25 (FIG. 2) is adapted to supply control signals to the driving unit 22, the reading unit 30, and the processing unit 24 and control the operation of these circuits, and thereby control the operation of the imaging unit 20. Specifically, the imaging control unit 25, for example, supplies a control signal to the driving unit 22, thereby controlling the driving unit 22 so as to drive the plurality of imaging pixels P in the pixel array 21. Furthermore, the imaging control unit 25 supplies the reference signal REF, the clock signal CLK, the control signal CC, and the control signal SSW (control signals SSW [0], SSW [1], SSW [2], . . . ) to the reading unit 30, thereby controlling the reading unit 30 so as to generate the image signal DATA0 on the basis of the pixel signal SIG. Furthermore, the imaging control unit 25 is adapted to supply a control signal to the processing unit 24, and thereby control the operation of the processing unit 24.

The imaging control unit 25 includes the reference signal generating unit 26. The reference signal generating unit 26 is adapted to generate the reference signal REF. This reference signal REF is adapted to have a so-called ramp waveform that gradually decreases in voltage level with the passage of time in the two periods (conversion periods T1 and T2) for which AD conversion is performed. Then, the reference signal generating unit 26 is adapted to supply the generated reference signal REF to the AD conversion unit ADC of the reading unit 30.

The control unit 14 (FIG. 1) supplies control signals to the light source control unit 12 and the imaging unit 20, and controls the operation of these circuits to control the operation of the distance measurement device 1.

Here, the photodiode PD corresponds to a specific example of the "first light receiving element" according to the present disclosure. The floating diffusions FDA and FDB correspond to a specific example of the "plurality of first accumulation units" according to the present disclosure. The transistors TGA and TGB correspond to a specific example of the "plurality of first transistors" according to the present disclosure. The transistors AMPA, SELA, AMPB, and SELB correspond to a specific example of the "plurality of first output units" according to the present disclosure. The control circuit P200 corresponds to a specific example of the "first control unit" according to the present disclosure. The comparators 102A and 102B and the NAND circuit 103 correspond to a specific example of the "detection unit" according to the present disclosure. The latch 104 corresponds to a specific example of the "holding unit" according to the present disclosure. The AND circuits 105A and 105B correspond to a specific example of the "driving unit" according to the present disclosure.

Operation and Action

Next, the operation and action of the distance measurement device 1 according to the present embodiment will be described.

(Overall Operation Outline)

First, the outline of the overall operation of the distance measurement device 1 will be described with reference to FIGS. 1 to 3. The light source control unit 12 (FIG. 1) controls the operation of the light source 11, on the basis of an instruction from the control unit 14. The light source 11 performs the light emitting operation of alternately repeating a light emission and a non-light emission, on the basis of an instruction from the light source control unit 12, thereby emitting the light pulse L1. The imaging unit 20 receives the reflected light pulse L2 depending on the light pulse L1 emitted from the light source 11, on the basis of an instruction from the control unit 14, thereby generating the range image PIC. Specifically, the plurality of imaging pixels P in the pixel array 21 of the imaging unit 20 receives the reflected light pulse L2, thereby generating pixel signals SIG. The reading unit 30 performs AD conversion on the basis of the pixel signals SIG supplied from the pixel array 21, thereby generating image signals DATA0. The processing unit 24 generates, on the basis of the image signals DATA0, the range image PIC in which each pixel value indicates a value for the distance D, and outputs the range image PIC as image signals DATA.

(Detailed Operation)

The distance measurement devices 1 first performs the exposure operation D1, thereby accumulating electric charges at the floating diffusions FDA and FDB in each of the plurality of imaging pixels P. Then, the distance measurement device 1 performs a reading operation D2, and then performs the AD conversion on the basis of the pixel signals SIG supplied via the signal lines SGL from the pixel array 21, or from the plurality of imaging pixels P, thereby generating the image signals DATA0. Then, on the basis of the image signals DATA0, the distance measurement device 1 generates the range image PIC in which each pixel value indicates a value for the distance D. This operation will be described in detail below.

FIG. 6 shows an example of the exposure operation D1 and the reading operation D2 in the distance measurement device 1. In FIG. 6 herein, the upper end represents the uppermost part of the pixel array 21, and the lower end represents the lowermost part of the pixel array 21.

The distance measurement device 1 performs the exposure operation D1 in the period from timing t1 to timing t2. Specifically, the light source control unit 12 controls the operation of the light source 11, and the light source 11 performs the light emitting operation of alternately repeating a light emission and a non-light emission, thereby emitting the light pulse L1. Furthermore, the driving unit 22 drives the plurality of imaging pixels P in the pixel array 21, and the plurality of imaging pixels P receives the reflected light pulses L2 depending on the light pulses L1. In this exposure operation D1, the distance measurement device 1 individually sets the exposure time in each of the plurality of imaging pixels P.

Then, the distance measurement device 1 performs the reading operation D2 in the period from timing t2 to timing t3. Specifically, the driving unit 22 sequentially drives the plurality of imaging pixels P in the pixel array 21 on a pixel line basis, and the plurality of imaging pixels P supplies the pixel signals SIG via the signal lines SGL (the signal lines SGLA and SGLB) to the reading unit 30. Then, the reading unit 30 performs the AD conversion on the basis of the pixel signals SIG, thereby generating the image signals DATA 0.

Thereafter, the distance measurement device 1 repeats the exposure operation D1 and the reading operation D2. On the basis of the image signals DATA0, the processing unit 24 generates the range image PIC in which each pixel value indicates a value for the distance D.

(Exposure Operation D1)

Next, the exposure operation D1 in the distance measurement device 1 will be described in detail. With attention paid to a certain imaging pixel P1 among the plurality of imaging pixels P, the exposure operation D1 associated with the imaging pixel P1 will be described in detail below.

FIGS. 7A to 7L show an example of the exposure operation D1, where FIG. 7A shows the waveform of the light pulse L1 emitted from the light source 11, FIG. 7B shows the waveform of the control signal SRST, FIG. 7C shows the waveform of the voltage VSLA, FIG. 7D shows the waveform of the voltage VSLB, FIG. 7E shows the waveform of the signal COA, FIG. 7F shows the waveform of the signal COB, FIG. 7G shows the waveform of the control signal SSET, FIG. 7H shows the waveform of the control signal SRESET, FIG. 7I shows the waveform of the signal QO, FIG. 7J shows the waveform of the clock signal SCK, FIG. 7K shows the waveform of the signal TRG0, and FIG. 7L shows the waveform of the signal TRG180.

In this exposure operation D1, the driving unit 22 sets the voltage of the control signal SSEL to a lower level, and sets the voltage of the control signal SSELC to a higher level. Thus, the transistors SELA and SELB of the pixel circuit P100 are turned off, and the transistors SELA2 and SELB2 of the control circuit P200 are turned on. Thus, the pixel circuit P100 supplies the voltages VSLA and VSLB to the control circuit P200, and the control circuit P200 generates the signals TRG0 and TRG180 on the basis of the voltages VSLA and VSLB, and supplies these signals TRG0 and TRG180 to the pixel circuit P100. Thus, the imaging pixel P1 individually sets the exposure time on the basis of the voltages VSLA and VSLB. This operation will be described in detail below.

Prior to timing t12, the driving unit 22 sets the voltage of the control signal SRST to a higher level (FIG. 7B). Thus, the transistors RST, RSTA and RSTB of the pixel circuit P100 are turned on, the voltage VRSTX is supplied to the cathode of the photodiode PD, and the voltage VRST is supplied to the floating diffusions FDA and FDB. Thus, the voltages VSLA and VSLB output by the pixel circuit P100 are set to the voltage V1 depending on the voltage VRST (FIGS. 7C and 7D).

Next, at timing t11, the driving unit 22 changes the voltage of the control signal SSET from the lower level to the higher level (FIG. 7G). Thus, the latch 104 is set, and the latch 104 changes the voltage of the signal QO from the lower level to the higher level (FIG. 7I). Accordingly, the AND circuit 105A starts to output the clock signal SCK as the signal TRG0, and the AND circuit 105B starts to output the inverted signal of the clock signal SCK as the signal TRG180 (FIGS. 7J to 7L).

Next, at timing t12, the driving unit 22 changes the voltage of the control signal SSET from the higher level to the lower level (FIG. 7G). Furthermore, at the timing t12, the driving unit 22 changes the voltage of the control signal SRST from the higher level to the lower level (FIG. 7B). Thus, the transistors RST, RSTA, and RSTB of the pixel circuit P100 are both turned off. Furthermore, the light source 11 starts, at this timing t12, the light emitting operation of alternately repeating a light emission and a non-light emission (FIG. 7A). As shown in FIGS. 7A and 7J, the frequency of the light emitting operation of the light source 11 is equal to the frequency of the clock signal SCK, and the phase of the light pulse L1 and the phase of the clock signal SCK coincide with each other. In other words, the control unit 14 supplies a control signal to the imaging control unit 25 of the imaging unit 20, and the imaging control unit 25 instructs the driving unit 22 to generate the clock signal SCK and the control signal SRST. Furthermore, the control unit 14 supplies a control signal to the light source control unit 12, and the light source control unit 12 instructs the light source 11 to start the light emitting operation of alternately repeating a light emission and a non-light emission. Thus, in the distance measurement device 1, the phase of the light pulse L1 and the phase of the clock signal SCK can be adapted to coincide with each other. As a result, the phase of the light pulse L1 and the phases of the signals TRG0 and TRG180 are synchronized.

In this manner, an exposure period TB starts at this timing t12. In this exposure period TB, the photodiode PD generates electric charges, on the basis of the reflected light pulse L2 depending on the light pulse L1. The transistor TGA of the pixel circuit P100 is turned on and off on the basis of the signal TRG0, and the transistor TGB is turned on and off on the basis of the signal TRG180. In other words, one of the transistors TRA and TRB is turned on. Thus, the electric charges generated by the photodiode PD are selectively accumulated at the floating diffusion FDA and the floating diffusion FDB.

FIGS. 8A to 8D show an operation example of the imaging pixel P1, where FIG. 8A shows the waveform of the light pulse L1, FIG. 8B shows the waveform of the reflected light pulse L2, FIG. 8C shows the waveform of the signal TRG0, and FIG. 8D shows the waveform of the signal TRG180. In this example, at timing t21, the light pulse L1 rises, the signal TRG0 rises, and the signal TRG 180 falls. Then, at timing t23 at which the phase is delayed by "π" from the timing t21, the light pulse L1 falls, the signal TRG0 falls, and the signal TRG180 rises. Similarly, at timing t25 at which the phase is delayed by "π" from the timing t23, the light pulse L1 rises, the signal TRG0 rises, and the signal TRG180 falls. Then, at timing t26 at which the phase is delayed by "π" from the timing t25, the light pulse L1 falls, the signal TRG0 falls, and the signal TRG180 rises.

The phase of the reflected light pulse L2 is shifted by a phase$\varphi$ from the phase of the light pulse L1 (FIG. 8B). This phase$\varphi$ corresponds to the distance D from the distance measurement device 1 to the object to be measured. In this example, the reflected light pulse L2 rises at the timing t22 delayed by the time corresponding to the phase$\varphi$ from the timing t21, and the reflected light pulse L2 falls at the timing t24 delayed by the time corresponding to the phase$\varphi$ from the timing t23. The photodiode PD of the pixel circuit P100 generates electric charges in the period from the timing t22 to the timing t24, on the basis of the reflected light pulse L2.

The transistor TGA transfers the electric charge generated by the photodiode PD to the floating diffusion FDA in the period with the signal TRG0 at the higher level, and the transistor TGB transfers the electric charge generated by the photodiode PD to the floating diffusion FDB in the period with the signal TRG180 at the higher level. In other words, the transistor TGA transfers the electric charge generated by the photodiode PD to the floating diffusion FDA in the period from the timing t22 to the timing t23, and the transistor TGB transfers the electric charge generated by the photodiode PD to the floating diffusion FDB in the period from the timing t23 to the timing t24. Thus, an electric charge S0 is accumulated at the floating diffusion FDA in the period from the timing t22 to the timing t23, and an electric charge S180 is accumulated at the floating diffusion FDB in the period from the timing t23 to the timing t24.

The signal I($\varphi$) (=S0−S180) which is the difference between the electric charge S0 and the electric charge S180 changes depending on the phase$\varphi$.

FIG. 9 shows an example of the signal I($\varphi$). Here, the signal I ($\varphi$) is normalized. In a case where the phase$\varphi$ is "0" (zero), the signal I($\varphi$) is "1". Then, when the phase$\varphi$ changes from "0" (zero) to "π", the signal I($\varphi$) decreases in a linear manner to change from "1" to "−1". In this way, the signal I($\varphi$) changes depending on the phase$\varphi$. In other words, the signal I($\varphi$) changes depending on the distance D from the distance measurement device 1 to the object to be measured.

As shown in FIGS. 7A to 7L and 8A to 8D, the imaging pixel P1 repeats the operations at the timing t21 to the timing t25. Thus, the electric charge S0 is repeatedly accumulated at the floating diffusion FDA, and the electric charge S180 is repeatedly accumulated at the floating diffusion FDB. Thus, the voltages of the floating diffusions FDA and FDB are gradually decreased. Accordingly, the voltages VSLA and VSLB are also gradually decreased (FIGS. 7C and 7D). The amount of change in voltage at the voltage VSLA corresponds to the electric charge S0, and the amount of change in voltage at the voltage VSLB corresponds to the electric charge S180. In this example, the degree of change in voltage VSLA is higher than the degree of change in voltage VSLB.

Since the voltages VSLA and VSLB are higher than the voltage VREF in the period up to the timing t13, the comparator 103A keeps the voltage of the signal COA at a higher level (FIG. 7E), and the comparator 103B keeps the voltage of the signal COB at a higher level (FIG. 7F). Therefore, the NAND circuit 103 keeps the voltage of the control signal SRESET at a lower level (FIG. 7H).

Then, at the timing t13, the voltage VSLA reaches the voltage VREF. Thus, the comparator 102A changes the voltage of the signal COA from the higher level to the lower level (FIG. 7E). Accordingly, the NAND circuit 103 changes the voltage of the control signal SRESET from the lower level to a higher level (FIG. 7H). Thus, the latch 104 is reset, and the latch 104 changes the voltage of the signal QO from the higher level to the lower level (FIG. 7I). Accordingly, the AND circuit 105A sets the voltage of the signal TRG0 to a lower level, and the AND circuit 105B sets the voltage of the signal TRG180 to a lower level (FIGS. 7K and 7L). Thus, the transistors TGA and TGB are turned off. As a result, subsequently, the photodiode PD and the floating diffusions FDA and FDB are electrically disconnected. In this manner, the exposure period TB ends at the timing t13.

In this example, at the timing t13, the voltage VSLA reaches the voltage VREF, and the exposure period TB ends, but in a case where the degrees of change in voltages VSLA and VSLB are lower than the example in FIGS. 7A to 7L, the exposure period TB ends at later timing. In the distance measurement device 1, as shown in FIGS. 7A to 7L, there is provided an exposable period TA (the timing t12 to the timing t14), and in a case where at least one of the voltage VSLA or VSLB reaches the voltage VREF within the period of the exposable period TA, the exposure period TB ends at the reach timing. In a case where neither the voltages VSLA nor VSLB reaches the voltage VREF within the period of the exposable period TA, for example, the latch 104 is reset at the timing t14 at which the exposable period TA ends, thereby setting the voltages of the signals TRG0 and TRG180 to the lower level, and terminating the exposure period TB. The time length of the exposable period TA corresponds to, for example, the time length of the timing t1 to the timing t2 in FIG. 6, for example.

Then, at the timing t14, the light source 11 terminates the light emission operation (FIG. 7A).

Next, the operation of the two imaging pixels P1 and P2 among the plurality of imaging pixels P will be described. The imaging pixel P1 receives the reflected light pulse L2 reflected at a position close to the distance measurement device 1, and the imaging pixel P2 receives the reflected light pulse L2 reflected at a position far from the distance measurement device 1.

FIGS. 10A to 10H show an example of the operation in the two imaging pixels P1 and P2, where FIG. 10A shows the waveform of the control signal SRST supplied to the imaging pixels P1 and P2, FIG. 10B shows the waveform of the control signal SSET supplied to the imaging pixels P1 and P2, FIG. 10C shows the waveform of the voltage VSLA (voltage VSLA1) at the imaging pixel P1, FIG. 10D shows the waveform of the voltage VSLB (voltage VSLB1) at the imaging pixel P1, FIG. 10E shows the waveform of the control signal SRESET (control signal SRESET1) at the imaging pixel P1, FIG. 10F shows the waveform of the voltage VSLA (voltage VSLA2) at the imaging pixel P2, FIG. 10G shows the waveform of the voltage VSLB (voltage VSLB2) at the imaging pixel P2, and FIG. 10H shows the waveform of the control signal SRESET (control signal SRESET2) at the imaging pixel P2.

At the timing t12, the exposure period TB1 in the imaging pixel P1 starts, and the exposure period TB2 in the imaging pixel P2 starts.

Then, in this example, at timing t18, the voltage VSLA1 at the imaging pixel P1 reaches the voltage VREF, and at timing t19 after the timing t18, the voltage VSLA2 at the imaging pixel P2 reaches the voltage VREF. In other words, since the imaging pixel P1 receives the reflected light pulse L2 reflected at a position close to the distance measurement device 1, the degrees of change in voltages VSLA1 and VSLB1 are high because of the large amount of received. On the other hand, since the imaging pixel P2 receives the reflected light pulse L2 reflected at a position far from the distance measurement device 1, the degrees of change in voltages VSLA2 and VSLB2 are low because the small amount of light received. Thus, in this example, the voltage VSLA1 at the imaging pixel P1 reaches the voltage VREF earlier than the voltage VSLA2 at the imaging pixel P2.

In this manner, the exposure period TB1 at the imaging pixel P1 ends at the timing t18, and the exposure period TB2 at the imaging pixel P2 ends at the timing t19.

As just described, in the distance measurement device 1, the exposure time is individually set in each of the plurality of imaging pixels P.

As just described, in the distance measurement device 1, the control circuit P200 is provided for each of the plurality of imaging pixels P, and the control circuit P200 is adapted to generate, on the basis of the voltages VSLA and VSLB supplied from the pixel circuit P100, the signals TRG0 and TRG180 to be supplied to the pixel circuit P100. Thus, in the distance measurement device 1, the exposure time can be individually set in each of the plurality of imaging pixels P, and the measurement accuracy in measuring the distance D can be thus enhanced. In other words, for example, in a case where the exposure time is made equal for all of the imaging pixels P, the amount of light received is increased in the imaging pixel which receives the reflected light pulse L2 reflected at the position close to the distance measurement device 1, and there is thus a possibility that the signal level may be saturated, and the amount of light received is reduced in the imaging pixel which receives the reflected light pulse L2 reflected at the position far from the distance measurement device 1, and there is thus a possibility that the signal noise ratio may be decreased, for example. In this case, the measurement accuracy in measuring the distance D is decreased. On the other hand, in the distance measurement device 1, the control circuit P200 of the imaging pixel P is adapted to generate the signals TRG0 and TRG180 on the basis of the voltages VSLA and VSLB supplied from the pixel circuit P100, and the exposure time can be set individually in the plurality of imaging pixels P. Therefore, for example, the exposure time can be made shorter in the imaging pixel P1 which receives the reflected light pulse L2 reflected at the position close to the distance measurement device 1, whereas the exposure time can be made longer in the imaging pixel P2 which receives the reflected light pulse L2 reflected at the position far from the distance measurement device 1. As a result, the distance measurement device 1 can enhance the measurement accuracy.

(Reading Operation D2)

Next, the reading operation D2 in the distance measurement device 1 will be described in detail. With attention paid to a certain imaging pixel P1 among the plurality of imaging pixels P, the reading operation D2 associated with the imaging pixel P1 will be described in detail below.

FIGS. 11A to 11G show an example of the exposure operation D1, where FIG. 11A shows the waveform of the control signal SSEL, FIG. 11B shows the waveform of the control signal SRST, FIG. 11C shows the waveform of the reference signal REF, FIG. 11D shows the waveform of the pixel signal SIG (voltage VSLA), FIG. 11E shows the waveform of the signal CMP output from the comparator 34 of the AD converter ADC, FIG. 11F shows the waveform of the clock signal CLK, and FIG. 11G shows the count value CNT in the counter 35 of the AD converter ADC. Here, in FIGS. 11C and 11D, the waveforms of the respective signals are indicated on the same voltage axis. The reference signal REF in FIG. 11C shows the waveform at the positive input terminal of the comparator 34, and the pixel signal SIG in FIG. 11D shows the waveform at the negative input terminal of the comparator 34.

In this reading operation D2, the driving unit 22 sets the voltage of the control signal SSEL to a higher level, and sets the voltage of the control signal SSELC to a lower level. Thus, the transistors SELA and SELB of the pixel circuit P100 are turned on, and the transistors SELA2 and SELB2 of the control circuit P200 are turned off. Thus, the pixel circuit P100 supplies the voltages VSLA and VSLB to the reading unit 30. Then, in the conversion period T1, the AD conversion unit ADC of the reading unit 30 performs the AD conversion on the basis of the pixel signal SIG (voltage VSLA) output by the imaging pixel P1. Then, the driving unit 22 performs a reset operation for the imaging pixel P1, and the AD conversion unit ADC performs the AD conversion on the basis of the pixel signal SIG output by the imaging pixel P1 in the conversion period T2. This operation will be described in detail below. Note that the operation based on the voltage VSLA will be described in this example, but the same applies to the voltage VSLB.

First, at timing t31, the driving unit 22 changes the voltage of the control signal SSEL from the lower level to the higher level (FIG. 11A). Thus, in the imaging pixel P1, the transistors SELA and SELB are turned on, and the imaging pixel P1 is electrically connected to the signal lines SGLA and SGLB. Thus, the imaging pixel P1 supplies the voltage VSLA as the pixel signal SIG to the reading unit 30 via the signal line SGLA, and supplies the voltage VSLB as the pixel signal SIG to the reading unit 30 via the signal line SGLB.

Next, in the period from timing t32 to timing t34 (conversion period T1), the AD conversion unit ADC performs the AD conversion on the basis of this pixel signal SIG. Specifically, at the timing t32, the imaging control unit 25 starts the generation of the clock signal CLK (FIG. 11F), and at the same time, the reference signal generating unit 26 starts to decrease the voltage of the reference signal REF from a voltage V2 with a predetermined degree of change (FIG. 11C). Accordingly, the counter 35 of the AD conversion unit ADC starts the counting operation so as to reduce the count value CNT from "0" (FIG. 11G).

Then, at the timing t33, the voltage of the reference signal REF falls below the voltage of the pixel signal SIG (FIGS. 11C and 11D). Accordingly, the comparator 34 of the AD conversion unit ADC changes the voltage of the signal CMP from a higher level to a lower level (FIG. 11E), and as a result, the counter 35 stops the counting operation (FIG. 11G). The count value CNT in this case is a negative value "−CNT1".

Next, at the timing t34, the imaging control unit 25 stops the generation of the clock signal CLK with the end of the conversion period T1 (FIG. 11F). At the same time, the reference signal generating unit 26 stops the voltage change of the reference signal REF, and changes the voltage of the reference signal REF to the voltage V2 at subsequent timing t35 (FIG. 11C). Accordingly, the voltage of the reference signal REF exceeds the voltage of the pixel signal SIG (FIGS. 11C and 11D), and the comparator 34 of the AD converter ADC thus changes the voltage of the signal CMP from the lower level to the higher level (FIG. 11E).

Next, at timing t36, the counter 35 of the AD conversion unit ADC inverts the polarity of the count value CNT, on the basis of the control signal CC (FIG. 11G). Thus, the count value CNT becomes a positive value "CNT 1".

Next, at timing t37, the driving unit 22 changes the voltage of the control signal SRST from the lower level to the higher level (FIG. 11B). Thus, in the pixel circuit P100 of the imaging pixel P1, the transistors RST, RSTA and RSTB are turned on, the voltage VRSTX is supplied to the cathode of the photodiode PD, and the voltage VRST is supplied to the floating diffusions FDA and FDB (reset operation). Accordingly, the voltage (voltage VSLA) of the pixel signal SIG rises toward the voltage V1 depending on the voltage VRST.

Next, at the timing t37, the driving unit 22 changes the voltage of the control signal SRST from the higher level to the lower level (FIG. 11B). Thus, in the pixel circuit P100 of the imaging pixel P1, the transistors RST, RSTA, and RSTB are turned off.

Next, in the period from timing t39 to timing t41 (conversion period T2), the AD conversion unit ADC performs the AD conversion on the basis of this pixel signal SIG. Specifically, at the timing t39, the imaging control unit 25 starts the generation of the clock signal CLK (FIG. 11F), and at the same time, the reference signal generating unit 26 starts to decrease the voltage of the reference signal REF from a voltage V2 with a predetermined degree of change (FIG. 11C). Accordingly, the counter 35 of the AD conversion unit ADC starts the counting operation so as to reduce the count value (FIG. 11G).

Then, at the timing t40, the voltage of the reference signal REF falls below the voltage of the pixel signal SIG (FIGS. 11C and 11D). Accordingly, the comparator 34 of the AD conversion unit ADC changes the voltage of the signal CMP from a higher level to a lower level (FIG. 11E), and as a result, the counter 35 stops the counting operation (FIG. 11G). In the period from the timing t39 to the timing t40, the count value CNT is decreased by a value CNT2. This value CNT 2 corresponds to the voltage VSLA after the imaging pixel P is reset. Then, the latch 36 of the AD conversion unit ADC outputs, as the digital code CODE, the count value CNT (CNT1-CNT2) in the counter 35.

Next, at the timing t41, the imaging control unit 25 stops the generation of the clock signal CLK with the end of the conversion period T2 (FIG. 11F). At the same time, the reference signal generating unit 26 stops the voltage change of the reference signal REF, and changes the voltage of the reference signal REF to the voltage V2 at subsequent timing t42 (FIG. 11C). Accordingly, the voltage of the reference signal REF exceeds the voltage of the pixel signal SIG (FIGS. 11C and 11D), and the comparator 34 of the AD converter ADC thus changes the voltage of the signal CMP from the lower level to the higher level (FIG. 11E).

Then, at timing t43, the driving unit 22 changes the voltage of the control signal SSEL from the higher level to the lower level (FIG. 11A). Thus, in the imaging pixel P1, the transistors SELA and SELB are turned off, and the imaging pixel P1 is electrically disconnected from the signal lines SGLA and SGLB.

As just described, the distance measurement device 1 is adapted to perform the counting operation on the basis of the pixel signal SIG (voltage VSLA) supplied from the imaging pixel P1 in the conversion period T1, invert the polarity of the count value CNT, and then perform the counting operation on the basis of the pixel signal (voltage VSLA) supplied from the imaging pixel P1 reset in the conversion period T2. Since the distance measurement device 1 is adapted to perform such a so-called double data sampling (DDS), the noise component included in the pixel signal SIG can be removed, and as a result, the measurement accuracy in measuring the distance D can be enhanced.

The reading unit 30 performs, on the basis of voltage VSLA of the imaging pixel P1, the reading operation D2 as just described, thereby generating the digital code CODE (digital code CODEA), and on the basis of the voltage VSLB, similarly performs the reading operation D2, thereby generating the digital code CODE (digital code CODEB). Then, the reading unit 30 supplies the image signal DATA0 including the digital codes CODEA and CODEB to the processing unit 24.

The processing unit 24 obtains the pixel value in the imaging pixel P1 on the basis of the digital codes CODEA and CODEB included in the image signal DATA0.

In other words, since the voltage VSLA is a voltage corresponding to the electric charge S0 shown in FIGS. 8A to 8D, the digital code CODEA is a code corresponding to this electric charge S0. Similarly, since the voltage VSLB is a voltage corresponding to the electric charge S180 shown in FIGS. 8A to 8D, the digital code CODEB is a code corresponding to this electric charge S180. Therefore, the value obtained by subtracting the value indicated by the digital code CODEB from the value indicated by the digital code CODEA corresponds to the signal I($\varphi$), which corresponds to the distance D from the distance measurement device 1 to the object to be measured.

The processing unit 24 can, on the basis of the digital codes CODEA and CODEB, obtain values for the distance D in the imaging pixel P1. The processing unit 24 performs such processing for a plurality of imaging pixels P, thereby generating a range image PIC. Then, the processing unit 24 outputs the range image PIC as the image signal DATA.

Advantageous Effect

As described above, according to the present embodiment, the control circuit is provided for each of the plurality of imaging pixels, and on the basis of the voltages VSLA and VSLB supplied from the pixel circuit, the control circuit generates the signals TRG0 and TRG180 supplied to the pixel circuit. Thus, since the exposure time can be individually set in each of the plurality of imaging pixels, the measurement accuracy in distance measurement can be enhanced.

Modification Example 1

According to the embodiment mentioned above, the pixel circuit P100 is configured as shown in FIG. 3, but the disclosure is not to be considered limited to this configuration. A distance measurement device 1A according to the present modification example will be described below. The distance measurement device 1A includes an imaging unit 20A. The imaging unit 20A includes a pixel array 21A and a driving unit 22A.

FIG. 12 shows a configuration example of an imaging pixel P in the pixel array 21A. The pixel array 21A includes a plurality of control lines CMRL, a plurality of control lines ISWL, a plurality of control lines OFGL, and a plurality of control lines CTLL. The control line CMRL is adapted to extend in the horizontal direction (the lateral direction in FIG. 12), and to the control line CMRL, a control signal SCMR is applied by the driving unit 22A. The control line ISWL is adapted to extend in the horizontal direction (the lateral direction in FIG. 12), and to the control line ISWL, a control signal SISW is applied by the driving unit 22A. The control line OFGL is adapted to extend in the horizontal direction (the lateral direction in FIG. 12), and to the control line OFGL, a control signal SOFG is applied by the driving unit 22A. The control line CTLL is adapted to extend in the horizontal direction (the lateral direction in FIG. 12), and to the control line CTLL, a control signal SCTL is applied by the driving unit 22A. The imaging pixel P includes a pixel circuit P100A and a control circuit P200A.

The pixel circuit P100A includes transistors CMR, RSTA, RSTB, OFG, ISWA, and ISWB and capacitive elements CAPA and CAPB. In this example, the transistors CMR, RSTA, RSTB, OFG, ISWA, and ISWB are N-type MOS transistors.

The transistor CMR has a drain supplied with a voltage VDDX, a gate connected to the control line CMRL, and a source connected to a node FDO. The transistor RSTA has a drain supplied with a voltage FBL, a gate connected to control line RSTL, and a source connected to a drain of the transistor ISWA and one terminal of the capacitive element CAPA. The transistor RSTB has a drain supplied with the voltage FBL, a gate connected to control line RSTL, and a source connected to a drain of the transistor ISWB and one terminal of the capacitive element CAPB. The transistor OFG has a drain connected to the node FDO, a gate connected to the control line OFGL, and a source connected to a photodiode PD and sources of transistors TGA and TGB. The transistor ISWA has a drain connected to a source of the transistor RSTA and one end of the capacitor CAPA, a gate connected to the control line ISWL, and a source connected to a floating diffusion FDA, a drain of the transistor TGA, and a gate of the transistor AMPA. The transistor ISWB has a drain connected to a source of the transistor RSTB and one end of the capacitor CAPB, a gate connected to the control line ISWL, and a source connected to a floating diffusion FDB, a drain of the transistor TGB, and a gate of the transistor AMPB.

The capacitive element CAPA has one end connected to the source of the transistor RSTA and the drain of the transistor ISWA, and the other end connected to the node FDO. The capacitive element CAPB has one end connected to the source of the transistor RSTB and the drain of the transistor ISWB, and the other end connected to the node FDO.

The control circuit P200A has AND circuits 107A and 107B. The AND circuit 107A is adapted to obtain the logical product (AND) of a signal QO, a clock signal SCK, and the control signal SCTL, and thereby generate a signal TRG0. The AND circuit 107B is adapted to obtain the logical product (AND) of the signal QO, the inverted signal of the clock signal SCK, and the control signal SCTL, and thereby generate a signal TRG180.

As with the driving unit 22 according to the embodiment mentioned above, the driving unit 22A is adapted to drive the plurality of imaging pixels P on the basis of an instruction from an imaging control unit 25. Specifically, the driving unit 22A applies the control signal SCMR to the plurality of control lines CMRL, applies the control signal SISW to the plurality of control lines ISWL, applies the control signal SOFG to the plurality of control lines OFGL, and applies the control signal SCTL to the plurality of control lines CTLL. Furthermore, the driving unit 22A also has the function of generating the voltages FBL and VDDX.

Here, the transistor TGA corresponds to a specific example of the "first switching transistor" according to the present disclosure. The transistor TGB corresponds to a specific example of the "second switching transistor" according to the present disclosure. The floating diffusion FDA corresponds to a specific example of the "first charge accumulation unit" according to the present disclosure. The floating diffusion FDB corresponds to a specific example of the "second charge accumulation unit" according to the present disclosure. The transistor OFG corresponds to a specific example of the "seventh transistor" according to the present disclosure. The transistor ISWA corresponds to a specific example of the "eighth transistor" according to the present disclosure. The transistor ISWB corresponds to a specific example of the "ninth transistor" according to the present disclosure. The transistor CMR corresponds to a specific example of the "tenth transistor" according to the present disclosure. The transistor RSTA corresponds to a specific example of the "eleventh transistor" according to the present disclosure. The transistor RSTB corresponds to a specific example of the "twelfth transistor" according to the present disclosure. The driving unit 22A corresponds to one specific example of the "second control unit" according to the present disclosure.

FIGS. 13A to 13M show an example of an exposure operation D1 in the distance measurement device 1A, where FIG. 13A shows the waveform of a light pulse L1 emitted from a light source 11, FIG. 13B shows the waveform of the control signal SISW, FIG. 13C shows the waveform of the control signal SCMR, FIG. 13D shows the waveform of a control signal SRST, FIG. 13E shows the waveform of the control signal SOFG, FIG. 13F shows the waveform of a voltage VSLA, FIG. 13G shows the waveform of a voltage VSLB, FIG. 13H shows the waveform of a control signal SSET, FIG. 13I shows the waveform of the control signal SRESET, FIG. 13J shows the waveform of the signal QO, FIG. 13K shows the waveform of the control signal SCTL, FIG. 13L shows the waveform of the signal TRG0, and FIG. 13M shows the waveform of the signal TRG180.

Prior to timing t52, the driving unit 22A sets the voltages of the control signals SISW, SCMR, SRST, and SOFG to higher levels (FIGS. 13B to 13E). Thus, the transistors CMR, RSTA, RSTB, OFG, ISWA, and ISWB of the pixel circuit P100A are turned on, the voltage VDDX is supplied to a cathode of the photodiode PD, and the voltage FBL is supplied to the floating diffusions FDA and FDB. The voltages VSLA and VSLB output by the pixel circuit P100A are set to a voltage V1 depending on this voltage FBL (FIGS. 13F and 13G).

Next, at timing t51, the driving unit 22A changes the voltage of the control signal SSET from a lower level to a higher level (FIG. 13H). Thus, a latch 104 is set, and the latch 104 changes the voltage of the signal QO from a lower level to a higher level (FIG. 13J). Because of the control signal SCTL at a lower level (FIG. 13K), the AND circuit 107A keeps the voltage of the signal TRG0 at a lower level, and the AND circuit 107B keeps the voltage of the signal TRG180 at a lower level (FIGS. 13L and 13M). Then, at the timing t52, the driving unit 22A changes the voltage of the control signal SSET from the higher level to the lower level (FIG. 13H).

In the period from the timing t52 to timing t53, the driving unit 22A keeps the voltage of the control signal SCTL at the lower level (FIG. 13K). Thus, the AND circuit 107A keeps the voltage of the signal TRG0 at the lower level, and the AND circuit 107B keeps the voltage of the signal TRG180 at the lower level (FIGS. 13L and 13M). Thus, the voltages VSLA and VSLB are kept at almost the same voltage.

Next, at the timing t53, the driving unit 22A changes the voltage of the control signal SCTL from the lower level to a higher level (FIG. 13K). Thus, in the period from the timing t53 to timing t54 (exposure period TB), the AND circuit 107A outputs the clock signal SCK as the signal TRG0, and the AND circuit 107B outputs the inverted signal of the clock signal SCK as the signal TRG180 (FIGS. 13L and 13M). Furthermore, in the period from the timing t53 to the timing t54, the light source 11 performs a light emitting operation of alternately repeating a light emission and a non-light emission (FIG. 13A). Thus, the photodiode PD generates electric charge on the basis of reflected light pulse L2, and the floating diffusions FDA and FDB accumulate the electric charge generated by the photodiode PD. Then, the voltages VSLA and VSLB change respectively depending on the voltages at the floating diffusions FDA and FDB (FIGS. 13F and 13G).

Next, at the timing t54, the driving unit 22A changes the voltage of the control signal SCTL from the higher level to the lower level (FIG. 13K). Thus, in the period from the timing t54 to timing t55, the AND circuit 107A keeps the voltage of the signal TRG0 at the lower level, and the AND circuit 107B keeps the voltage of the signal TRG180 at the lower level (FIGS. 13L and 13M). Furthermore, in the period from the timing t54 to the timing t55, the light source 11 stops the light emitting operation (FIG. 13A). Thus, the voltages VSLA and VSLB are kept at almost the same voltage.

Next, at the timing t55, the driving unit 22A changes the voltage of the control signal SCTL from the lower level to a higher level (FIG. 13K). Thus, in the period from the timing t55 to timing t56 (exposure period TB), the AND circuit 107A outputs the clock signal SCK as the signal TRG0, and the AND circuit 107B outputs the inverted signal of the clock signal SCK as the signal TRG180 (FIGS. 13L and 13M). Furthermore, in the period from the timing t55 to the timing t56, the light source 11 performs a light emitting operation of alternately repeating a light emission and a non-light emission (FIG. 13A). Thus, the voltages VSLA and VSLB change respectively depending on the voltages at the floating diffusions FDA and FDB (FIGS. 13F and 13G).

Subsequently, the distance measurement device 1A alternately repeats the operation in the period from the timing t54 to the timing t56 and the operation in the period from the timing t55 to the timing t56 (exposure period TB).

At timing t57, the driving unit 22A changes the voltage of the control signal SCTL from the lower level to a higher level (FIG. 13K). Thus, the AND circuit 107A starts to output the clock signal SCK as the signal TRG0, and the AND circuit 107B starts to output the inverted signal of the clock signal SCK as the signal TRG180 (FIGS. 13L and 13M). Furthermore, the light source 11 starts the light emitting operation of alternately repeating a light emission and a non-light emission (FIG. 13A). Thus, the voltages VSLA and VSLB change respectively depending on the voltages at the floating diffusions FDA and FDB (FIGS. 13F and 13G).

Then, at timing t58, the voltage VSLA reaches a voltage VREF. Thus, the NAND circuit 103 changes the voltage of the control signal SRESET from a lower level to a higher level (FIG. 13I). Thus, the latch 104 is reset, and the latch 104 changes the voltage of the signal QO from the higher level to the lower level (FIG. 13J). Accordingly, the AND circuit 107A sets the voltage of the signal TRG0 to the lower level, and the AND circuit 107B sets the voltage of the signal TRG180 to the lower level (FIGS. 13L and 13M). Thus, the exposure period TB started from the timing t57 ends.

FIGS. 14A to 14J show an example of the operation in the period from the timing t54 to the timing t56 shown in FIGS. 13A to 13M, where FIG. 14A shows the waveform of the light pulse L1 emitted from the light source 11, FIG. 14B shows the waveform of the control signal SISW, FIG. 14C shows the waveform of the control signal SCMR, FIG. 14D shows the waveform of the control signal SRST, FIG. 14E shows the waveform of the control signal SOFG, FIG. 14F shows the waveform of a voltage VFDO at the node FDO, FIG. 14G shows the waveform of the voltage VSLA, FIG. 14H shows the waveform of the voltage VSLB, FIG. 14I shows the waveform of the signal TRG0, and FIG. 14J shows the waveform of the signal TRG180.

At the timing t54, the driving unit 22A changes the voltages of the control signals SCMR, SRST, and SOFG from the lower levels to the higher levels (FIGS. 14C to 14E). Thus, the transistors CMR, RSTA, RSTB, and OFG are each turned on. Thus, the voltage VDDX is supplied to the cathode of the photodiode PD via the transistors CMR and OFG. Thus, the voltage VFDO of the node FDO is set to the voltage VDDX. Furthermore, the voltage across the capacitive element CAPA is set to a voltage depending on the voltage difference between the voltages FBL and VDDX, and the voltage across the capacitive element CAPB is set to a voltage depending on the voltage difference between the voltages FBL and VDDX.

Next, at timing t61, the driving unit 22A changes the voltage of the control signal SCMR from a higher level to a lower level (FIG. 14C). Thus, the transistor CMR is turned off.

In the period from the timing t61 to timing t62, the photodiode PD generates electric charges on the basis of background light. Since the transistor OFG is turned on, the voltage VFDO at the node FDO gradually decreases depending on the electric charge generated by the photodiode PD. Accordingly, the voltage across the capacitive element CAPA changes, and similarly, the voltage across the capacitive element CAPB changes.

Then, at the timing t62, the driving unit 22A changes the voltage of the control signal SOFG from the higher level to the lower level (FIG. 14E). Thus, the transistor OFG is turned off. Thus, the node FDO is turned into a floating state, and subsequently, the voltage across the capacitive element CAPA and the voltage across the capacitive element CAPB are maintained.

Then, at timing t63, the driving unit 22A changes the voltage of the control signal SRST from a higher level to a lower level (FIG. 14D). Thus, the transistors RSTA and RSTB are each turned off.

Next, at timing t64, the driving unit 22A changes the voltage of the control signal SCMR from the lower level to the higher level (FIG. 14C). Thus, the transistor CMR is turned on, the voltage VDDX is supplied to the node FDO, and the voltage VFDO is set to the voltage VDDX (FIG. 14F). In this case, the voltage across the capacitive element CAPA and the voltage across the capacitive element CAPB are maintained, thus increasing the voltage at one end of the capacitive element CAPA and the voltage at one end of the capacitive element CAPB.

Next, at timing t65, the driving unit 22A changes the voltage of the control signal SISW from the lower level to the higher level (FIG. 14B). Thus, the transistors ISWA and ISWB are each turned on, and the voltages at the floating diffusions FDA and FDB are increased. Accordingly, the voltages VSLA and VSLB are increased (FIGS. 14F and 14G). The increases in voltages VSLA and VSLB correspond to the amount of change in voltage VDO from the voltage VDDX at the timing t62. In other words, the increases in voltages VSLA and VSLB depend on the intensity of the background light.

Next, at timing t66, the driving unit 22A changes the voltage of the control signal SISW from the higher level to the lower level (FIG. 14B), and at the timing t55, the driving unit 22A changes the voltage of the control signal SCMR from the higher level to the lower level (FIG. 14C).

Then, during the subsequent period from the timing t55 to the timing t56, the light source 11 performs the light emitting operation of alternately repeating a light emission and a non-light emission (FIG. 14A), and the AND circuit 107A outputs the clock signal SCK as the signal TRG0, and the AND circuit 107B outputs the inverted signal of the clock signal SCK as the signal TRG180 (FIGS. 14I and 14J). Thus, the photodiode PD generates electric charge on the basis of reflected light pulse L2, and the floating diffusions FDA and FDB accumulate the electric charge generated by the photodiode PD. Then, the voltages VSLA and VSLB change respectively depending on the voltages at the floating diffusions FDA and FDB (FIGS. 14G and 14H).

As just described, in the distance measurement device 1A, in the period from the timing t61 to t62 (background light exposure period TC), the photodiode PD accumulates electric charges on the basis of the background light. Then, the pixel circuit P100A increases the voltages of the voltages VSLA and VSLB depending on the amount of electric charge accumulated in the background light exposure period TC. The time length of the period from the timing t61 and the timing t62 (background light exposure period TC) is set to the same length as the time length of the period from the timing t55 to the timing t56 (exposure period TB). Thus, in the distance measurement device 1A, the component based on the background light can be subtracted, which is included in the voltages VSLA and VSLB obtained in the period from the timing t55 to the timing t56. Thus, the distance measurement device 1A can enhance the measurement accuracy in measuring the distance D.

2. Second Embodiment

Next, a distance measurement device 2 according to the second embodiment will be described. According to the present embodiment, the exposure time is set with the use of four signals that differ in phase from each other. Note that substantially the same constituents as in the distance measurement device 1 according to the first embodiment mentioned above are denoted by the same reference numerals, and descriptions of the constituents is omitted appropriately.

The distance measurement device 2 includes an imaging unit 40 as shown in FIG. 1. The imaging unit 40 includes a pixel array 41, a driving unit 42, and a processing unit 44 as shown in FIG. 2.

FIG. 15 shows a configuration example of the pixel array 41. The pixel array 41 includes a plurality of control lines RSTL1, a plurality of control lines RSTL2, a plurality of control lines SELL1, a plurality of control lines SELL2, a plurality of control lines SELCL, a plurality of control lines SETL, a plurality of clock signal lines CKIL, and a plurality of clock signal lines CKQL. The control line RSTL1 is adapted to extend in the horizontal direction (the lateral direction in FIG. 15), and to the control line RSTL1, a control signal SRST1 is applied by the driving unit 42. The control line RSTL2 is adapted to extend in the horizontal direction (the lateral direction in FIG. 15), and to the control line RSTL2, a control signal SRST2 is applied by the driving unit 42. The control line SELL1 is adapted to extend in the horizontal direction (the lateral direction in FIG. 15), and to the control line SELL1, a control signal SSEL1 is applied by the driving unit 42. The control line SELL2 is adapted to extend in the horizontal direction (the lateral direction in FIG. 15), and to the control line SELL2, a control signal SSEL2 is applied by the driving unit 42. The control line SELCL is adapted to extend in the horizontal direction (the lateral direction in FIG. 15), and to the control line SELCL, a control signal SSELC is applied by the driving unit 42. The control line SETL is adapted to extend in the horizontal direction (the lateral direction in FIG. 15), and to the control line SETL, a control signal SSET is applied by the driving unit 42. The clock signal line CKIL is adapted to extend in the horizontal direction (lateral direction in FIG. 15), and to the clock signal line CKIL, a clock signal SCKI is applied by the driving unit 42. The clock signal line CKQL is adapted to extend in the horizontal direction (lateral direction in FIG. 15), and to the clock signal line CKQL, a clock signal SCKQ is applied by the driving unit 42. The clock signal SCKQ is a signal that is delayed in phase by 90 degrees from the clock signal SCKI.

The pixel array 41 includes pixel circuits Q110 and Q120 and a control circuit Q200. The pixel circuits Q110 and Q120 and the control circuit Q200 correspond to two imaging pixels Q in the pixel array 41. The pixel circuits Q110 and Q120 have the same circuit configuration as the pixel circuit P100 according to the first embodiment mentioned above.

The pixel circuit Q110 has a photodiode PD1, transistors TGA and TGB, floating diffusions FDA and FDB, transistors RST1, RSTA, and RSTB, transistors AMPA and AMPB, and transistors SELA and SELB. The transistor TGA has a gate supplied with a signal TRG0, and the transistor TGB has a gate supplied with a signal TRG180. In a case where the transistor SELA2 in the control circuit Q200 is turned on, whereas the transistor SELA is turned off, the transistor AMPA supplies a voltage VSLA depending on the voltage at the floating diffusion FDA to the control circuit Q200. Furthermore, in a case where the transistor SELB2 in the control circuit Q200 is turned on, whereas the transistor SELB is turned off, the transistor AMPB supplies a voltage VSLB depending on the voltage at the floating diffusion FDB to the control circuit Q200.

The pixel circuit Q120 has a photodiode PD2, transistors TGC and TGD, floating diffusions FDC and FDD, transistors RST2, RSTC, and RSTD, transistors AMPC and AMPD, and transistors SELC and SELD. The transistor TGC has a gate supplied with a signal TRG90, and the transistor TGD has a gate supplied with a signal TRG270. In a case where the transistor SELC2 (described later) in the control circuit Q200 is turned on, whereas the transistor SELC is turned off, the transistor AMPC supplies a voltage VSLC depending on the voltage at the floating diffusion FDC to the control circuit Q200. Furthermore, in a case where the transistor SELD2 (described later) in the control circuit Q200 is turned on, whereas the transistor SELD is turned off, the transistor AMPD supplies a voltage VSLD depending on the voltage at the floating diffusion FDD to the control circuit Q200.

The control circuit Q200 has transistors SELA2, SELB2, SELC2, and SELD2, current sources 101A, 101B, 101C, and 101D, comparators 102A, 102B, 102C, and 102D, a NAND circuit 113, a latch 104, and AND circuits 105A, 105B, 105C, and 105D.

The transistor SELA2 has a gate connected to the control line SELCL, and a drain connected to a source of the transistor AMPA in the pixel circuit Q110 and a drain of the transistor SELA therein.

The transistor SELB2 has a gate connected to the control line SELCL, and a drain connected to a source of the transistor AMPB in the pixel circuit Q110 and a drain of the transistor SELB therein.

The transistor SELC2 has a gate connected to the control line SELCL, a drain connected to a source of the transistor AMPC in the pixel circuit Q120 and a drain of the transistor SELC therein, and a source connected to the current source 101C and the comparator 102C. The current source 101C is adapted to apply a current that has a predetermined current value from the source of the transistor SELC2 toward the ground. The comparator 102C has a positive input terminal connected to the source of the transistor SELC2, a negative input terminal supplied with a voltage VREF, and an output terminal connected to the NAND circuit 113. The thus configured comparator 102C is adapted to, in the case of the transistor SELC2 turned on, compare the voltage VSLC supplied from the pixel circuit Q120 with the voltage VREF, and thereby generate a signal COC.

The transistor SELD2 has a gate connected to the control line SELCL, a drain connected to a source of the transistor AMPD in the pixel circuit Q120 and a drain of the transistor SELD therein, and a source connected to the current source 101D and the comparator 102D. The current source 101D is adapted to apply a current that has a predetermined current value from the source of the transistor SELD2 toward the ground. The comparator 102D has a positive input terminal connected to the source of the transistor SELD2, a negative input terminal supplied with a voltage VREF, and an output terminal connected to the NAND circuit 113. The thus configured comparator 102D is adapted to, in the case of the transistor SELD2 turned on, compare the voltage VSLD supplied from the pixel circuit Q120 with the voltage VREF, and thereby generate a signal COD.

The NAND circuit 113 is adapted to obtain the inverted logical product of the four signals COA, COB, COC, and COD, and thereby generate a control signal SRESET.

The latch 104 is adapted to, on the basis of the control signal SSET supplied to the set terminal, set the value of a signal QO to "1" and hold the value, and on the basis of the control signal SRESET supplied to the reset terminal, resets the value of the signal QO to "0" and hold the value.

The AND circuit 105A is adapted to obtain the logical product of the signal QO and the clock signal SCKI, and thereby generate the signal TRG0. The AND circuit 105B is adapted to obtain the logical product of the signal QO and the inverted signal of the clock signal SCKI, and thereby generate the signal TRG180. The AND circuit 105C is adapted to obtain the logical product of the signal QO and the clock signal SCKQ, and thereby generate the signal TRG90. The AND circuit 105D is adapted to obtain the logical product of the signal QO and the inverted signal of the clock signal SCKQ, and thereby generate the signal TRG270.

As with the driving unit 22 according to the first embodiment mentioned above, the driving unit 42 is adapted to drive the plurality of imaging pixels Q on the basis of an instruction from an imaging control unit 25. The driving unit 42 is adapted to apply the control signal SRST1 to the plurality of control lines RSTL1, apply the control signal SRST2 to the plurality of control lines RSTL2, apply the control signal SSEL1 to the plurality of control lines SELL1, apply the control signal SSEL2 to the plurality of control lines SELL2, apply the control signal SSELC to the plurality of control lines SELCL, apply the control signal SSET to the plurality of control lines SETL, apply the clock signal SCKI to the plurality of clock signal lines CKIL, and apply the clock signal SCKQ to the plurality of clock signal lines CKQL.

The processing unit 44 is adapted to, on the basis of the image signals DATA0, generate the range image PIC in which each pixel value indicates a value for the distance D, and output the range image PIC as image signals DATA.

Here, the photodiode PD1 corresponds to a specific example of the "first light receiving element" according to the present disclosure. The photodiode PD2 corresponds to a specific example of the "second light receiving element" according to the present disclosure. The floating diffusions FDC and FDD correspond to a specific example of the "plurality of second accumulation units" according to the present disclosure. The transistors TGC and TGD correspond to a specific example of the "plurality of second transistors" according to the present disclosure. The transistors AMPC, SELC, AMPD, and SELD correspond to a specific example of the "plurality of second output units" according to the present disclosure. The control circuit Q200 corresponds to a specific example of the "first control unit" according to the present disclosure. The comparators 102A, 102B, 102C, and 102D and the NAND circuit 113 correspond to a specific example of the "detection unit" according to the present disclosure. The AND circuits 105A, 105B, 105C, and 105D correspond to a specific example of the "driving unit" according to the present disclosure.

Next, the exposure operation D1 in the distance measurement device 1 will be described in detail. With attention paid to two imaging pixels Q1 and Q2 related to one control circuit Q200 among the plurality of imaging pixels Q, the exposure operation D1 associated with the imaging pixels Q1 and Q2 will be described in detail below.

FIGS. 16A to 16L show an example of an exposure operation D1 in the distance measurement device 2, where FIG. 16A shows the waveform of a light pulse L1 emitted from a light source 11, FIG. 16B shows the waveform of the control signal SRST (control signal SRST1, SRST2), FIG. 16C shows the waveforms of the voltages VSLA, VSLB, VSLC, and VSLD, FIG. 16D shows the waveform of the control signal SSET, FIG. 16E shows the waveform of the control signal SRESET, FIG. 16F shows the waveform of the signal QO, FIG. 16G shows the waveform of the clock signal SCKI, FIG. 16H shows the waveform of the clock signal SCKQ, FIG. 16I shows the waveform of the signal TRG0, FIG. 16J shows the waveform of the signal TRG90, FIG. 16K shows the waveform of the signal TRG180, and FIG. 16L shows the waveform of the signal TRG270.

Prior to timing t72, the driving unit 42 sets the voltages of the control signals SRST1 and SRST2 to higher levels (FIG. 16B). Thus, the transistors RST1, RSTA, and RSTB of the pixel circuit Q110 are turned on, the voltage VRSTX is supplied to the cathode of the photodiode PD1, and the voltage VRST is supplied to the floating diffusions FDA and FDB. Similarly, the transistors RST2, RSTC, and RSTD of the pixel circuit Q120 are turned on, the voltage VRSTX is supplied to the cathode of the photodiode PD2, and the voltage VRST is supplied to the floating diffusions FDC and FDD. As a result, the voltages VSLA and VSLB output from the pixel circuit Q110 and the voltages VSLC and VSLD output from the pixel circuit Q120 are respectively set to the voltage V1 corresponding to the voltage VRST (FIG. 16C).

Next, at timing t71, the driving unit 42 changes the voltage of the control signal SSET from a lower level to a higher level (FIG. 16D). Thus, the latch 104 is set, and the latch 104 changes the voltage of the signal QO from a lower level to a higher level (FIG. 16F). Accordingly, the AND circuit 105A starts to output the clock signal SCKI as the signal TRG0, the AND circuit 105B starts to output the inverted signal of the clock signal SCKI as the signal TRG180, the AND circuit 105C starts to output the clock signal SCKQ as the signal TRG90, and the AND circuit 105D starts to output the inverted signal of the clock signal SCKQ as the signal TRG270 (FIGS. 16G to 16L).

Next, at the timing t72, the driving unit 42 changes the voltage of the control signal SSET from the higher level to the lower level (FIG. 16D). Furthermore, at the timing t72, the driving unit 42 changes the voltages of the control signals SRST1 and SRST2 from the higher levels to the lower levels (FIG. 16B). Thus, the transistors RST1, RSTA, and RSTB of the pixel circuit Q110 and the transistors RST2, RSTC, and RSTC of the pixel circuit Q120 are both turned off. Furthermore, the light source 11 starts, at this timing t72, a light emitting operation of alternately repeating a light emission and a non-light emission (FIG. 16A). As shown in FIGS. 16A and 16G, the frequency of the light emitting operation of the light source 11 is equal to the frequency of the clock signal SCKI, and the phase of the light pulse L1 and the phase of the clock signal SCKI coincide with each other. As a result, the phase of the light pulse L1 and the phases of the signals TRG0, TRG90, TRG180, and TRG 270 are synchronized.

In this manner, an exposure period TB starts at this timing t72. In this exposure period TB, the photodiodes PD1 and PD2 generates electric charges on the basis of reflected light pulse L2 depending on the light pulse L1. In the pixel circuit Q110, the transistor TGA is turned on and off on the basis of the signal TRG0, and the transistor TGB is turned on and off on the basis of the signal TRG180. In other words, one of the transistors TRA and TRB is turned on. Thus, the electric charges generated by the photodiode PD1 are selectively accumulated in the floating diffusion FDA and the floating diffusion FDB. Similarly, in the pixel circuit Q120, the transistor TGC is turned on and off on the basis of the signal TRG90, and the transistor TGD is turned on and off on the basis of the signal TRG 270. In other words, one of the transistors TRC and TRD is turned on. Thus, the electric charges generated by the photodiode PD2 are selectively accumulated in the floating diffusion FDC and the floating diffusion FDD.

FIGS. 17A to 17F show an operation example of the imaging pixels Q1 and Q2, where FIG. 17A shows the waveform of the light pulse L1, FIG. 17B shows the waveform of the reflected light pulse L2 received by the photodiodes PD1 and PD2, FIG. 17C shows the waveform of the signal TRG0, FIG. 17D shows the waveform of the signal TRG180, FIG. 17E shows the waveform of the signal TRG90, and FIG. 17F shows the waveform of the signal TRG270. In this example, the photodiode PD1 of the pixel circuit Q110 and the photodiode PD2 of the pixel circuit Q120 receive substantially the same reflected light pulse L2 (FIG. 17B). In this example, at timing t81, the light pulse L1 rises up, the signal TRG0 rises up, and the signal TRG180 falls down. Then, at timing t83 at which the phase is delayed by "π/2" from the timing t81, the signal TRG90 rises up, and the signal TRG270 falls down. Then, at timing t84 at which the phase is delayed by "π/2" from the timing t83, the light pulse L1 falls down, the signal TRG0 falls down, and the signal TRG180 rises up. Then, at timing t86 at which the phase is delayed by "π/2" from the timing t84, the signal TRG90 falls down, and the signal TRG270 rises up.

In this example, the transistor TGA transfers the electric charge generated by the photodiode PD1 to the floating diffusion FDA in the period from the timing t82 to the timing t84, and the transistor TGB transfers the electric charge generated by the photodiode PD1 to the floating diffusion FDB in the period from the timing t84 to the timing t85. Thus, an electric charge S0 is accumulated in the floating diffusion FDA in the period from the timing t82 to the timing t84, and an electric charge S180 is accumulated in the floating diffusion FDB in the period from the timing t84 to the timing t85.

Furthermore, the transistor TGD transfers the electric charge generated by the photodiode PD2 to the floating diffusion FDD in the period from the timing t82 to the timing t83, and the transistor TGC transfers the electric charge generated by the photodiode PD2 to the floating diffusion FDC in the period from the timing t83 to the timing t85. Thus, an electric charge S270 is accumulated in the floating diffusion FDD in the period from the timing t82 to the timing t83, and an electric charge S90 is accumulated in the floating diffusion FDC in the period from the timing t83 to the timing t85.

The signal I(φ) (=S0−S180) which is the difference between the electric charge S0 and the electric charge S180 changes depending on the phase φ, and similarly, the signal Q(φ)(=S90−S270) which is the difference between the electric charge S90 and the electric charge S270 changes depending on the phase φ.

FIGS. 18 and 19 show examples of the signals I(φ) and Q(φ). Here, the signals I(φ) and Q(φ) are normalized.

In a case where the phase φ is "0" (zero), the signal I(φ) is "1". Then, when the phase φ changes from "0" (zero) to "π", the signal I(φ) decreases in a linear manner to change from "1" to "−1". Then, when the phase φ changes from "π" to "2π", the signal I(φ) increases in a linear manner to change from "−1" to "1".

Furthermore, in a case where the phase φ is "0" (zero), the signal Q(φ) is "0" (zero). Then, when the phase φ changes from "0" (zero) to "π/2", the signal Q(φ) increases in a linear manner to change from "0" to "1". Then, when the phase φ changes from "π/2" to "3π/2", the signal Q(φ) decreases in a linear manner to change from "1" to "−1". Then, when the phase φ changes from "3π/2" to "2π", the signal Q(φ) increases in a linear manner to change from "−1" to "0" (zero).

As shown in FIG. 19, the arctangent of the ratio (Q(φ)/I(φ)) between the signal Q(φ) and the signal I(φ) is the phase φ. Therefore, the processing unit 44 can obtain the phase φ on the basis of the signals I(φ) and Q(φ).

As shown in FIGS. 16A to 16L and 17A to 17F, the imaging pixels Q1 and Q2 repeat the operations at the timing t81 to the timing t87. Thus, the electric charge S0 is repeatedly accumulated in the floating diffusion FDA, the electric charge S180 is repeatedly accumulated in the floating diffusion FDB, the electric charge S90 is repeatedly accumulated in the floating diffusion FDC, and the electric charge S270 is repeatedly accumulated in the floating diffusion FDD. Thus, the voltages of the floating diffusions FDA, FDB, FDC, and FDD are gradually decreased. Accordingly, the voltages VSLA, VSLB, VSLC, and VSLD are also gradually decreased (FIG. 16C). In this example, the degree of change in voltage VSLA is higher than the degrees of change in voltages VSLB, VSLC, and VSLD.

Then, at timing t73, the voltage VSLA reaches the voltage VREF. Thus, the comparator 102A changes the voltage of the signal COA from a higher level to a lower level. Accordingly, the NAND circuit 113 changes the voltage of the control signal SRESET from a lower level to a higher level (FIG. 16E). Thus, the latch 104 is reset, and the latch 104 changes the voltage of the signal QO from the higher level to the lower level (FIG. 16F). Accordingly, the AND circuit 105A sets the voltage of the signal TRG0 to a lower level, the AND circuit 105B sets the voltage of the signal TRG180 to a lower level, the AND circuit 105C sets the voltage of the signal TRG90 to a lower level, and the AND circuit 105D sets the voltage of the signal TRG270 to a lower level (FIGS. 16I to 16L). In this way, the exposure period TB ends at the timing t73.

Then, at timing t74, the light source 11 terminates the light emission operation (FIG. 16A).

The reading unit 30 performs, on the basis of the voltage VSLA supplied from the pixel circuit Q110, the reading operation D2 as just described, and thereby generates a digital code CODE (digital code CODEA), and similarly performs, on the basis of the voltage VSLB supplied from the pixel circuit Q110, the reading operation D2, and thereby generates a digital code CODE (digital code CODEB). Similarly, the reading unit 30 performs, on the basis of the voltage VSLC supplied from the pixel circuit Q120, the reading operation D2, and thereby generates a digital code CODE (digital code CODEC), and performs, on the basis of the voltage VSLD supplied from the pixel circuit Q120, the reading operation D2, and thereby generates a digital code CODE (digital code CODED). The reading unit 30 supplies the image signal DATA0 including these digital codes CODEA, CODEB, CODEC, and CODED to the processing unit 44.

The processing unit 44 obtains the pixel values in the imaging pixels Q1 and Q2, on the basis of the digital codes CODEA, CODEB, CODEC, and CODED included in the image signal DATA0. In other words, the processing unit 44 can treat, as the signal $I(\varphi)$, the value obtained by subtracting the value indicated by the digital code CODEB from the value indicated by the digital code CODEA, and treat, as the signal $Q(\varphi)$, the value obtained by subtracting the value indicated by the digital code CODED from the value indicated by the digital code CODEC, and obtain values for the distance D in the imaging pixels Q1 and Q2, on the basis of the foregoing signals $I(\varphi)$ and $Q(\varphi)$. The processing unit 44 performs such processing for the plurality of imaging pixels Q, thereby generating a range image PIC. Then, the processing unit 44 outputs the range image PIC as an image signal DATA.

As just described, the distance measurement device 2 is adapted to use the four signals TRG0, TRG90, TRG180, and TRG270. Therefore, as shown in FIG. 18, the distance D can be obtained on the basis of the signals $I(\varphi)$ and $Q(\varphi)$, and the measurable distance can be doubled as compared with the case of obtaining the distance D on the basis of the signal $I(\varphi)$ with the use of the two signals TRG0 and TRG180 (FIG. 9).

Furthermore, in the distance measurement device 2, the exposure time in the pixel circuit Q110 which operates on the basis of the signals TRG0 and TRG180 is made equal to the exposure time in the pixel circuit Q120 which operates on the basis of the signals TRG90 and TRG270, and the measurement accuracy in measuring the distance D can be thus enhanced. In other words, for example, in a case where the exposure time in the pixel circuit Q110 is longer than the exposure time in the pixel circuit Q120, the amount of electric charge accumulated in the pixel circuit Q110 is larger than the electric charge accumulated in the pixel circuit Q120, and the balance is lost between the value obtained from the pixel circuit Q110 and the value obtained from the pixel circuit Q120. As a result, it becomes difficult to treat, as the signal $I(\varphi)$, the value obtained by subtracting the value indicated by the digital code CODEB from the value indicated by the digital code CODEA, and treat, as the signal $Q(\varphi)$, the value obtained by subtracting the value indicated by the digital code CODED from the value indicated by the digital code CODEC. On the other hand, in the distance measurement device 2, the exposure time in the pixel circuit Q110 and the exposure time in the pixel circuit Q120 are made equal to each other, thus making it possible to treat, as the signal $I(\varphi)$, the value obtained by subtracting the value indicated by the digital code CODEB from the value indicated by the digital code CODEA, and treat, as the signal $Q(\varphi)$, the value obtained by subtracting the value indicated by the digital code CODED from the value indicated by the digital code CODEC. Then, the distance measurement device 2 can obtain, on the basis of the foregoing signals $I(\varphi)$ and $Q(\varphi)$, the values for the distance D in the imaging pixels Q1 and Q2. As a result, the distance measurement device 2 can enhance the measurement accuracy in measuring the distance D.

Furthermore, in the distance measurement device 2, one control circuit Q200 is provided for the two pixel circuits Q110 and Q120, and thus, as compared with the case where one control circuit is provided for one pixel circuit, the circuit scale can be reduced.

As described above, according to the present embodiment, the four signals TRG0, TRG90, TRG180, and TRG 270 are used, and the measurable distance can be thus extended.

According to the present embodiment, the exposure time in the pixel circuit which operates on the basis of the signals TRG0 and TRG180 and the exposure time in the pixel circuit which operates on the basis of the signals TRG90 and TRG270 are made equal to each other, and the measurement accuracy in the distance measurement can be thus enhanced.

According to the present embodiment, one control circuit is provided for two pixel circuits, and the circuit scale can be thus reduced.

Modification Example 2

According to the embodiment mentioned above, as shown in FIG. 15, the four comparators 102A to 102D are provided, but the disclosure is not to be considered limited to the embodiment. The present modification example will be described in detail below with several examples.

FIG. 20 shows a configuration example of a main part of a control circuit Q200A according to the present modification example. FIG. 20 shows the part of the control circuit Q200 shown in FIG. 15, corresponding to four comparators 102A to 102D, a NAND circuit 113, and a latch 104.

The control circuit Q200A includes transistors 111A to 111D, current sources 112A to 112D, and a comparator 120. The comparator 120 includes capacitive elements 121 and 122, transistors 123 to 126, switches 127 and 128, and a current source 129. The transistors 111A to 111D, 123, and 124 are P-type MOS transistors, and the transistors 125 and 126 are N-type MOS transistors.

The transistor 111A has a gate supplied with a voltage VSLA, a source connected to a node N1, and a drain grounded. The gate of the transistor 111A is connected to, for example, a source of the transistor SELA2. The current source 112A has one end supplied with a power supply voltage VDD, and the other end connected to the source of the transistor 111A. The transistor 111A and the current source 112A constitute a source follower circuit.

The transistor 111B has a gate supplied with a voltage VSLB, a source connected to the node N1, and a drain grounded. The gate of the transistor 111B is connected to, for example, a source of the transistor SELB2. The current source 112B has one end supplied with a power supply voltage VDD, and the other end connected to the source of the transistor 111B. The transistor 111B and the current source 112B constitute a source follower circuit.

The transistor 111C has a gate supplied with a voltage VSLC, a source connected to the node N1, and a drain grounded. The gate of the transistor 111C is connected to, for example, a source of the transistor SELC2. The current source 112C has one end supplied with a power supply voltage VDD, and the other end connected to the source of the transistor 111C. The transistor 111C and the current source 112C constitute a source follower circuit.

The transistor 111D has a gate supplied with a voltage VSLD, a source connected to the node N1, and a drain grounded. The gate of the transistor 111D is connected to, for example, a source of the transistor SELD2. The current source 112D has one end supplied with a power supply voltage VDD, and the other end connected to the source of the transistor 111D. The transistor 111D and the current source 112D constitute a source follower circuit.

The capacitive element 121 has one end connected to the node N1, and the other end connected to a gate of the transistor 125 and one end of the switch 127. The capacitive element 122 has one end supplied with a voltage VREF, and the other end connected to a gate of the transistor 126 and one end of the switch 128.

The transistor 123 has a gate connected to a gate of the transistor 124, drains of the transistors 124 and 126, and the other end of the switch 128, a source supplied with the power supply voltage VDD, and a drain connected to a drain of the transistor 125, the other end of the switch 127, and the latch 104. The gate of the transistor 124 is connected to the gate of the transistor 123, the drains of the transistors 124 and 126, and the other end of the switch 128, the source thereof is supplied with the power supply voltage VDD, and the drain thereof is connected to the gates of the transistors 123 and 124, the drain of the transistor 126, and the other end of the switch 128.

The gate of the transistor 125 is connected to the other end of the capacitive element 121 and one end of the switch 127, the drain thereof is connected to the drain of the transistor 123, the other end of the switch 127, and the latch 104, and the source thereof is connected to the source of the transistor 126 and the current source 129. The gate of the transistor 126 is connected to the other end of the capacitive element 122 and one end of the switch 128, the drain thereof is connected to the drain of the transistor 124, the gates of the transistors 123 and 124, and the other end of the switch 128, and the source thereof is connected to the source of the transistor 125 and the current source 129.

The switch 127 has one end connected to the other end of the capacitive element 121 and the gate of the transistor 125, and the other end connected to the drains of the transistors 123 and 125 and the latch 104. The switch 128 has one end connected to the other end of the capacitive element 122 and the gate of the transistor 126, and the other end connected to the drains of the transistors 124 and 126 and the gates of the transistors 123 and 124. The current source 129 has one end connected to the sources of the transistors 125 and 126, and the other end grounded. For example, in an exposure operation D1, the switches 127 and 128 are turned on during a period with the control signal SRST (control signal SRST1, SRST2) at a higher level, and turned into lower levels in other periods.

The latch 104 has a reset terminal connected to the drains of the transistors 123 and 125 and the other end of the switch 127.

As shown in FIG. 20, the sources of the four transistors 111A to 111D are connected to each other. Thus, a voltage corresponding to the lowest voltage among the four voltages VSLA to VSLD appears at the node N1. Then, the comparator 120 compares the voltage at the node N1 with the voltage VREF, thereby generating the control signal SRESET. The control circuit Q200A is configured as just described, thereby making it possible to reduce the number of comparators.

FIG. 21 shows a configuration example of a main part of another control circuit Q200B according to the present modification example. FIG. 21 shows the part of the control circuit Q200 shown in FIG. 15, corresponding to four comparators 102A to 102D, a NAND circuit 113, and a latch 104.

The control circuit Q200B includes a comparator 130. The comparator 130 includes capacitive elements 131A to 131D, transistors 132A to 132D and 133A to 133D, switches 134A to 134D, a current source CS, a capacitive element 135, a transistor 136, a switch 137, and transistors 138 and 139. The transistors 132A to 132D and 133A to 133D, and 136 are P-type MOS transistors, and the transistors 138 and 139 are N-type MOS transistors.

The capacitive element 131A has one end supplied with a voltage VSLA, and the other end connected to a gate of transistor 132A and one end of switch 134A. One end of the capacitive element 131A is connected to, for example, the source of the transistor SELA2. The transistor 132A has a gate connected to the other end of the capacitive element 131A and one end of the switch 134A, a source connected to a node N2, and a drain connected to a source of the transistor 133A. The transistor 133A has a gate supplied with a signal SWA, with the source connected to the drain of the transistor 132A, and a drain connected to a node N3. One end of the switch 134A is connected to the other end of the capacitor 131A and the gate of the transistor 132A, and the other end thereof is connected to the node N3.

The capacitive element 131B has one end supplied with a voltage VSLB, and the other end connected to a gate of transistor 132B and one end of switch 134B. One end of the capacitive element 131B is connected to, for example, the source of the transistor SELB2. The transistor 132B has a gate connected to the other end of the capacitive element 131B and one end of the switch 134B, a source connected to the node N2, and a drain connected to a source of the transistor 133B. The transistor 133B has a gate supplied with a signal SWB, with the source connected to the drain of the transistor 132B, and a drain connected to a node N3. One end of the switch 134B is connected to the other end of the capacitor 131B and the gate of the transistor 132B, and the other end thereof is connected to the node N3.

The capacitive element 131C has one end supplied with a voltage VSLC, and the other end connected to a gate of transistor 132C and one end of switch 134C. One end of the capacitive element 131C is connected to, for example, the source of the transistor SELC2. The transistor 132C has a gate connected to the other end of the capacitive element 131C and one end of the switch 134C, a source connected to the node N2, and a drain connected to a source of the transistor 133C. The transistor 133C has a gate supplied with a signal SWC, with the source connected to the drain of the transistor 132C, and a drain connected to a node N3. One end of the switch 134C is connected to the other end of the capacitor 131C and the gate of the transistor 132C, and the other end thereof is connected to the node N3.

The capacitive element 131D has one end supplied with a voltage VSLD, and the other end connected to a gate of transistor 132D and one end of switch 134D. One end of the capacitive element 131D is connected to, for example, the source of the transistor SELD2. The transistor 132D has a gate connected to the other end of the capacitive element 131D and one end of the switch 134D, a source connected to the node N2, and a drain connected to a source of the transistor 133D. The transistor 133D has a gate supplied with a signal SWD, with the source connected to the drain of the transistor 132D, and a drain connected to a node N3. One end of the switch 134D is connected to the other end of the capacitor 131D and the gate of the transistor 132D, and the other end thereof is connected to the node N3.

Providing the transistors 133A to 133D makes it possible to select the voltage for use in setting the exposure time from among the four voltages VSLA to VSLD. For example, the exposure time can be set on the basis of the voltages VSLA and VSLB supplied from the pixel circuit Q110 by setting the voltages of the signals SWA and SWB to lower levels (active) and setting the voltages of the signals SWC and SWD to higher levels (inactive).

The current source CS has one end supplied with a power supply voltage VDD, and the other end connected to the sources of the transistors 132A to 123D and the source of the transistor 136.

The capacitive element 135 has one end supplied with a voltage VREF, and the other end connected to the gate of the transistor 136 and one end of the switch 137. The gate of the transistor 136 is connected to the other end of the capacitive element 135 and one end of the switch 137, the source thereof is connected to the sources of the transistors 132A to 132D and the other end of the current source CS, and the drain thereof is connected to the drain of the transistor 139, the gates of the transistors 138 and 139, and the other end of the switch 137. The switch 137 has one end connected to the other end of the capacitive element 135 and the gate of the transistor 136, and the other end connected to the drains of the transistors 136 and 139 and the gates of the transistors 138 and 139.

The gate of the transistor 138 is connected to the gate of the transistor 139, the drains of the transistors 136 and 139, and the other end of the switch 137, the drain thereof is connected to the node N2, and the source thereof is grounded. The gate of the transistor 139 is connected to the gate of the transistor 138, the drains of the transistors 136 and 139, and the other end of the switch 137, the drain thereof is connected to the gates of the transistors 138 and 139, the drain of the transistor 136, and the other end of the switch 137, and the source thereof is grounded.

For example, in an exposure operation D1, the switches 134A to 134D and 137 are turned on during a period with the control signal SRST (control signal SRST1, SRST2) at a higher level, and turned into lower levels in other periods.

Here, the transistors 132A, 132B, 132C, and 132D correspond to a specific example of the "plurality of third transistors" according to the present disclosure. The transistor 136 corresponds to a specific example of the "sixth transistor" according to the present disclosure. The capacitive elements 131A, 131B, 131C, and 131D correspond to a specific example of the "plurality of third capacitive elements" according to the present disclosure. The capacitive element 135 corresponds to a specific example of the "fourth capacitive element" according to the present disclosure.

As shown in FIG. 21, the sources of the four transistors 132A to 132D are connected to each other. Thus, the comparator 130 compares the lowest voltage among the four voltages VSLA to VSLD with the voltage VREF, thereby generating the control signal SRESET. The control circuit Q200B is configured as just described, thereby making it possible to reduce the number of comparators.

Other Modification Examples

The modification example of the first embodiment may be applied to the distance measurement device 2 according to the embodiment mentioned above.

3. Third Embodiment

Next, a distance measurement device 3 according to the third embodiment will be described. The present embodiment is adapted to set, on the basis of four voltages VSLA, VSLB, VSLC, and VSLD supplied from one pixel circuit, the exposure time in the imaging pixel. Note that substantially the same constituents as in the distance measurement device 2 according to the second embodiment mentioned above are denoted by the same reference numerals, and descriptions of the constituents is omitted appropriately.

The distance measurement device 3 includes an imaging unit 50 as shown in FIG. 1. The imaging unit 50 includes a pixel array 51, a driving unit 52, and a processing unit 54 as shown in FIG. 2.

FIG. 22 shows a configuration example of the pixel array 51. The pixel array 51 includes a plurality of control lines RSTL1, a plurality of control lines RSTL2, a plurality of control lines SELL1, a plurality of control lines SELL2, a plurality of control lines SELCL, a plurality of control lines SETL, a plurality of clock signal lines CKAL, a plurality of clock signal lines CKBL, a plurality of clock signal lines CKCL, and a plurality of clock signal lines CKDL. The clock signal line CKAL is adapted to extend in the horizontal direction (lateral direction in FIG. 22), and to the clock signal line CKAL, a clock signal SCKA is applied by the driving unit 52. The clock signal line CKBL is adapted to extend in the horizontal direction (lateral direction in FIG. 22), and to the clock signal line CKBL, a clock signal SCKB is applied by the driving unit 52. The clock signal line CKCL is adapted to extend in the horizontal direction (lateral direction in FIG. 22), and to the clock signal line CKCL, a clock signal SCKC is applied by the driving unit 52. The clock signal line CKDL is adapted to extend in the horizontal direction (lateral direction in FIG. 22), and to the clock signal line CKDL, a clock signal SCKD is applied by the driving unit 52. The clock signals SCKA to SCKD are signals with a duty ratio of 25%. The clock signal SCKC is a signal that is delayed in phase by 90 degrees from the clock signal SCKA, the clock signal SCKB is a signal that is delayed in phase by 90 degrees from the clock signal SCKC, and the clock signal SCKD is a signal that is delayed in phase by 90 degrees from the clock signal SCKB.

The pixel array 51 includes a pixel circuit R100 and a control circuit R200. The pixel circuit R100 and the control circuit R200 correspond to an imaging pixel R in the pixel array 51.

The pixel circuit R100 has a photodiode PD, transistors TGA, TGB, TGC, and TGD, floating diffusions FDA, FDB, FDC, and FDD, transistors RST, RSTA, RSTB, RSTC, and RSTD, transistors AMPA, AMPB, AMPC, and AMPD, and transistors SELA, SELB, SELC and SELD.

The transistor TGA has a gate supplied with a signal TRG0, a source connected to the cathode of the photodiode PD and the sources of the transistors TGB, TGC, TGD, and RST, and a drain connected to the floating diffusion FDA, the source of the transistor RSTA, and the gate of the transistor AMPA.

The transistor TGB has a gate supplied with a signal TRG180, a source connected to the cathode of the photodiode PD and the sources of the transistors TGA, TGC, TGD, and RST, and a drain connected to the floating diffusion FDB, the source of the transistor RSTB, and the gate of the transistor AMPB.

The transistor TGC has a gate supplied with a signal TRG90, a source connected to the cathode of the photodiode PD and the sources of the transistors TGA, TGB, TGD, and RST, and a drain connected to the floating diffusion FDC, the source of the transistor RSTC, and the gate of the transistor AMPC.

The transistor TGD has a gate supplied with a signal TRG270, a source connected to the cathode of the photodiode PD and the sources of the transistors TGA, TGB, TGC, and RST, and a drain connected to the floating diffusion FDD, the source of the transistor RSTD, and the gate of the transistor AMPD.

The control circuit R200 has transistors SELA2, SELB2, SELC2, and SELD2, current sources 101A, 101B, 101C, and 101D, comparators 102A, 102B, 102C, and 102D, a NAND circuit 113, a latch 104, and AND circuits 115A, 115B, 115C, and 115D.

The AND circuit 115A is adapted to obtain the logical product of the signal QO and the clock signal SCKA, and thereby generate the signal TRG0. The AND circuit 115B is adapted to obtain the logical product of the signal QO and the clock signal SCKB, and thereby generate the signal TRG180. The AND circuit 115C is adapted to obtain the logical product of the signal QO and the clock signal SCKC, and thereby generate the signal TRG90. The AND circuit 115D is adapted to obtain the logical product of the signal QO and the clock signal SCKD, and thereby generate the signal TRG270.

As with the driving unit 42 according to the second embodiment mentioned above, the driving unit 52 is adapted to drive the plurality of imaging pixels R on the basis of an instruction from an imaging control unit 25. The driving unit 52 is adapted to apply the clock signal SCKA to the plurality of clock signal lines CKAL, apply the clock signal SCKB to the plurality of clock signal lines CKBL, apply the clock signal SCKC to the plurality of clock signal lines CKCL, and apply the clock signal SCKD to the plurality of clock signal lines CKDL.

The processing unit 54 is adapted to, on the basis of image signals DATA0, generate the range image PIC in which each pixel value indicates a value for the distance D, and output the range image PIC as image signals DATA.

Here, the photodiode PD corresponds to a specific example of the "first light receiving element" according to the present disclosure. The floating diffusions FDA, FDB, FDC, and FDD correspond to a specific example of the "plurality of first accumulation units" according to the present disclosure. The transistors TGA, TGB, TGC, and TGD correspond to a specific example of the "plurality of first transistors" according to the present disclosure. The transistors AMPA, SELA, AMPB, SELB, AMPC, SELC, AMPD, and SELD correspond to a specific example of the "plurality of first output units" according to the present disclosure. The control circuit R200 corresponds to a specific example of the "first control unit" according to the present disclosure. The AND circuits 115A, 115B, 115C, and 115D correspond to a specific example of the "driving unit" according to the present disclosure.

Next, an exposure operation D1 in the distance measurement device 3 will be described in detail. With attention paid to a certain imaging pixel R1 among the plurality of imaging pixels R, the exposure operation D1 associated with the imaging pixel R1 will be described in detail below.

FIGS. 23A to 23K show an example of the exposure operation D1 in the distance measurement device 3, where FIG. 23A shows the waveform of a light pulse L1 emitted from a light source 11, FIG. 23B shows the waveform of the control signal SRST (control signal SRST1, SRST2), FIG. 23C shows the waveforms of the voltages VSLA, VSLB, VSLC, and VSLD, FIG. 23D shows the waveform of the control signal SSET, FIG. 23E shows the waveform of a control signal SRESET, FIG. 23F shows the waveform of the signal QO, FIG. 23G shows the waveform of the clock signal SCKA, FIG. 23H shows the waveform of the signal TRG0, FIG. 23I shows the waveform of the signal TRG90, FIG. 23J shows the waveform of the signal TRG180, and FIG. 16K shows the waveform of the signal TRG270.

Prior to timing t92, the driving unit 52 sets the voltages of the control signals SRST1 and SRST2 to higher levels (FIG. 23B). Thus, the transistors RST, RSTA, RSTB, RSTC, and RSTD of the pixel circuit R100 are turned on, a voltage VRSTX is supplied to the cathode of the photodiode PD, and a voltage VRST is supplied to the floating diffusions FDA, FDB, FDC, and FDD. Thus, the voltages VSLA, VSLB, VSLC, and VSLD output by the pixel circuit R100 are each set to a voltage V1 depending on the voltage VRST (FIG. 23C).

Next, at timing t91, the driving unit 52 changes the voltage of the control signal SSET from a lower level to a higher level (FIG. 23D). Thus, the latch 104 is set, and the latch 104 changes the voltage of the signal QO from a lower level to a higher level (FIG. 23F). Accordingly, the AND circuit 115A starts to output the clock signal SCKA as the signal TRG0, the AND circuit 115B starts to output the clock signal SCKB as the signal TRG180, the AND circuit 115C starts to output the clock signal SCKC as the signal TRG90, and the AND circuit 115D starts to output the clock signal SCKD as the signal TRG270 (FIGS. 23G to 23K).

Next, at the timing t92, the driving unit 52 changes the voltage of the control signal SSET from the higher level to the lower level (FIG. 23D). Furthermore, at the timing t92, the driving unit 52 changes the voltages of the control signals SRST1 and SRST2 from the higher levels to the lower levels (FIG. 23B). Thus, the transistors RST, RSTA, RSTB, RSTC, and RSTD of the pixel circuit R100 are both turned off. Furthermore, the light source 11 starts, at this timing t92, a light emitting operation of alternately repeating a light emission and a non-light emission (FIG. 23A). As shown in FIGS. 23A and 23G, the frequency of the light emitting operation of the light source 11 is equal to the frequency of the clock signal SCKA, and the phase of the light pulse L1 and the phase of the clock signal SCKA coincide with each other. As a result, the phase of the light pulse L1 and the phases of the signals TRG0, TRG90, TRG180, and TRG 270 are synchronized.

In this manner, an exposure period TB starts at this timing t92. In this exposure period TB, the photodiode PD generates electric charges, on the basis of the reflected light pulse L2 depending on the light pulse L1. In the pixel circuit R100, the transistor TGA is turned on and off on the basis of the signal TRG0, the transistor TGB is turned on and off on the basis of the signal TRG180, the transistor TGC is turned on and off on the basis of the signal TRG90, and the transistor TGD is turned on and off on the basis of the signal TRG270. In other words, any one of the transistors TRA, TRB, TRC, and TRD is turned on. Thus, the electric charges generated by the photodiode PD are selectively accumulated in the floating diffusions FDA, FDB, FDC, and FDD.

FIGS. 24A to 24F show an operation example of the imaging pixel R1, where FIG. 24A show the waveform of the light pulse L1, FIG. 24B shows the waveform of the reflected light pulse L2 received by the photodiode PD, FIG. 24C shows the waveform of the signal TRG0, FIG. 24D shows the waveform of the signal TRG180, FIG. 24E shows the waveform of the signal TRG90, and FIG. 24F shows the waveform of the signal TRG270. In this example, at timing t101, the light pulse L1 rises up, the signal TRG0 rises up, and the signal TRG270 falls down. Then, at timing t103 at which the phase is delayed by "π/2" from the timing t101, the signal TRG0 falls down, and the signal TRG90 rises up. Then, at timing t104 at which the phase is delayed by "π/2" from the timing t103, the light pulse L1 falls down, the signal TRG90 falls down, and the signal TRG180 rises up. Then, at timing t106 at which the phase is delayed by "π/2" from the timing t104, the signal TRG180 falls down, and the signal TRG270 rises up.

In this example, the transistor TGA transfers the electric charge generated by the photodiode PD to the floating diffusion FDA in the period from the timing t102 to the timing t103, the transistor TGC transfers the electric charge generated by the photodiode PD to the floating diffusion FDC in the period from the timing t103 to the timing t104, and the transistor TGB transfers the electric charge generated by the photodiode PD to the floating diffusion FDB in the period from the timing t104 to the timing t105. Thus, an electric charge S0 is accumulated in the floating diffusion FDA in the period from the timing t102 to the timing t103, an electric charge S90 is accumulated in the floating diffusion FDC in the period from the timing t103 to the timing t104, and an electric charge S180 is accumulated in the floating diffusion FDB in the period from the timing t104 to the timing t105.

FIGS. 25A to 25E show the relationship between the electric charges S0, S180, S90, and S270 accumulated in the floating diffusions FDA, FDB, FDC, and FDD and signals I(φ) and Q(φ), where FIG. 25A shows the electric charge S0 accumulated in the floating diffusion FDA, FIG. 25B shows the electric charge S180 accumulated in the floating diffusion FDB, FIG. 25C shows the electric charge S90 accumulated in the floating diffusion FDC, FIG. 25D shows the electric charge S270 accumulated in the floating diffusion FDD, and FIG. 25E shows an example of the signals I(φ) and Q(φ).

When the phase φ changes from "0" (zero) to "π/2", the signal I(φ) decreases in a linear manner to change from "1" to "−1". Then, when the phase φ changes from "π/2" to "π", the signal I(φ) keeps "−1". Then, when the phase φ changes from "π" to "3π/2", the signal I(φ) increases in a linear manner to change from "−1" to "1". Then, when the phase φ changes from "3π/2" to "2π", the signal I(φ) keeps "1".

When the phase φ changes from "0" (zero) to "π/2", the signal Q(φ) keeps "1". Then, when the phase φ changes from "π/2" to "π", the signal Q(φ) decreases in a linear manner to change from "1" to "−1". Then, when the phase φ changes from "π" to "3π/2", the signal Q(φ) keeps "−1". Then, when the phase φ changes from "3π/2" to "2π", the signal Q(φ) increases in a linear manner to change from "−1" to "1".

The processing unit 54 can obtain the phase φ as shown in FIGS. 25A to 25E, on the basis of the signals I(φ) and Q(φ).

As shown in FIGS. 23A to 23K and 24A to 24F, the imaging pixel R1 repeats the operations at the timing t101 to the timing t107. Thus, the electric charge S0 is repeatedly accumulated in the floating diffusion FDA, the electric charge S180 is repeatedly accumulated in the floating diffusion FDB, the electric charge S90 is repeatedly accumulated in the floating diffusion FDC, and the electric charge S270 is repeatedly accumulated in the floating diffusion FDD. Thus, the voltages of the floating diffusions FDA, FDB, FDC, and FDD are gradually decreased. Accordingly, the voltages VSLA, VSLB, VSLC, and VSLD are also gradually decreased (FIG. 23C). In this example, the degree of change in voltage VSLA is higher than the degrees of change in voltages VSLB, VSLC, and VSLD.

Then, at timing t93, the voltage VSLA reaches a voltage VREF. Thus, the comparator 102A changes the voltage of the signal COA from a higher level to a lower level. Accordingly, the NAND circuit 113 changes the voltage of the control signal SRESET from a lower level to a higher level (FIG. 23E). Thus, the latch 104 is reset, and the latch 104 changes the voltage of the signal QO from the higher level to the lower level (FIG. 23F). Accordingly, the AND circuit 115A sets the voltage of the signal TRG0 to a lower level, the AND circuit 115B sets the voltage of the signal TRG180 to a lower level, the AND circuit 115C sets the voltage of the signal TRG90 to a lower level, and the AND circuit 115D sets the voltage of the signal TRG270 to a lower level (FIGS. 23H to 23K). In this way, the exposure period TB ends at the timing t93.

Then, at timing t94, the light source 11 terminates the light emission operation (FIG. 23A).

The reading unit 30 performs, on the basis of the voltage VSLA supplied from the pixel circuit R100, the reading operation D2 as just described, and thereby generates a digital code CODE (digital code CODEA), and similarly performs, on the basis of the voltage VSLB, the reading operation D2, and thereby generates a digital code CODE (digital code CODEB). Similarly, the reading unit 30 performs, on the basis of the voltage VSLC, the reading operation D2, and thereby generates a digital code CODE (digital code CODEC), and performs, on the basis of the voltage VSLD, the reading operation D2, and thereby generates a digital code CODE (digital code CODED). The reading unit 30 supplies the image signal DATA0 including these digital codes CODEA, CODEB, CODEC, and CODED to the processing unit 54.

The processing unit 54 obtains the pixel values in the imaging pixel R1, on the basis of the digital codes CODEA, CODEB, CODEC, and CODED included in the image signal DATA0. In other words, the processing unit 54 can treat, as the signal I(φ), the value obtained by subtracting the value indicated by the digital code CODEB from the value indicated by the digital code CODEA, and treat, as the signal Q(φ), the value obtained by subtracting the value indicated by the digital code CODED from the value indicated by the digital code CODEC, and obtain values for the distance D in the imaging pixel R1, on the basis of the foregoing signals I(φ) and Q(φ). The processing unit 54 performs such processing for a plurality of imaging pixels Q, thereby generating the range image PIC. Then, the processing unit 54 outputs the range image PIC as an image signal DATA.

As just described, the distance measurement device 3 is adapted to set, on the basis of the four voltages VSLA, VSLB, VSLC, and VSLD supplied from one pixel circuit R100, the exposure time in the pixel circuit R100. Thus, the measurement accuracy in measuring the distance D can be enhanced. In other words, for example, in the distance measurement device 2 according to the second embodiment, the exposure time in the two pixel circuits Q110 and Q120 is set on the basis of the two voltages VSLA and VSLB supplied from the pixel circuit Q110 and the two voltages VSLC and VSLD supplied from the pixel circuit Q120. Therefore, in a case where the amounts of light received are different from each other between the photodiodes PD1 and PD2 of the pixel circuits Q110 and Q120, or the reflected light pulses L2 received by these photodiodes PD1 and PD2 are shifted in phase, there is a possibility that the measurement accuracy in measuring the distance D may be decreased. On the other hand, in the distance measurement device 3 according to the present embodiment, on the basis of the four voltages VSLA, VSLB, VSLC, and VSLD supplied from one pixel circuit R100, the exposure time in the pixel circuit R100 is set. In other words, the four voltages VSLA, VSLB, VSLC, and VSLD are generated on the basis of the electric charge generated by one photodiode PD. As a result, the distance measurement device 3 can enhance the measurement accuracy in measuring the distance D.

As described above, according to the present embodiment, on the basis of the four voltages supplied from one pixel circuit, the exposure time in the pixel circuit is set, and the measurement accuracy in measuring the distance can be thus enhanced.

Modification Example 3

The clock signals SCKA to SCKD with the duty ratio of 25% are used in the embodiment mentioned above, but the present disclosure is not limited thereto. A distance measurement device 3A according to the present modification example will be described below. The distance measurement device 3A includes an imaging unit 50A. The imaging unit 50A includes a pixel array 51A, a driving unit 52A, and a processing unit 54A.

FIG. 26 shows a configuration example of the pixel array 51A. The pixel array 51A includes a plurality of clock signal lines CKIL, a plurality of clock signal lines CKQL, and a plurality of control lines CTLL. The clock signal line CKIL is adapted to extend in the horizontal direction (lateral direction in FIG. 26), and to the clock signal line CKIL, a clock signal SCKI is applied by the driving unit 52A. The clock signal line CKQL is adapted to extend in the horizontal direction (lateral direction in FIG. 26), and to the clock signal line CKQL, a clock signal SCKQ is applied by the driving unit 52A. The control line CTLL is adapted to extend in the horizontal direction (the lateral direction in FIG. 26), and to the control line CTLL, a control signal SCTL is applied by the driving unit 52A. The pixel array 51A includes a pixel circuit R100 and a control circuit R200A.

The control circuit R200A has AND circuits 117A, 117B, 117C, and 117D. The AND circuit 117A is adapted to obtain the logical product (AND) of a signal QO, a clock signal SCKI, and the control signal SCTL, and thereby generate a signal TRG0. The AND circuit 117B is adapted to obtain the logical product (AND) of the signal QO, the inverted signal of the clock signal SCKI, and the control signal SCTL, and thereby generate a signal TRG180. The AND circuit 117C is adapted to obtain the logical product (AND) of the signal QO, the clock signal SCKQ, and the inverted signal of the control signal SCTL, and thereby generate a signal TRG90. The AND circuit 117D is adapted to obtain the logical product (AND) of the signal QO, the inverted signal of the clock signal SCKQ, and the inverted signal of the control signal SCTL, and thereby generate a signal TRG270.

As with the driving unit 52 according to the embodiment mentioned above, the driving unit 52A is adapted to drive a plurality of imaging pixels R on the basis of an instruction from an imaging control unit 25. The driving unit 52A is adapted to apply the clock signal SCKI to the plurality of clock signal lines CKIL, apply the clock signal SCKQ to the plurality of clock signal lines CKQL, and apply the control signal SCTL to the plurality of control lines CTLL.

FIGS. 27A to 27L show an example of an exposure operation D1 in the distance measurement device 3A, where FIG. 27A shows the waveform of a light pulse L1 emitted from a light source 11, FIG. 27B shows the waveform of the control signal SRST (control signal SRST1, SRST2), FIG. 27C shows the waveforms of the voltages VSLA, VSLB, VSLC, and VSLD, FIG. 27D shows the waveform of the control signal SSET, FIG. 27E shows the waveform of a control signal SRESET, FIG. 27F shows the waveform of the signal QO, FIG. 27G shows the waveform of the clock signal SCTL, FIG. 27H shows the waveform of the clock signal SCKI, FIG. 27I shows the waveform of the signal TRG0, FIG. 27J shows the waveform of the signal TRG90, FIG. 27K shows the waveform of the signal TRG180, and FIG. 27L shows the waveform of the signal TRG270.

Prior to timing t112, the driving unit 52A sets the voltages of the control signals SRST1 and SRST2 to higher levels (FIG. 27B). Thus, the transistors RST, RSTA, RSTB, RSTC, and RSTD of the pixel circuit R100 are turned on, a voltage VRSTX is supplied to the cathode of the photodiode PD, and a voltage VRST is supplied to the floating diffusions FDA, FDB, FDC, and FDD. The voltages VSLA, VSLB, VSLC, and VSLD output by the pixel circuit R100 are set to a voltage V1 depending on the voltage VRST (FIG. 27C).

Next, at timing t111, the driving unit 52A changes the voltage of the control signal SSET from a lower level to a higher level (FIG. 27D). Thus, a latch 104 is set, and the latch 104 changes the voltage of the signal QO from a lower level to a higher level (FIG. 27F). Because of the control signal SCTL at a lower level (FIG. 27G), the AND circuit 117A keeps the voltage of the signal TRG0 at a lower level, and the AND circuit 117B keeps the voltage of the signal TRG180 at a lower level (FIGS. 27I and 27K). Furthermore, the AND circuit 117C starts to output the clock signal SCKQ as the signal TRG90, and the AND circuit 117D starts to output the inverted signal of the clock signal SCKQ as the signal TRG270 (FIGS. 27J and 27L).

Next, at the timing t112, the driving unit 52A changes the voltage of the control signal SSET from the higher level to the lower level (FIG. 27D). Furthermore, at the timing t112, the driving unit 52A changes the voltages of the control signals SRST1 and SRST2 from the higher levels to the lower levels (FIG. 27B). Thus, the transistors RST, RSTA, RSTB, RSTC, and RSTD of the pixel circuit R100 are both turned off. Furthermore, the light source 11 starts, at this timing t112, a light emitting operation of alternately repeating a light emission and a non-light emission (FIG. 27A). As shown in FIGS. 27A and 27H, the frequency of the light emitting operation of the light source 11 is equal to the frequency of the clock signal SCKA, and the phase of the light pulse L1 and the phase of the clock signal SCKA coincide with each other. In this manner, an exposure period TB starts at this timing t112.

At timing t112, the driving unit 52A changes the voltage of the control signal SCTL from the lower level to a higher level. Thus, in the period from the timing t112 to timing t113, the AND circuit 117A outputs the clock signal SCKI as the signal TRG0, and the AND circuit 117B outputs the inverted signal of the clock signal SCKI as the signal TRG180 (FIGS. 27I and 27K). On the other hand, the AND circuit 117C keeps the voltage of the signal TRG90 at a lower level, and the AND circuit 117D keeps the voltage of the signal TRG270 at a lower level (FIGS. 27J and 27L). Thus, the photodiode PD generates electric charge on the basis of reflected light pulse L2, and the floating diffusions FDA and FDB accumulate the electric charge generated by the photodiode PD. Then, the voltages VSLA and VSLB change respectively depending on the voltages at the floating diffusions FDA and FDB (FIG. 28C). The voltages VSLC and VSLD are kept at almost the same voltage.

FIGS. 28A to 28D show an operation example of an imaging pixel R1 in the period from the timing t112 to the timing t113, where FIG. 28A shows the waveform of the light pulse L1, FIG. 28B shows the waveform of the reflected light pulse L2, FIG. 28C shows the waveform of the signal TRG0, and FIG. 28D shows the waveform of the signal TRG180. An electric charge S0 is accumulated in the floating diffusion FDA in the period from timing t122 to timing t123, and an electric charge S180 is accumulated in the floating diffusion FDB in the period from timing t123 to timing t124.

At timing t113, the driving unit 52A changes the voltage of the control signal SCTL from the higher level to the lower level. Thus, in the period from the timing t113 to timing t114, the AND circuit 117C outputs the clock signal SCKQ as the signal TRG90, and the AND circuit 117D outputs the inverted signal of the clock signal SCKQ as the signal TRG270 (FIGS. 27J and 27L). On the other hand, the AND circuit 117A keeps the voltage of the signal TRG0 at a lower level, and the AND circuit 117B keeps the voltage of the signal TRG180 at a lower level (FIGS. 27I and 27K). Thus, the photodiode PD generates electric charge on the basis of reflected light pulse L2, and the floating diffusions FDC and FDD accumulate the electric charge generated by the photodiode PD. Then, the voltages VSLC and VSLD change respectively depending on the voltages at the floating diffusions FDC and FDD (FIG. 28C). The voltages VSLA and VSLB are kept at almost the same voltage.

FIGS. 29A to 29D show an operation example of the imaging pixel R1 in the period from the timing t112 to the timing t113, where FIG. 29A shows the waveform of the light pulse L1, FIG. 29B shows the waveform of the reflected light pulse L2, FIG. 29C shows the waveform of the signal TRG0, and FIG. 29D shows the waveform of the signal TRG180. An electric charge S270 is accumulated in the floating diffusion FDD in the period from timing t132 to timing t133, and an electric charge S90 is accumulated in the floating diffusion FDC in the period from timing t133 to timing t135.

Subsequently, the distance measurement device 3A alternately repeats the operation in the period from the timing t112 to the timing t113 and the operation in the period from the timing t113 to the timing t114.

At timing t116, the driving unit 52A changes the voltage of the control signal SCTL from the lower level to the higher level (FIG. 27G). Thus, the AND circuit 117A starts to output the clock signal SCKI as the signal TRG0, and the AND circuit 117B starts to output the inverted signal of the clock signal SCKI as the signal TRG180 (FIGS. 27I and 27K). On the other hand, the AND circuit 117C keeps the voltage of the signal TRG90 at a lower level, and the AND circuit 117D keeps the voltage of the signal TRG270 at a lower level (FIGS. 27J and 27L). Thus, the voltages VSLA and VSLB change respectively depending on the voltages at the floating diffusions FDA and FDB (FIGS. 13F and 13G). The voltages VSLC and VSLD are kept at almost the same voltage.

Then, at timing t117, the voltage VSLA reaches a voltage VREF. Thus, a NAND circuit 113 changes the voltage of the control signal SRESET from a lower level to a higher level (FIG. 27E). Thus, the latch 104 is reset, and the latch 104 changes the voltage of the signal QO from the higher level to the lower level (FIG. 27F). Accordingly, the AND circuit 117A sets the voltage of the signal TRG0 to the lower level, and the AND circuit 117B sets the voltage of the signal TRG180 to the lower level (FIGS. 27I and 27K). Thus, the exposure period TB ends at the timing t117.

Even the foregoing configuration can achieve a similar advantageous effect as in the case of the embodiments mentioned above.

Other Modification Examples

The modification example of the first embodiment may be applied to the distance measurement device 3 according to the embodiment mentioned above, or the modification example of the second embodiment may be applied thereto.

Although the present technology has been described above with reference to the several embodiments and modification examples, the present technology is not limited to these embodiments and the like, and various modifications can be made thereto.

For example, the distance measurement device 1 (FIG. 3) according to the first embodiment is adapted to have one control circuit P200 provided for one pixel circuit P100 as shown in FIG. 30. Then, the pixel circuit P100 is adapted to supply the voltages VSLA and VSLB to the control circuit P200, and the control circuit P200 is adapted to generate the signals TRG0 and TRG180 on the basis of the voltages VSLA and VSLB, and supply these signals TRG0 and TRG180 to the pixel circuit P100. Furthermore, the distance measurement device 2 (FIG. 15) according to the second embodiment is adapted to have one control circuit Q200 provided for two pixel circuits Q110, Q120 as shown in FIG. 31. Then, the pixel circuit Q110 is adapted to supply the voltages VSLA and VSLB to the control circuit Q200, the pixel circuit Q120 is adapted to supply the voltages VSLC and VSLD to the control circuit Q200, and the control circuit Q200 is adapted to generate the signals TRG0, TRG90, TRG180, and TRG270 on the basis of the voltages VSLA, VSLB, VSLC, and VSLD, supply the signals TRG0 and TRG180 to the pixel circuit Q110, and supply the signals TRG90 and TRG270 to the pixel circuit Q120. The present technology is not to be considered limited thereto the foregoing embodiments, but for example, one control circuit may be provided for three or more pixel circuits. For example, in the example of FIG. 32, one control circuit Q210 is provided for four pixel circuits Q110, Q120, Q130, and Q140. In this example, the pixel circuits Q110 and Q120 operate on the basis of the signals TRG0 and TRG180, and the pixel circuits Q130 and Q140 operate on the basis of the signals TRG90 and TRG270. The control circuit Q210 generates the signals TRG0, TRG90, TRG180, and TRG270 on the basis of the eight voltages supplied from the pixel circuits Q110, Q120, Q130, and Q140. Specifically, the control circuit Q210 sets all of the signals TRG0, TRG90, TRG180, and TRG270 to lower levels in a case where at least one of the eight voltages reaches the voltage VREF. The control circuit Q210 may be, for example, adapted to have eight comparators 102 as in the case of the second embodiment (FIG. 15), or adapted to have one comparator in accordance with the configuration as shown in FIGS. 20 and 21. Furthermore, for example, as shown in FIG. 33, the control circuit Q210 is provided with a selector 211 to select eight voltages in a time division manner, and in a case where at least one of the selected voltages reaches the voltage VREF, the signals TRG0, TRG90, TRG180, and TRG 270 are all set to lower levels. In this example, from the eight voltages, four voltages are alternately selected as a unit.

Furthermore, for example, the distance measurement device 3 (FIG. 22) according to the third embodiment is adapted to have one control circuit R200 provided for one pixel circuit R100 as shown in FIG. 34. Then, the pixel circuit R100 is adapted to supply the voltages VSLA, VSLB, VSLC, and VSLD to the control circuit R200, and the control circuit R200 is adapted to generate the signals TRG0, TRG90, TRG180, and TRG270 on the basis of the voltages VSLA, VSLB, VSLC, and VSLD, and supply the signals TRG0, TRG90, TRG180, and TRG270 to the pixel circuit R100. Even in this case, for example, one control circuit may be provided for two or more pixel circuits. For example, in the example of FIG. 35, one control circuit R210 is provided for two pixel circuits R100 and R110. In this example, the pixel circuits R100 and R110 operate on the basis of the signals TRG0, TRG90, TRG180, and TRG270. The control circuit R210 generates the signals TRG0, TRG90, TRG180, and TRG270 on the basis of the eight voltages supplied from the pixel circuits R100 and R110. Specifically, the control circuit R210 sets all of the signals TRG0, TRG90, TRG180, and TRG270 to lower levels in a case where at least one of the eight voltages reaches the voltage VREF. The control circuit R210 may be, for example, adapted to have eight comparators 102 as in the case of the third embodiment (FIG. 22), or adapted to have one comparator in accordance with the configuration as shown in FIGS. 20 and 21. Furthermore, for example, as with the control circuit Q200 shown in FIG. 33, the control circuit R210 is provided with a selector 211 to select eight voltages in a time division manner, and in a case where at least one of the selected voltages reaches the voltage VREF, the signals TRG0, TRG90, TRG180, and TRG270 may be all set to lower levels.

Note that the advantageous effects described in this specification are, by way of example only, not to be considered limited, and other effects may be provided.

Note that the present technology can be configured as follows.

(1) A time of flight sensor, comprising:
a light receiving element;
a first signal line and a second signal line;
a first transistor in electrical communication with the light receiving element, the first transistor comprising a first gate in electrical communication with the first signal line;
a second transistor in electrical communication with the light receiving element, the second transistor comprising a second gate in electrical communication with the second signal line; and
a control circuit comprising at least one comparator, wherein the control circuit is in electrical communication with the first and second signal line.

(2) The time of flight sensor according to (1), wherein the at least one comparator comprises a first comparator and a second comparator, wherein the first and second comparator are configured to receive a reference voltage.

(3) The time of flight sensor according to (2), wherein the control circuit further comprises:
a NAND circuit in electrical communication with the first and second comparator;
a latch in electrical communication with the NAND circuit, a first AND circuit, and a second AND circuit, wherein the first AND circuit is in electrical communication with the first signal line, and the second AND circuit is in electrical communication with the second signal line.

(4) The time of flight sensor according to (1), further comprising:
a first capacitor in electrical communication with the light receiving element via the first transistor; and
a second capacitor in electrical communication with the light receiving element via the second transistor.

(5) The time of flight sensor according to (1), further comprising:
a first semiconductor substrate, wherein the light receiving element, the first transistor, and the second transistor are formed on the first semiconductor substrate; and
a second semiconductor substrate, wherein the control circuit is formed on the second semiconductor substrate.

(6) The time of flight sensor according to (5), wherein the first semiconductor substrate is stacked on the second semiconductor substrate.

(7) The time of flight sensor according to (1), further comprising:
a first capacitor in electrical communication with the light receiving element;
a third signal line configured to supply a first voltage based on an amount of charge stored by the first capacitive element; and
a first analog to digital converter in electrical communication with the third signal line.

(8) The time of flight sensor according to (7), further comprising:
a second capacitor in electrical communication with the light receiving element, wherein the first capacitor is in electrical communication with the light receiving element via the first transistor, and the second capacitor is in electrical communication with the light receiving element via the second transistor;
a fourth signal line configured to supply a second voltage based on an amount of charge stored by the second capacitive element; and
a second analog to digital converter in electrical communication with the fourth signal line.

(9) The time of flight sensor according to (1), further comprising:
a second light receiving element;
a third signal line and a fourth signal line;
a third transistor in electrical communication with the second light receiving element, the third transistor comprising a third gate in electrical communication with the third signal line;
a fourth transistor in electrical communication with the second light receiving element, the fourth transistor comprising a fourth gate in electrical communication with the fourth signal line; and
the control circuit is in electrical communication with the third and fourth signal line.

(10) The time of flight sensor according to (9), wherein the control circuit comprises a second comparator and a third comparator, wherein the second and third comparator are configured to receive a reference voltage.

(11) The time of flight sensor according to (9), wherein the control circuit comprises a voltage selector in communication with the first, second, third and fourth signal line.

(12) A distance measurement device, comprising:
a light source and a light source control unit in communication with the light source;
an imaging unit comprising:
a light receiving element;
a first signal line and a second signal line;
a first transistor in electrical communication with the light receiving element, the first transistor comprising a first gate in electrical communication with the first signal line;
a second transistor in electrical communication with the light receiving element, the second transistor comprising a second gate in electrical communication with the second signal line; and
a control circuit comprising at least one comparator, wherein the control circuit is in electrical communication with the first and second signal line; and
a control unit in communication with the light source control unit and the imaging unit.

(13) The distance measurement device according to (12), wherein the at least one comparator comprises a first comparator and a second comparator, wherein the first and second comparator are configured to receive a reference voltage.

(14) The distance measurement device according to (13), wherein the control circuit further comprises:
a NAND circuit in electrical communication with the first and second comparator;
a latch in electrical communication with the NAND circuit, a first AND circuit, and a second AND circuit, wherein the first AND circuit is in electrical communication with the first signal line, and the second AND circuit is in electrical communication with the second signal line.

(15) The distance measurement device according to (12), further comprising:
a first capacitor in electrical communication with the light receiving element via the first transistor; and
a second capacitor in electrical communication with the light receiving element via the second transistor.

(16) The distance measurement device according to (12), further comprising:
a first semiconductor substrate, wherein the light receiving element, the first transistor, and the second transistor are formed on the first semiconductor substrate; and
a second semiconductor substrate, wherein the control circuit is formed on the second semiconductor substrate.

(17) The distance measurement device according to (16), wherein the first semiconductor substrate is stacked on the second semiconductor substrate.

(18) The distance measurement device according to (12), further comprising:
a first capacitor in electrical communication with the light receiving element;
a third signal line configured to supply a first voltage based on an amount of charge stored by the first capacitive element; and
a first analog to digital converter in electrical communication with the third signal line.

(19) The distance measurement device according to (18), further comprising:
a second capacitor in electrical communication with the light receiving element, wherein the first capacitor is in electrical communication with the light receiving element via the first transistor, and the second capacitor is in electrical communication with the light receiving element via the second transistor;
a fourth signal line configured to supply a second voltage based on an amount of charge stored by the second capacitive element; and
a second analog to digital converter in electrical communication with the fourth signal line.

(20) The distance measurement device according to (12), further comprising: a second light receiving element;
a third signal line and a fourth signal line;
a third transistor in electrical communication with the second light receiving element, the third transistor comprising a third gate in electrical communication with the third signal line;
a fourth transistor in electrical communication with the second light receiving element, the fourth transistor comprising a fourth gate in electrical communication with the fourth signal line; and
the control circuit is in electrical communication with the third and fourth signal line.

(21) The distance measurement device according to (20), wherein the control circuit comprises a second comparator and a third comparator, wherein the second and third comparator are configured to receive a reference voltage.

(22) The distance measurement device according to (20), wherein the control circuit comprises a voltage selector in communication with the first, second, third and fourth signal line.

It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1 to 3 Distance measurement device
11 Light source
12 Light source control unit
13 Optical system
14 Control unit
20, 40, 50 Imaging unit
21, 41, 51 Pixel array
22, 42, 52 Driving unit
24, 44, 54 Processing unit
25 Imaging control unit 26 Reference signal generating unit
30 Reading unit
31, 32 Capacitive element
33 Current source
34 Comparator
35 Counter
36 Latch
101A, 101B, 101C, 101D Current source
102A, 102B, 102C, 102D Comparator
103, 113 NAND circuit
104 Latch
105A, 105B, 105C, 105D, 107A, 107B, 115A, 115B, 115C, 115D, 117A, 117B, 117C, 117C AND circuit
111A, 111B, 111C, 111C Transistor
112A, 112B, 112C, 112C Current source
120 Comparator
121, 122 Capacitive element
123 to 126 Transistor
127, 128 Switch
129 Current source
130 Comparator
131A, 131B, 131C, 131D Capacitive element
132A, 132B, 132C, 132D, 133A, 133B, 133C, 133D Transistor
134A, 134B, 134C, 134D Switch
135 Capacitive element
136 Transistor
137 Switch
138, 139 Transistor
201, 202 Semiconductor substrate
211 Selector
AMPA, AMPB, AMPC, AMPD, CMR, ISWA, ISWB, OFG, RST, RST1, RST2, RSTA, RSTB, RSTC, RSTD, SELA, SELA2, SELB, SELB2, SELC, SELC2, SELD, SELD2, TGA, TGB, TGC, TGD Transistor
BUS Bus wiring
CC, SCMR, SCTL, SISW, SOFG, SRESET, SRST, SSEL, SSELC, SSET, SSW Control signal
CKAL, CKBL, CKCL, CKDL, CKIL, CKL, CKQL Clock signal line
CLK, SCK, SCKA, SCKB, SCKC, SCKD, SCKI, SCKQ Clock signal
CMP, COA, COB, COC, COD, I($\varphi$), Q($\varphi$), QO, TRG0, TRG90, TRG180, TRG270 Signal
CNT Count value
CS Current source
CTLL, RSTL, SELL, SELCL, SETL Control line
DATA, DATA0 Image signal
D1 Exposure operation
D2 Reading operation
FDA, FDB, FDC, FDD Floating diffusion
L1 Light pulse
L2 Reflected light pulse
P, Q, R Imaging pixel
PD, PD1, PD2 Photodiode
P100, P100A, Q110, Q120, Q130, Q140
R100, R110 Pixel circuit
P200, P200A, Q200, Q210, R200, R200A, R210 Control circuit
REF Reference signal
SGL, SGLA, SGLB Signal line
SIG Pixel signal
S1 Imaging surface
S0, S90, S180, S270 Electric charge
TA Exposable period
TB Exposure period
TC Background light exposure period
T1, T2 Conversion period
VDD Power supply voltage
VREF, VRST, VRSTX, VSLA, VSLB, VSLC, VSLD Voltage
$\varphi$ Phase

The invention claimed is:

1. A time of flight sensor, comprising:
a light receiving element;
a first signal line and a second signal line;
a first transistor in electrical communication with the light receiving element, the first transistor comprising a first gate in electrical communication with the first signal line;
a second transistor in electrical communication with the light receiving element, the second transistor comprising a second gate in electrical communication with the second signal line; and
a control circuit comprising at least one comparator, wherein the control circuit is in electrical communication with the first and second signal line;
a first floating diffusion having an amount of charge relating to an amount of light received by the light receiving element;
a third transistor electrically coupled with the first floating diffusion and the control circuit;
a second floating diffusion having an amount of charge relating to the amount of light received by the light receiving element; and
a fourth transistor electrically coupled with the second floating diffusion and the control circuit.

2. The time of flight sensor of claim 1, wherein the at least one comparator comprises a first comparator and a second comparator, wherein the first and second comparator are configured to receive a reference voltage.

3. The time of flight sensor of claim 2, wherein the control circuit further comprises: a NAND circuit in electrical communication with the first and second comparator;
a latch in electrical communication with the NAND circuit, a first AND circuit, and a second AND circuit, wherein the first AND circuit is in electrical communication with the first signal line, and the second AND circuit is in electrical communication with the second signal line.

4. The time of flight sensor of claim 1, further comprising:
a first capacitor in electrical communication with the light receiving element via the first transistor; and
a second capacitor in electrical communication with the light receiving element via the second transistor.

5. The time of flight sensor of claim 1, further comprising:
a first semiconductor substrate, wherein the light receiving element, the first transistor, and the second transistor are formed on the first semiconductor substrate; and
a second semiconductor substrate, wherein the control circuit is formed on the second semiconductor substrate.

6. The time of flight sensor of claim 5, wherein the first semiconductor substrate is stacked on the second semiconductor substrate.

7. The time of flight sensor of claim 1, further comprising:
a first capacitor in electrical communication with the light receiving element;
a third signal line configured to supply a first voltage based on an amount of charge stored by the first capacitive element; and a first analog to digital converter in electrical communication with the third signal line.

8. The time of flight sensor of claim 7, further comprising:
a second capacitor in electrical communication with the light receiving element, wherein the first capacitor is in electrical communication with the light receiving element via the first transistor, and the second capacitor is in electrical communication with the light receiving element via the second transistor;
a fourth signal line configured to supply a second voltage based on an amount of charge stored by the second capacitive element; and a second analog to digital converter in electrical communication with the fourth signal line.

9. The time of flight sensor of claim 1, further comprising:
a second light receiving element;
a third signal line and a fourth signal line;
a fifth transistor in electrical communication with the second light receiving element, the fifth transistor comprising a third gate in electrical communication with the third signal line;
a sixth transistor in electrical communication with the second light receiving element, the sixth transistor comprising a fourth gate in electrical communication with the fourth signal line; and
the control circuit is in electrical communication with the third and fourth signal line.

10. The time of flight sensor of claim 9, wherein the control circuit comprises a second comparator and a third comparator, wherein the second and third comparator are configured to receive a reference voltage.

11. The time of flight sensor of claim 9, wherein the control circuit comprises a voltage selector in communication with the first, second, third and fourth signal line.

12. A distance measurement device, comprising:
a light source and a light source control unit in communication with the light source;
an imaging unit comprising:
a light receiving element;
a first signal line and a second signal line;
a first transistor in electrical communication with the light receiving element, the first transistor comprising a first gate in electrical communication with the first signal line;
a second transistor in electrical communication with the light receiving element, the second transistor comprising a second gate in electrical communication with the second signal line; and
a control circuit comprising at least one comparator, wherein the control circuit is in electrical communication with the first and second signal line; and
a control unit in communication with the light source control unit and the imaging unit;
a first floating diffusion having an amount of charge relating to an amount of light received by the light receiving element;
a third transistor electrically coupled with the first floating diffusion and the control circuit;
a second floating diffusion having an amount of charge relating to the amount of light received by the light receiving element; and
a fourth transistor electrically coupled with the second floating diffusion and the control circuit.

13. The distance measurement device of claim 12, wherein the at least one comparator comprises a first comparator and a second comparator, wherein the first and second comparator are configured to receive a reference voltage.

14. The distance measurement device of claim 13, wherein the control circuit further comprises:
a NAND circuit in electrical communication with the first and second comparator;
a latch in electrical communication with the NAND circuit, a first AND circuit, and a second AND circuit, wherein the first AND circuit is in electrical communication with the first signal line, and the second AND circuit is in electrical communication with the second signal line.

15. The distance measurement device of claim 12, further comprising:
a first capacitor in electrical communication with the light receiving element via the first transistor; and
a second capacitor in electrical communication with the light receiving element via the second transistor.

16. The distance measurement device of claim 12, further comprising:
a first semiconductor substrate, wherein the light receiving element, the first transistor, and the second transistor are formed on the first semiconductor substrate; and
a second semiconductor substrate, wherein the control circuit is formed on the second semiconductor substrate.

17. The distance measurement device of claim 16, wherein the first semiconductor substrate is stacked on the second semiconductor substrate.

18. The distance measurement device of claim 12, further comprising:
a first capacitor in electrical communication with the light receiving element;
a third signal line configured to supply a first voltage based on an amount of charge stored by the first capacitive element; and
a first analog to digital converter in electrical communication with the third signal line.

19. The distance measurement device of claim 18, further comprising:
a second capacitor in electrical communication with the light receiving element, wherein the first capacitor is in electrical communication with the light receiving element via the first transistor, and the second capacitor is in electrical communication with the light receiving element via the second transistor;
a fourth signal line configured to supply a second voltage based on an amount of charge stored by the second capacitive element; and a second analog to digital converter in electrical communication with the fourth signal line.

20. The distance measurement device of claim 12, further comprising:
a second light receiving element;
a third signal line and a fourth signal line;
a fifth transistor in electrical communication with the second light receiving element, the fifth transistor comprising a third gate in electrical communication with the third signal line;
a sixth transistor in electrical communication with the second light receiving element, the sixth transistor comprising a fourth gate in electrical communication with the fourth signal line; and the control circuit is in electrical communication with the third and fourth signal line.

21. The distance measurement device of claim 20, wherein the control circuit comprises a second comparator and a third comparator, wherein the second and third comparator are configured to receive a reference voltage.

22. The distance measurement device of claim 20, wherein the control circuit comprises a voltage selector in communication with the first, second, third and fourth signal line.

* * * * *